(12) United States Patent
Rosenberg et al.

(10) Patent No.: US 11,582,711 B2
(45) Date of Patent: *Feb. 14, 2023

(54) SYSTEMS, DEVICES, METHODS, AND PROGRAM PRODUCTS ENHANCING STRUCTURE WALKTHROUGHS

(71) Applicant: TOGGLE RE, LCC, Phoenix, AZ (US)

(72) Inventors: Maxwell Pendelton Rosenberg, Phoenix, AZ (US); Justin James Leach, Phoenix, AZ (US)

(73) Assignee: LS54 Ventures, LLC, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/908,730

(22) Filed: Jun. 22, 2020

(65) Prior Publication Data

US 2020/0322917 A1    Oct. 8, 2020

Related U.S. Application Data

(63) Continuation-in-part of application No. 16/695,161, filed on Nov. 25, 2019.

(60) Provisional application No. 62/877,213, filed on Jul. 22, 2019, provisional application No. 62/771,150, filed on Nov. 25, 2018.

(51) Int. Cl.
  *H04W 64/00*     (2009.01)
  *G07C 9/00*      (2020.01)
  *H04W 68/00*     (2009.01)
  *H04W 4/02*      (2018.01)
  (Continued)

(52) U.S. Cl.
  CPC ...... *H04W 64/006* (2013.01); *G07C 9/00309* (2013.01); *G07C 9/00571* (2013.01); *G07C 9/00896* (2013.01); *G07C 9/28* (2020.01); *H04W 4/023* (2013.01); *H04W 4/80* (2018.02);
  (Continued)

(58) Field of Classification Search
  CPC ......... H04W 4/023; H04W 4/02; H04W 4/80; H04W 68/00; G06Q 50/16; G06Q 30/0645; G06Q 50/163; G06Q 30/0281; G07C 9/28; G07C 9/00309; G07C 9/00571;
  (Continued)

(56) References Cited

U.S. PATENT DOCUMENTS 7,254,559 B2   8/2007  Florance et al.
8,442,906 B1   5/2013  Thomas
(Continued)

*Primary Examiner* — Margaret G Mastrodonato

(57) ABSTRACT

Systems, devices, methods, and program products for enhancing structure walkthroughs are disclosed. In various embodiments, a method includes: monitoring a current location of an interested party (IP) device utilizing data collected by the IP device during a walkthrough of a structure having a structure representative (SR); detecting, based on the current location of the IP device, when the IP device is brought into proximity of a first SR-marked location included in a plurality of structure SR-marked locations; and in response to detecting that the IP device has been brought into proximity of the first SR-marked location, (i) identifying a first SR-created message corresponding to the first SR-marked location and contained in a location-referenced message set; and (ii) generating or causing generation of an SR message notification on the IP device, the SR message notification presenting or offering to present the first SR-created message to the interested party.

20 Claims, 21 Drawing Sheets

(51) Int. Cl.
*H04W 4/80* (2018.01)
*G07C 9/28* (2020.01)

(52) U.S. Cl.
CPC ......... *H04W 64/003* (2013.01); *H04W 68/00* (2013.01); *G07C 2009/00317* (2013.01)

(58) Field of Classification Search
CPC ...... G07C 9/00896; G07C 2009/00317; G07C 2209/08
See application file for complete search history.

(56) References Cited

U.S. PATENT DOCUMENTS

| | | | |
|---|---|---|---|
| 9,076,184 B2 | 7/2015 | Dempsey | |
| 9,626,841 B2 | 4/2017 | Fadell et al. | |
| 9,792,542 B2 | 10/2017 | Curtis | |
| 10,176,652 B2 | 1/2019 | Romero et al. | |
| 11,145,016 B1* | 10/2021 | Brophy | G06Q 30/0645 |
| 11,392,998 B1* | 7/2022 | Kwak | G06V 20/20 |
| 2001/0025261 A1 | 9/2001 | Olefson | |
| 2005/0187832 A1 | 8/2005 | Morse et al. | |
| 2006/0015925 A1 | 1/2006 | Logan | |
| 2006/0020522 A1 | 1/2006 | Pratt | |
| 2007/0038773 A1 | 2/2007 | White et al. | |
| 2007/0043770 A1 | 2/2007 | Goodrich et al. | |
| 2008/0201412 A1 | 8/2008 | Wayne | |
| 2014/0279247 A1* | 9/2014 | Leuer | G06Q 30/0623 705/26.61 |
| 2015/0133168 A1* | 5/2015 | Jay | H04W 4/029 455/456.3 |
| 2015/0363989 A1 | 12/2015 | Scalisi | |
| 2016/0189503 A1 | 6/2016 | Johnson et al. | |
| 2016/0363452 A1* | 12/2016 | Mehlman | G01C 21/206 |
| 2017/0270560 A1* | 9/2017 | Duggal | H04N 21/8547 |
| 2017/0372542 A1 | 12/2017 | Romero et al. | |
| 2018/0307903 A1 | 10/2018 | Siminoff | |
| 2018/0341835 A1 | 11/2018 | Siminoff | |
| 2018/0374276 A1* | 12/2018 | Powers | G06T 17/205 |

* cited by examiner

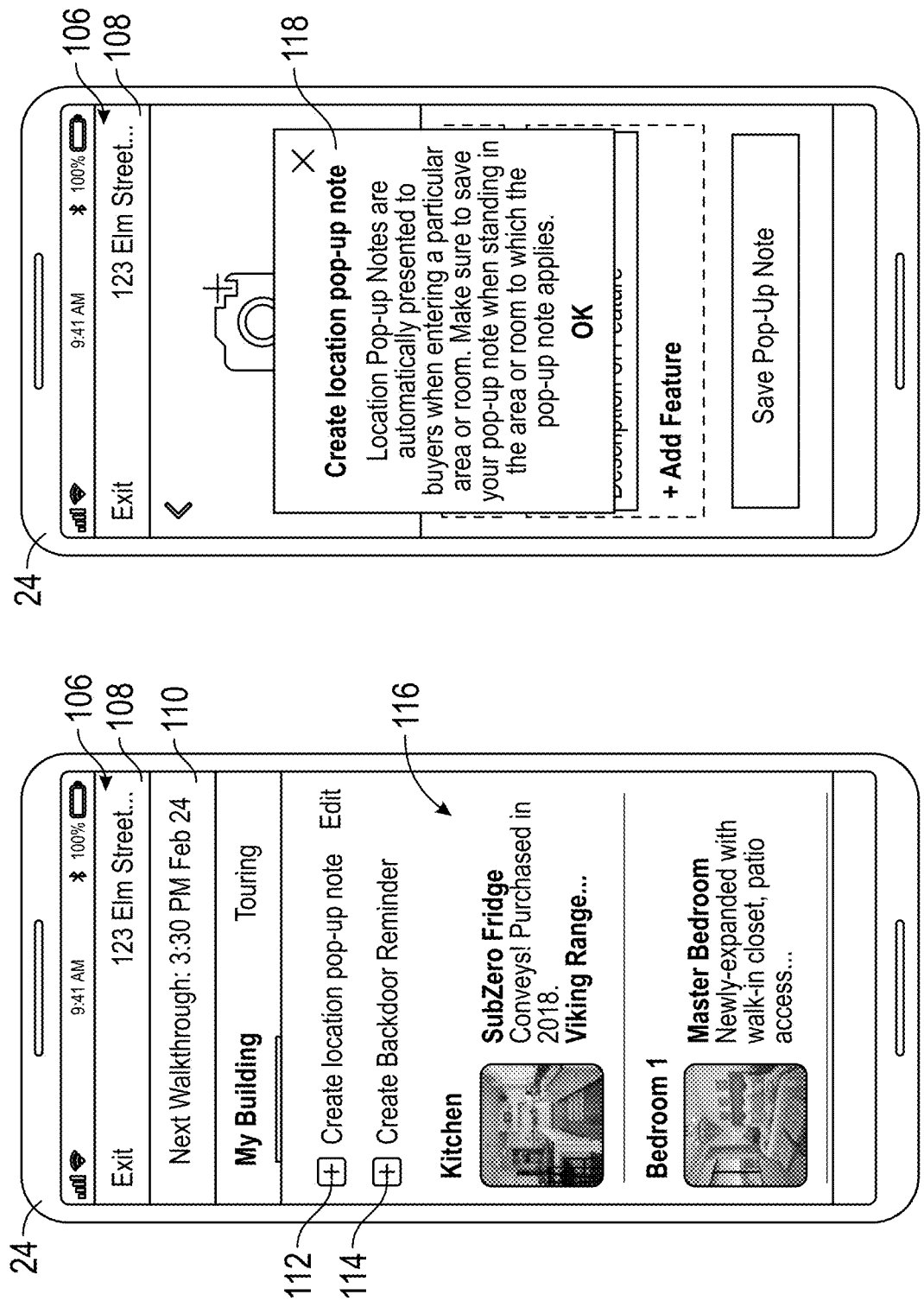

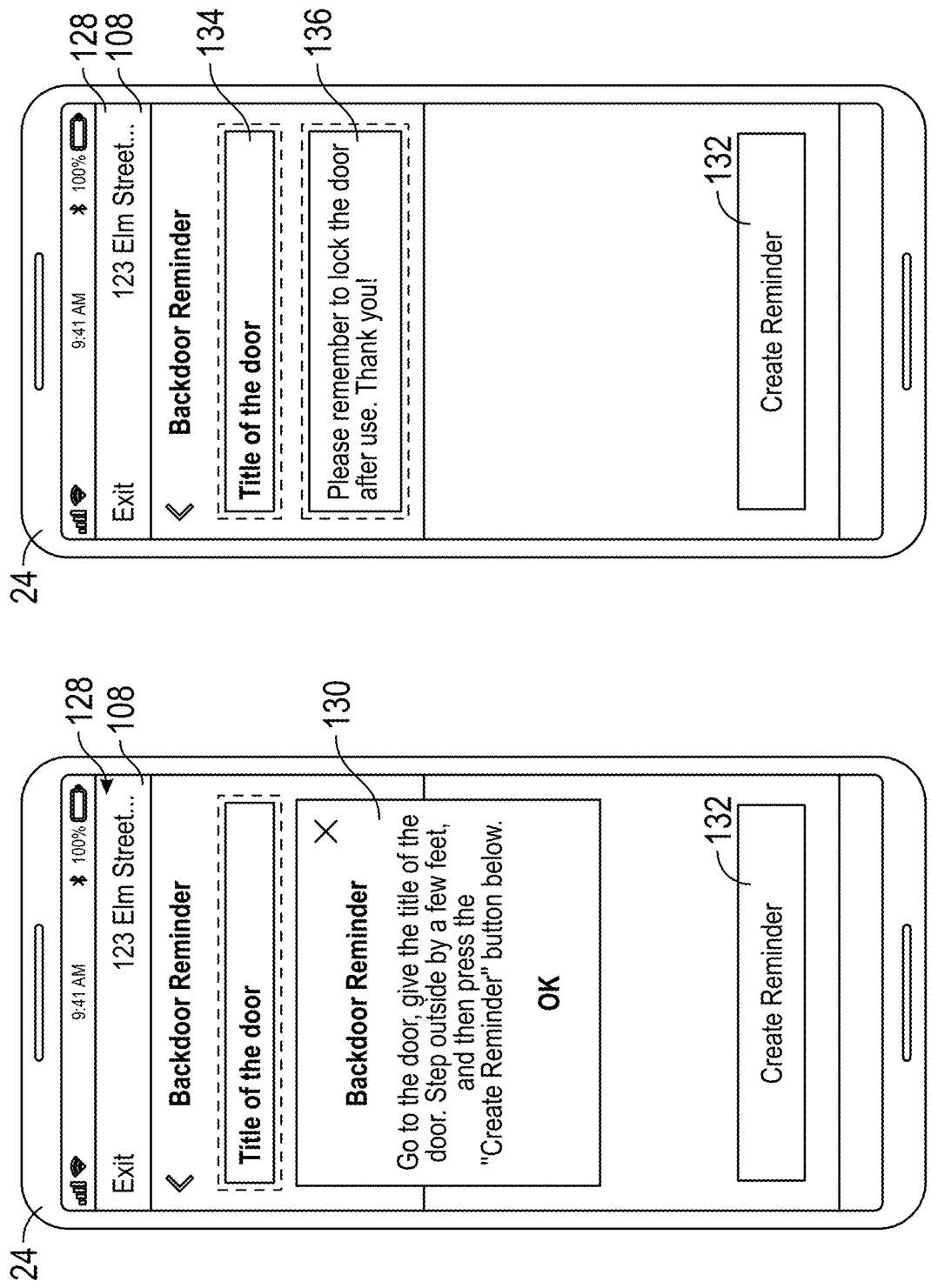

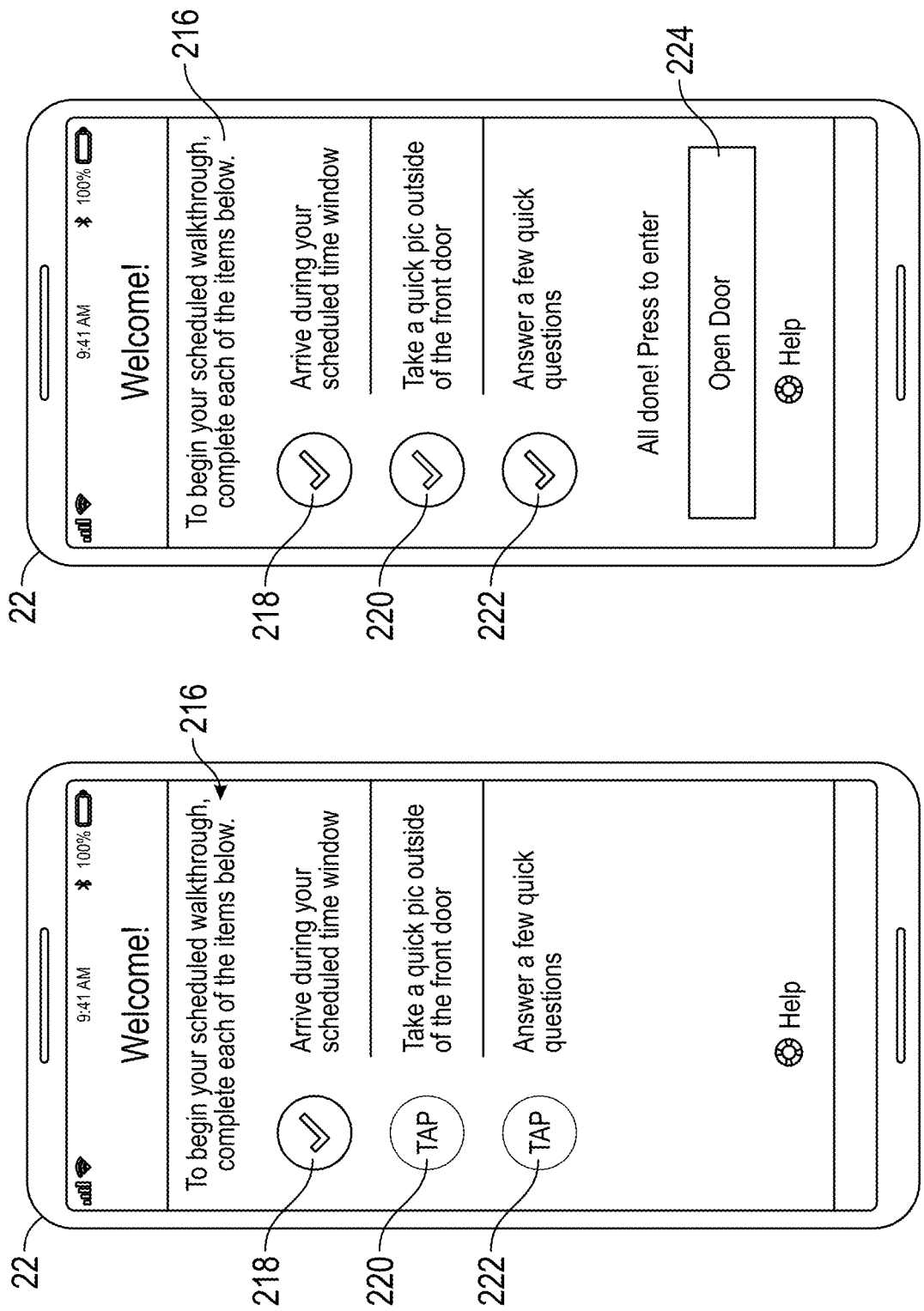

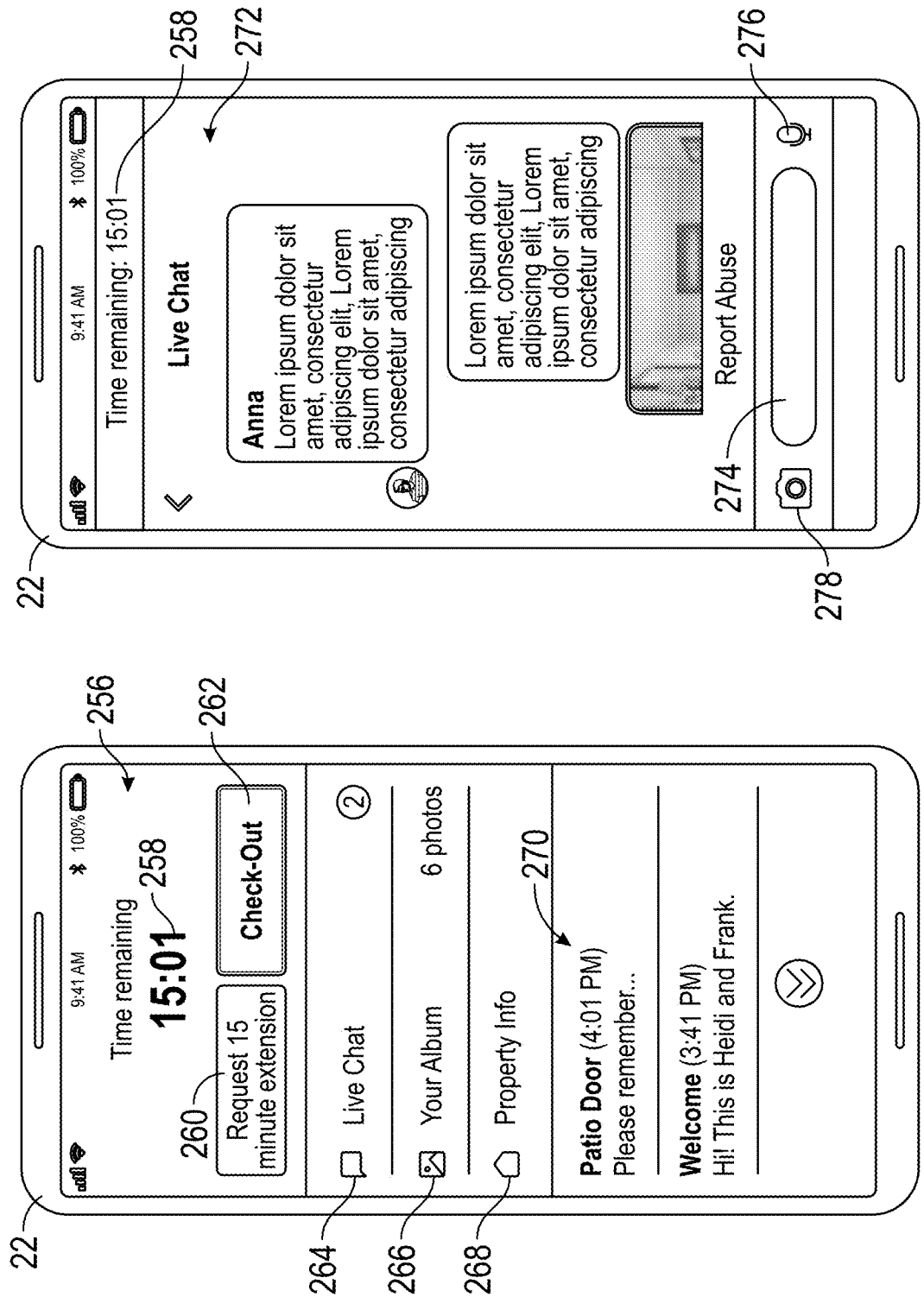

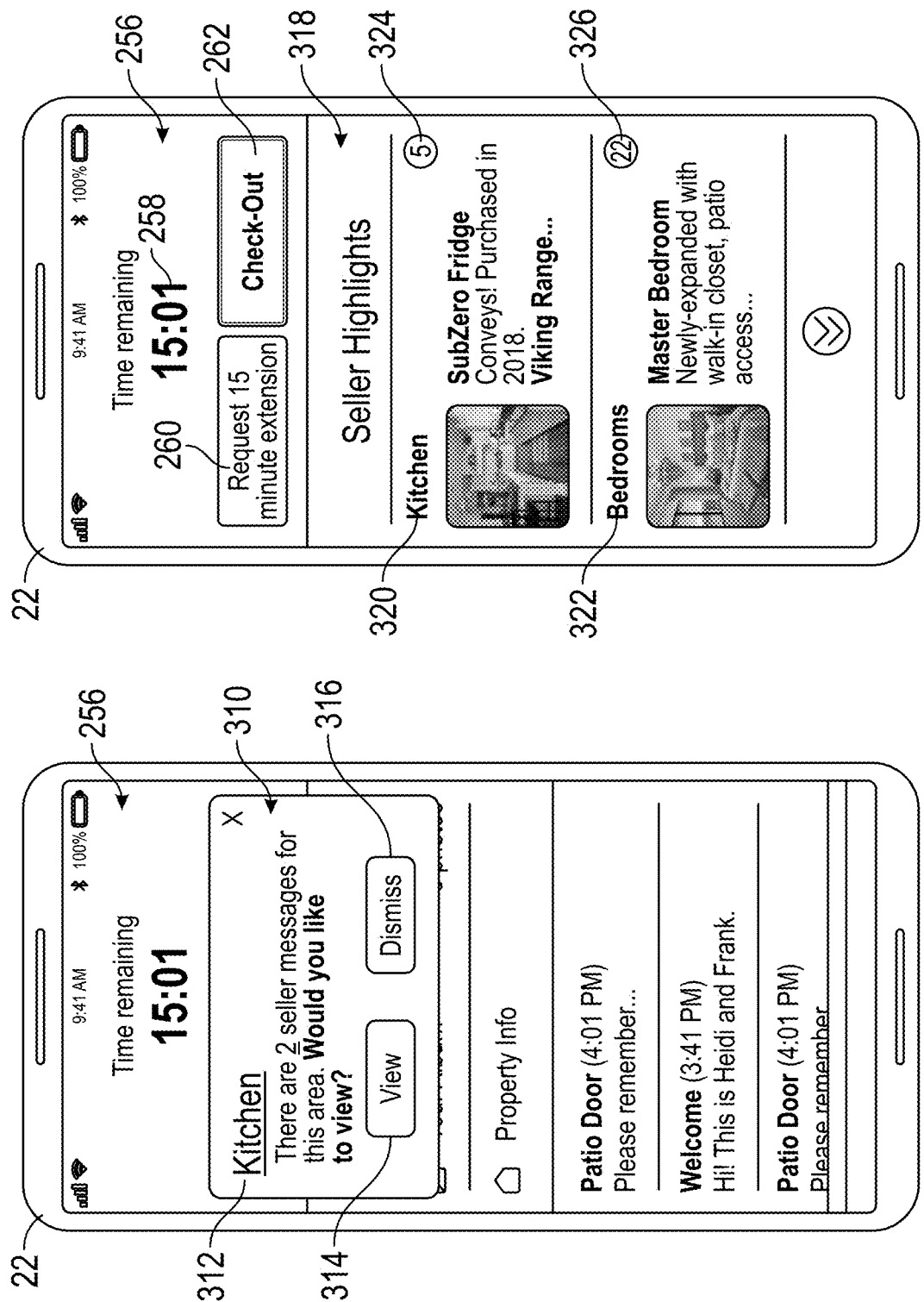

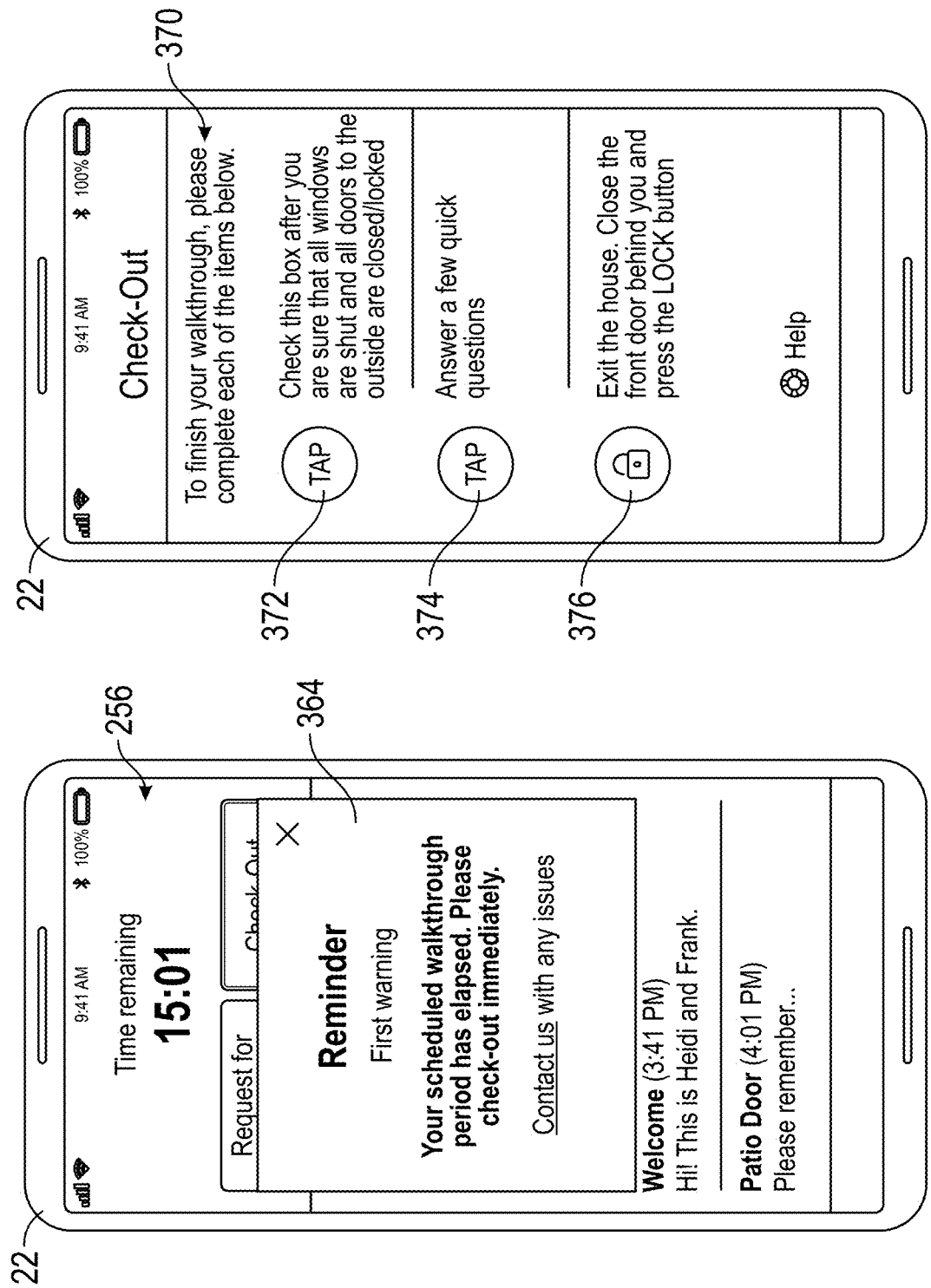

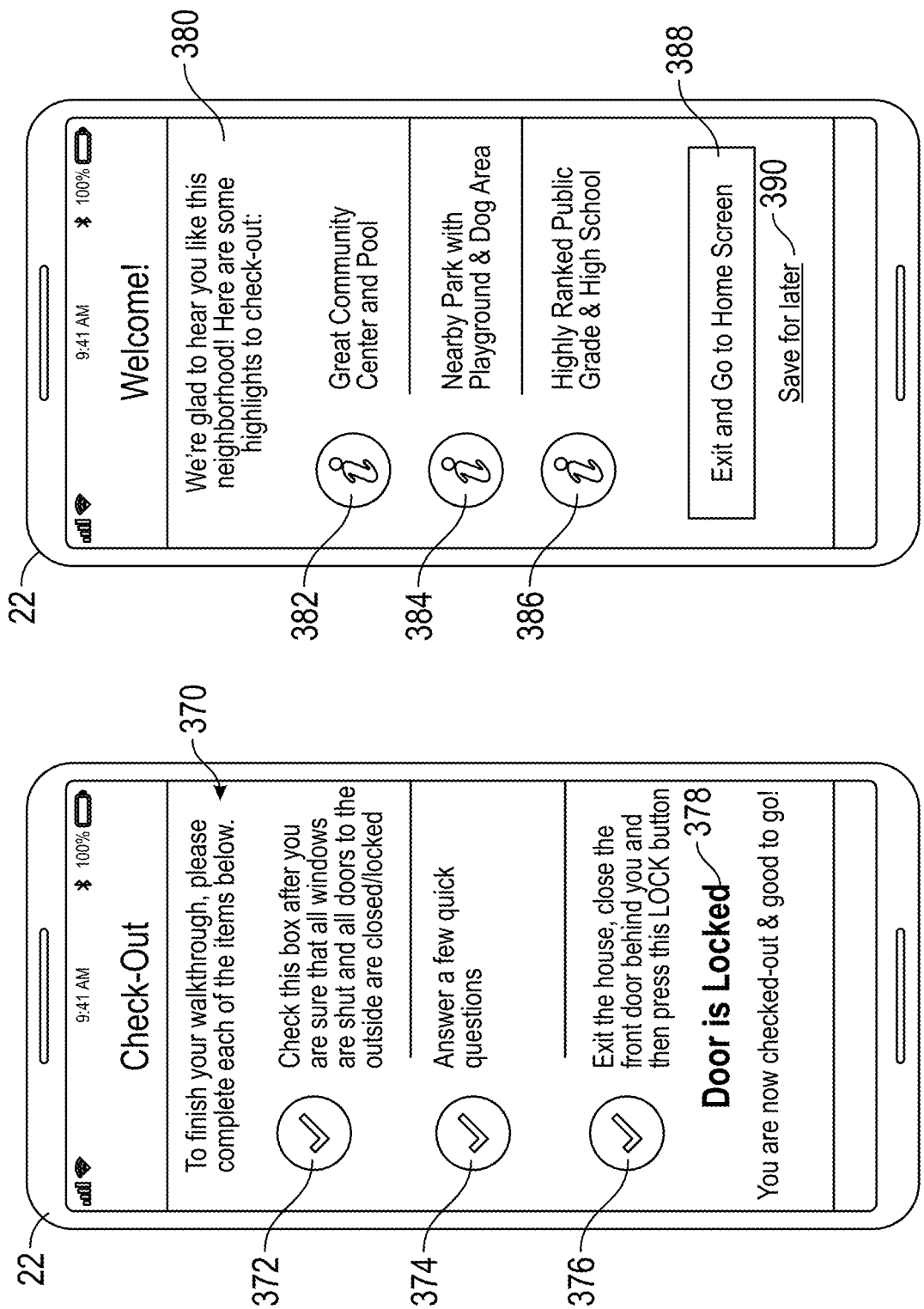

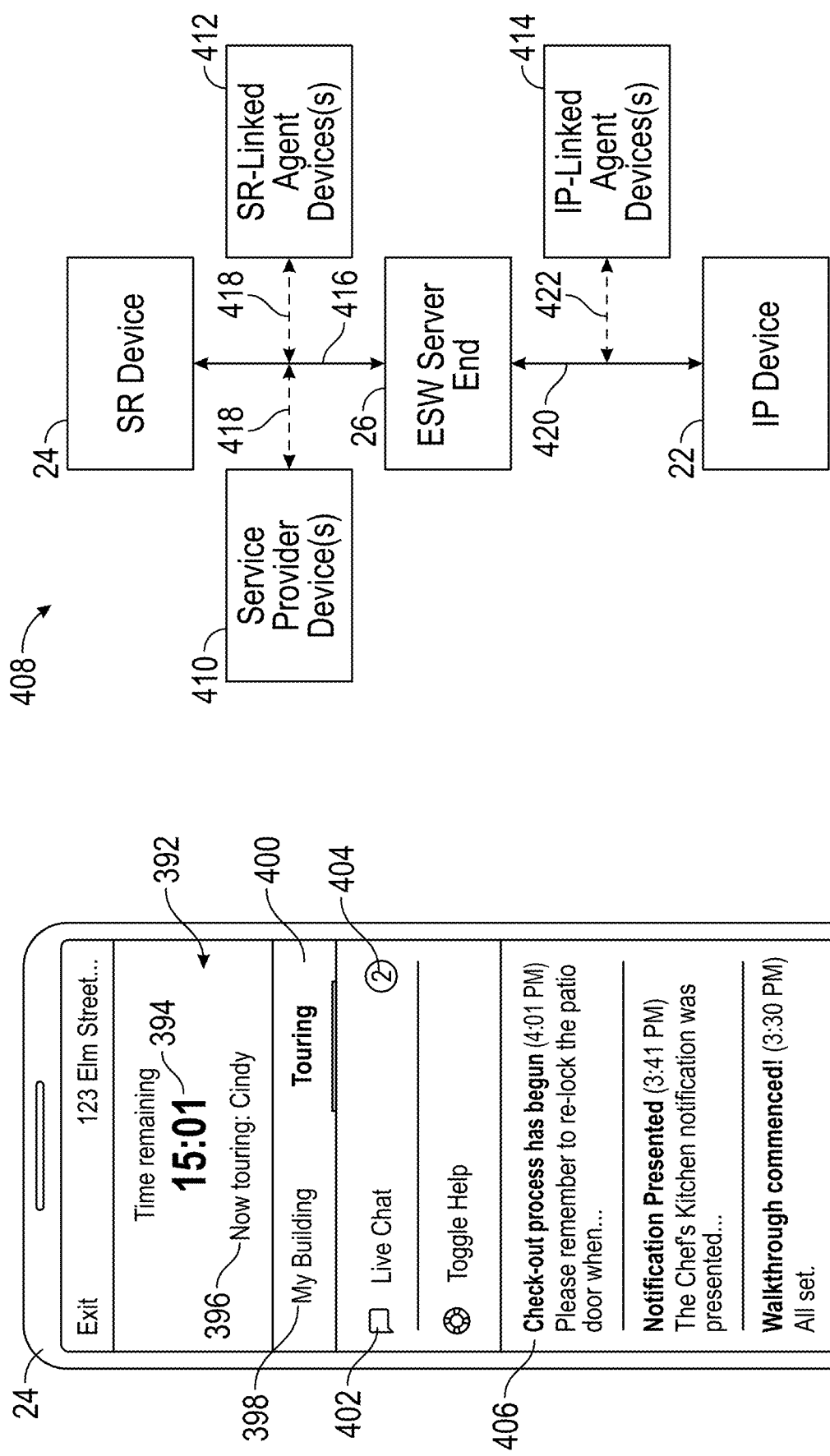

SYSTEMS, DEVICES, METHODS, AND PROGRAM PRODUCTS ENHANCING STRUCTURE WALKTHROUGHS

CROSS-REFERENCE TO RELATED APPLICATIONS

This application is a continuation-in-part of U.S. Utility application Ser. No. 16/695,161, filed with the United States Patent and Trademark Office (USPTO) on Nov. 25, 2019, which claims priority to U.S. Provisional Application Ser. No. 62/877,213, filed with the USPTO on Jul. 22, 2019, and which further claims priority to U.S. Provisional Application Ser. No. 62/771,150, filed with the USPTO on Nov. 25, 2018. The contents of the foregoing applications are incorporated by reference.

TECHNICAL FIELD

The following disclosure relates to systems, devices, methods, and program products enhancing user experiences during in-person tours or "walkthroughs" of homes, apartments, and other structures offered for sale, lease, or rent.

DEFINITIONS

The following definitions apply throughout this document. Those terms not expressly defined here or elsewhere in this document are assigned their ordinary meaning in the appropriate technical field.

Interested Party (IP)—An individual or group of individuals conducting, having conducted, or seeking to conduct a structure walkthrough for the purposes of evaluating and potentially engaging in an agreement related to the ownership or occupancy of a structure. The interested party may be a potential buyer, renter, or lessee of a structure.

Structure—A building or building part including free-standing residential and commercial structures (e.g., single family homes), as well as dwellings and office spaces sharing a structural feature (e.g., a wall) or otherwise joined to other dwellings or office spaces as in the case of apartments, condominiums, townhomes, multi-tenant office buildings, and the like.

Structure Representative (SR)—This term broadly encompasses the legal owner of a structure, as well as any person authorized to act on behalf of the structure owner. As a first example, a structure representative may be the seller of a building offered for sale or the seller's agent. As a second example, the structure representative may be a landlord (building owner) or the building manager of a structure offered for rental or lease.

Walkthrough—An in-person tour, viewing, or inspection of a structure by an interested party (defined above), whether performed independently or in the company of a third party.

BACKGROUND

When considering entering into an agreement pertaining to the occupancy or ownership of a residential, business, or commercial structure, an interested party often conducts an in-person tour or "walkthrough" of the structure prior to taking steps in furtherance of the agreement. Traditionally, a structure walkthrough is conducted in the presence of a third party. The third party may be, for example, a real estate agent, a landlord, a building manager, or the structure owner, depending on whether the structure is offered for sale, lease, or rent. To initiate the structure walkthrough, the third party may grant the interested party physical access to the structure utilizing, for example, keys in possession of the third party or stored within a lockbox secured to the structure's exterior. Alternatively, the third party may interact with a keyless entry system, if installed at an entry point of the structure, to grant the interested party structure access. As the walkthrough progresses, the third party may escort the interested party through the interior of the structure, perhaps while offering bits of information pertaining to the structure itself, the structure's surroundings, recent sales figures or rental rates of comparable structures in the vicinity, and similar topics. Upon conclusion of the walkthrough, the third party may lock the front door or otherwise resecure the structure's entry point or entry points after ensuring that the interested party has vacated the structure.

BRIEF DESCRIPTION OF THE DRAWINGS

At least one example of the present invention will hereinafter be described in conjunction with the following figures, wherein like numerals denote like elements, and:

FIGS. 3-6 are screenshots generated on an SR device illustrating example graphical user interface (GUI) screens with which an SR may interact to create location-referenced or location-tagged messages, as illustrated in accordance with a first example approach in which the SR carries the SR device to locations desirably marked for linkage to SR-created messages;

FIGS. 7 and 8 are screenshots generated on an SR device further illustrating one manner in which the example GUI shown in FIGS. 3-6 may be utilized by an SR to create secondary entry point reminders in certain embodiments;

FIGS. 13 and 14 are screenshots of GUI screens suitably generated on an IP device during an example implementation of a check-in subprocess conducted by an interested party to gain access to a home or other structure;

FIG. 18 is a screenshot of an example GUI home screen suitably presented to an interested party via an IP device during an enhanced walkthrough, as illustrated in accordance with an example embodiment;

FIGS. 19-21 are screenshots of example GUI pages or screens for conducting anonymized live chat, for viewing and compiling a walkthrough album, and for viewing information pertaining to the structure subject to walkthrough, any or all of which may be selectively generated on an IP device in embodiments;

FIG. 24 is an example screenshot in an embodiment in which offers or prompts to present SR-created messages are automatically presented on the screen of an IP device when triggered by, for example, changes in the positioning of an IP device within or adjacent a structure subject to walkthrough;

FIG. 25 is an example screenshot in an embodiment in which an interested party interacts with GUI screens to select and view SR-created messages pertaining to different areas of a structure subject to walkthrough;

FIG. 28 illustrates a check-out omission alert (here, an overstay alert), which may be generated on IP device when an interested party fails to initiate the check-out subprocess prior to elapse of a scheduled walkthrough period;

FIGS. 29 and 30 are screenshots generated on an IP device illustrating example GUI screens with which an IP may interact during the check-out subprocess;

FIG. 31 illustrates a GUI screen that may be generated on IP device presenting an interested party with information pertaining one or more SR-designated points-of-interest, which are located in the surrounding area of a structure subject to walkthrough and which may be presented during or immediately following completion of the check-out process in embodiments;

FIG. 32 is a screenshot of an example GUI home screen suitably presented on an SR device and illustrating one manner in which the SR may be apprised of walkthrough status updates via a software application executing on the SR device, as illustrated in accordance with an example embodiment; and FIG. 33 is a schematic illustrating potential communication flows routed through the ESW server end and to any combination of IP device, SR device, linked agent devices, and service provider devices, as illustrated in accordance with an example embodiment of the present disclosure.

Figure 1:
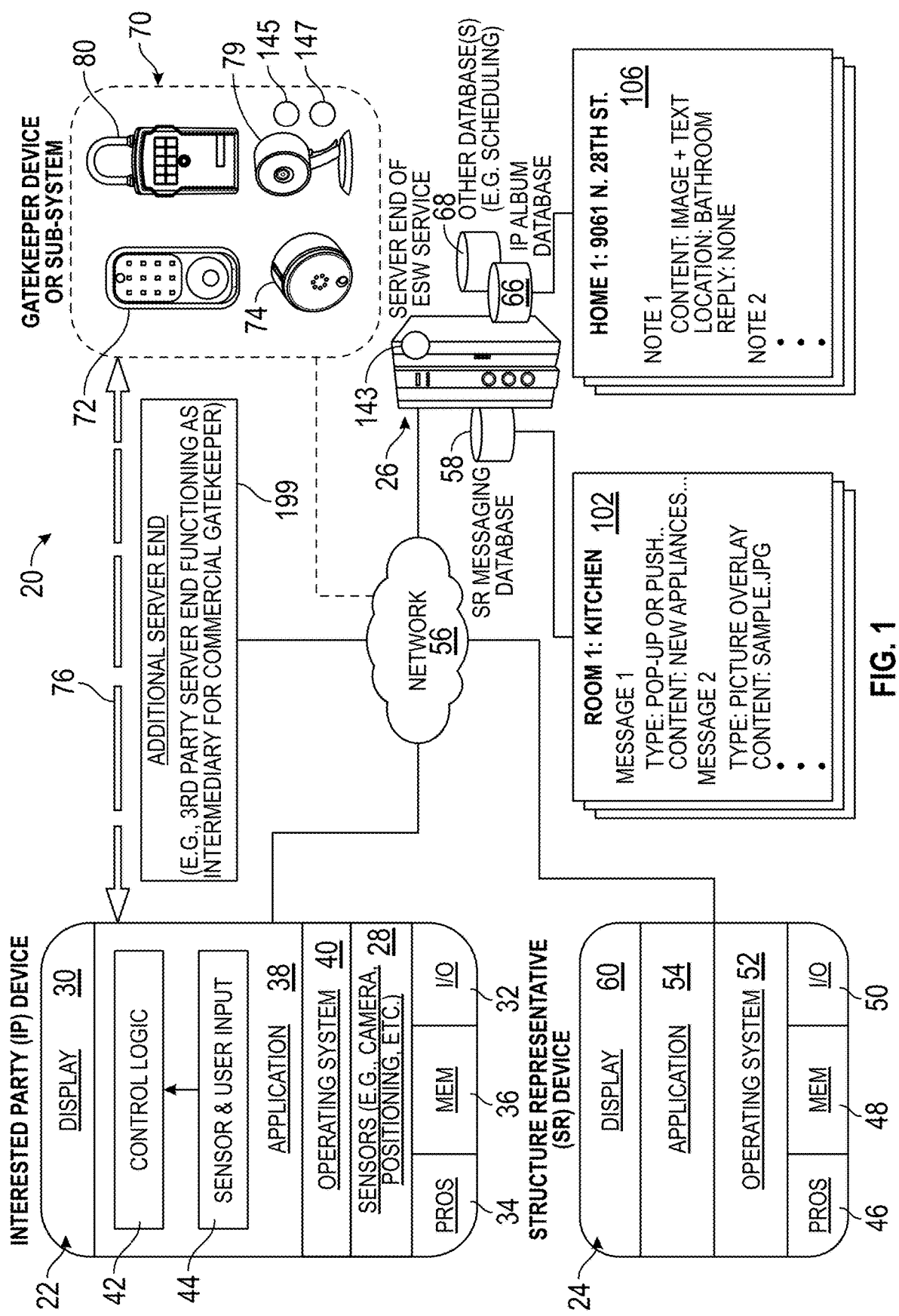
FIG. 1 schematically depicts a multi-device system or architecture suitable for implementing various aspects of the present disclosure, as illustrated in accordance with an example embodiment.

For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

The following Detailed Description is merely example in nature and is not intended to limit the invention or the application and uses of the invention. Furthermore, there is no intention to be bound by any theory presented in the preceding Background or the following Detailed Description.

Overview

As discussed in the foregoing section entitled "BACKGROUND," walkthroughs of residential homes and other structures are traditionally performed in the presence of a third party, such as a real estate agent or landlord. The presence of a third party during a structure walkthrough may help alleviate concerns regarding structure security and, perhaps, may improve the overall experience of an interested party. Requiring a third party presence for all structure walkthroughs can be a burdensome prerequisite, however, associated with various drawbacks. The need to coordinate with and interact through a designated third party can complicate walkthrough scheduling and may discourage direct, effective communication between an interested party and the structure owner. Further, while a third party may relate information regarding a structure to an interested party, the information shared by a particular third party can vary greatly in quality and generally remains outside of the structure owner's knowledge and control. In rare instances, a buyer's agent, a seller's agent, or another third party may provide poor and possibly misleading advice, whether intentionally or unintentionally. As a still further drawback, third party involvement typically incurs additional cost to the interested party, the structure owner, or to both, particularly when the third party is a real estate agent representing the buyer or seller of a structure. This additional cost is often substantial and may or may not be justified by the contributions of the third party.

For at least those reasons above, there exists an ongoing demand across commercial, business, and residential sectors for systems, devices, methods, and program products enhancing various aspects of the structure walkthrough process. Ideally, embodiments of such systems, devices, methods, and program products would increase convenience in scheduling and conducting structure walkthroughs; help preserve structure security during and following structure walkthroughs, regardless of third party presence; promote effective sharing of information pertaining to a structure and its surroundings; and/or provide other key functionalities usefully performed prior to, during, and subsequent to structure walkthroughs. In satisfaction of this demand, devices, systems, methods, and program products are disclosed for enhancing user experiences across all phases of structure walkthroughs including, for example, when scheduling, preparing for, conducting, monitoring the progress of, and evaluating structure walkthroughs. The enhanced user experience can be that of the interested party, that of a structure representative (SR), or both. Generally, then, embodiments of the present disclosure may be regarded as enhancing the user experience of the interested party and/or the SR through the provision of unique and useful computer- or device-implemented tools.

Embodiments of the disclosure enhance the manner in which structure-related information is conveyed from an SR (e.g., a building owner) to interested parties (e.g., potential buyers, renters, or lessees) during the walkthrough of a structure. In certain implementations, notifications are automatically presented to an interested party via an IP device during a structure walkthrough, with the notifications presenting or offering to present SR-created messaging to the interested party via the IP device. The SR-created messaging is contained in a location-tagged or location-referenced message set, which is stored in a memory accessible to a server end of a network-connected host service (also referred to herein as an "enhanced structure walkthrough (ESW) service"). The location-referenced message set contains a plurality of SR-created messages, which are linked, pinned, or tagged to particular SR-marked locations further included in the message set During an enhanced walkthrough conducted by an interested party carrying an IP device, the location of the IP device within or adjacent the structure is monitored. When the IP device is brought within a predetermined proximity (e.g., a few feet) of a particular SR-marked location, two actions occur in response. First, an SR-created message, which corresponds to the particular SR-marked location and which is contained in a location-referenced message set, is identified. Second, the SR-created message (or a prompt offering to present the SR-created message) is automatically presented on the IP device for viewing by the interested party, providing the SR-created message has not been previously presented (or offered for presentation) to the interested party.

The position of the IP device within or adjacent the structure may be monitored utilizing location-specific data, which is repeatedly captured by the IP device during the walkthrough. Such location-specific data (hereafter, "location data") can include any type and combination of data indicative of the position of the IP device within or adjacent the structure. In various instances, the location data includes global positioning system (GPS) coordinates captured by the IP device, which may be a smartphone or a similar portable electronic device having GPS capabilities. Additionally or alternatively, the IP device may also capture other location data, such as signal strength measurements (hereafter, "received signal strength indicator (RSSI) measurements") or response times (hereafter, "round trip time (RTT) measurements") of wireless nodes within range of the IP device. As appearing herein, the term "wireless nodes" refers to electronic devices emitting wireless (e.g., radio frequency) signals detectable by an IP device. Examples of wireless nodes include wireless access points (APs), WiFi routers and extenders or repeaters, wireless beacons, internet of things (JOT) appliances, gatekeeper devices of the type described below, and other such devices emitting wireless signals. Such data may be useful in increasing the accuracy with which the indoor position of the IP device is determined and tracked during an enhanced walkthrough. Mesh WiFi networks, in particular, are increasingly prevalent and often include three or more nodes from which the position of the IP device may be estimated in embodiments with a relatively high degree of accuracy. In still further embodiments, additional data may also be considered in monitoring the location of the IP device relative to a structure, including data provided to the ESW server end by other network-connected devices (e.g., network-connected smart speakers or motion sensors), as described throughout this document In a similar manner, such approaches may be utilized to increase accuracy in tracking SR device position when marking locations linked to SR-created messages, identifying secondary points of entry, and performing similar location-dependent functions, as described below In some embodiments, the IP device repeatedly transmits data to the server end during a walkthrough as location report signals, which include any combination of GPS coordinates, RSSI measurements, RTT measurements, and/or other such location data from which the position of IP device may be estimated. During the walkthrough, the server end compares the monitored location of the IP device to the locations contained in the location-referenced message set previously created by an SR for the structure subject to walkthrough. When determining that the IP device has been brought into sufficient proximity of a marked location, the server end then identifies an SR-created message corresponding to the marked location and transmits a command over the network to the IP device instructing the IP device to present (or offer to present) the identified SR-created message thereon. In other embodiments in which the location-referenced message set is downloaded to a local memory of the IP device in advance of the walkthrough, the IP device may perform such steps to determine when to present (or when to generate prompts offering to present) the corresponding SR-created messages. Finally, in still further embodiments, an SR may likewise be permitted to create messages corresponding to particular locations or areas (e.g., rooms) of the structure, which may be stored in memory accessible by the server end; however, such messages may not be automatically presented during the walkthrough, but rather selected by the interested party for viewing on an on-demand or user-selected basis via user interaction with a software application executing on the IP device.

In support the location-referenced messaging functionality, embodiments of the present disclosure enable an SR to mark selected locations associated with a structure prior to a walkthrough. Such SR-marked locations may be located within and, perhaps, outside of the structure. In embodiments, the SR marks such locations prior to the walkthrough utilizing, for example, a specialized software application executing on an SR device. Specifically, in an embodiment, the SR may be instructed (through on-screen prompts or instructional messages generated by the software application) to bring the SR device to each location desirably marked for linkage to a message and then to provide user input indicating when the SR has done so. In response to such user input, the SR device may then capture a snapshot of location data (e.g., GPS coordinates, RSSI values, RTT values, or the like) defining the marked location. Before, after, or concurrent with this location marking or geotagging process, the SR may then further create customized messages linked to the newly-marked location. The SR then repeats this process, as desired, to gradually compile or build a location-referenced message set containing a plurality of SR-created messages each linked to at least one of a plurality of SR-marked locations. Throughout or perhaps following this process, the location-referenced message set is transmitted over a network (e.g., the Internet) to the ESW server end, which then stores the location-referenced message set in memory (below, "an SR messaging database") for subsequent retrieval and editing, as appropriate.

In the above-described manner, an SR can personally create content pertaining to a structure availed for walkthrough, with the knowledge that such content will be directly presented to an interested party at the appropriate junctures throughout a walkthrough. A unique, computer-implemented tool is thus realized for empowering the SR from an information sharing standpoint, with the ESW server end functioning as a platform for hosting such user-created content. The SR-created messages can contain various different types of content including text, audio (e.g., spoken messages), video clips, and pictures (still images) pertaining to the structure subject to walkthrough, depending on implementation and SR selection. Examples of such SR-created messages are provided below. Here, and elsewhere throughout this document, such messages are described as presented as "notifications" appearing on an IP device. Such notifications can take different forms without limitation, providing that the appropriate information or content is shared with the interested party via the IP device. In embodiments, such notifications will appear in the context of a dedicated software application executing in the foreground as, for example, pop-up messaging. In other instances, such notifications may be presented as push notifications, as text messages (e.g., a rich communication services (RSS), multimedia messaging service (MMS), or short messaging service (SMS) messages), or as another type of notification appearing on a screen of the IP device for viewing by an interested party. Audible notifications may also be utilized in embodiments.

The foregoing has briefly disclosed the concept of SR-created messaging, which is automatically presented (or automatically offered for presentation) on an IP device during a walkthrough in response to the proximity of the IP device to SR-marked locations contained in a location-referenced message set In further embodiments, several other types of location-dependent actions may be performed during the course of a walkthrough in addition to or in lieu of the presentation of (or offered presentation of) such SR-created messaging. Such other location-dependent actions can include the generation of check-out omission alerts and the generation of secondary entry point reminders (also referred to as "backdoor reminders"), either or both of which can be generated based on position-tracking of the IP device. Check-out omission alerts are usefully generated in instances in which an interested party is required to complete a mandatory check-out subprocess upon conclusion of the walkthrough. Such check-out omission alerts may thus be generated when it is determined (e.g., by the IP device or by the server end in communication with IP device) that the interested party is leaving the vicinity of the structure without completing the mandatory check-out subprocess. Additionally or alternatively, check-out omission alerts may be generated when it is determined (or believed likely) that the interested party remains within the structure (and thus has not completed the check-out subprocess) following elapse of the time period (and perhaps a brief grace period) scheduled for completion of the walkthrough (also referred to herein as an "overstay alert"). Comparatively, secondary entry point reminders are generated when determining, based at least in part on one or more locations previously marked by the SR and the monitored location of the IP device, that an interested party has exited the structure or reentered the structure through a secondary point of entry. Secondary entry point reminders are thus generated on the IP device to remind the interested party to resecure the secondary entry point upon reentering the structure therethrough.

Positioning data collected from the IP device during, immediately previous to, or immediately following the walkthrough may also be considered in executing other walkthrough enhancement functions, such as the below-described securitized check-in and check-out subprocesses. Still further walkthrough enhancement functions are also disclosed herein and are usefully performed in conjunction with, or perhaps independently of, one or more of the location-dependent functions just listed. These other walkthrough enhancement functions include, but are not limited to, the support of anonymized communications between an interested party and an SR within a time window encompassing the walkthrough; the creation of an online IP walkthrough album maintained by the ESW server end and containing content created by an interested party during one or more enhanced walkthroughs; and other data collection functions. Again, any single one, all, or a subset of these walkthrough enhancement functionalities may be performed in embodiments of the present disclosure; noting that, in certain embodiments, an SR, interested party, or other user may be able to customize or personalize their experience by selectively activating and deactivating such functions as preferred. Accordingly, the functions described herein should be considered independent and distinct unless otherwise expressly described as dependent in the appended Claims. The foregoing walkthrough enhancements functionalities are each described, in turn, below in connection with FIGS. 2-33. First, however, a general description of an overall system architecture containing an ESW server end, an IP device, an SR device, and other network-connected devices is described below in connection with FIG. 1 to establish a non-limiting example context in which embodiments of the present disclosure may be better understood.

Example System Architectures Suitable for Carrying-out Embodiments of the Present Disclosure Turning now to the drawings and with initial reference to FIG. 1, there is shown an example multi-device infrastructure, architecture, or system 20 suitable for carrying-out embodiments of the present disclosure. Multi-device system 20 includes at least one IP device 22 and at least one SR device 24 (also referred to herein as "client devices"). The terms "IP device" and "SR device" are defined below, again noting that "IP" is an abbreviation for "interested party," while SR is an abbreviation for "structure representative." Generally, IP device 22 may assume the form of any portable, network-connectable electronic device, which is carried by or worn by an interested party during at least a portion of a structure walkthrough. In many cases, IP device 22 may assume the form of a smartphone executing a specialized software application availed by a service, which maintains one or more servers for performing certain frontend/backend functions described herein (hereafter, "ESW server end 26"). Such specialized software may execute on the operating system (OS) of IP device 22, but may alternatively execute principally offboard device 22 as a cloud-based application or software-as-a-service (SAAS) to varying extents in embodiments. While primarily described and illustrated herein as a smartphone, IP device 22 can assume other forms including, for example, that of a tablet or wearable device, such as a smartwatch or smart glasses.

As schematically illustrated in FIG. 1, IP device 22 includes a number of internal sensors 28 and at least one display screen 30. By way of non-limiting example, sensors 28 can include any type of receiver, chip set, or the like for determining position utilizing a satellite navigation system including, but not limited to, GPS, Galileo, Global Navigation Satellite System (GNSS or GLONASS), Compass-IGS01, and combinations of the satellites included therein. For ease of reference, the term "GPS" is utilized herein to encompass all such satellite-based positioning systems. Additionally, sensors 28 can include a pedometer, an electronic compass, an altimeter, or other such sensors supporting motion tracking. Sensors 28 can also include one or more accelerometers, gyroscopes, and/or magnetometers, which may be implemented as Microelectromechanical System (MEMS) devices and possibly packaged as an inertial measurement unit (IMU); one or more microphones; one or more cameras; and other such sensors commonly integrated into smartphones, tablets, and similar electronic devices. Sensors 28 may also include circuitry for receiving and measuring the signal strength of wireless signals, although such circuitry (and the associated antenna or antennae) may also be considered part of the below-described input/output (I/O) features. Display screen 30 can be any device for generating imagery thereon. Display screen 30 will often, but need not necessarily have integrated touchscreen capabilities.

IP device 22 further includes a number of I/O features 32. I/O features 32 enable data entry into IP device 22 and data output from device 22. I/O features 32 can include various devices or components for receiving user input, such as touchscreen interfaces, physical keyboards, scroll wheels, switches, buttons, microphones for receiving voice input (which can then be converted to textual input utilizing a voice recognition engine or module, as appropriate), and cameras for receiving user gesture input (captured as imagery and then processed for recognition) or other such visually-detectable input. I/O features 32 can also include various modules, ports, or connectors for interacting with other electronic devices including a network interface, an interface to mass storage, an interface to display screen 30, and so on. I/O features 32 may further include wireless receivers or transceivers of various types and configured to transmit and receive signals over wireless (e.g., RF) bands in accordance with established standards, presently known or later developed. Such standards can include any form of Institute of Electrical and Electronic Engineers (IEEE) 802.11ax (WiFi) protocols, any form of IEEE 802.15 protocols (e.g., BLUETOOTH IEEE 802.15.1 or ZIGBEE IEEE 802.15.4 protocols) or the like; although equivalent embodiments could utilize any open, standard or non-standard protocols and frequencies. I/O features 32 may still further include receivers having near field communication (NFC), BLUETOOTH low energy (BLE), or radiofrequency identification (RFID) read/write capabilities in embodiments.

In addition to the components mentioned above, IP device 22 further contains a processor architecture 34 and memory 36. The term "processor architecture," as appearing throughout this document, is defined to broadly encompass any number and type of processing devices including one or more processors realized on integrated circuit-bearing dies or "IC chips," possibly in addition to other microelectronic components or logic structures operably interconnected to provide the processing capabilities of device 22 (or another named device, system, or component). Similarly, while illustrated as a single block in FIG. 1, memory 36 generically represents all computer-readable storage media and areas contained in IP device 22. In this regard, IP device 22 stores computer-readable instructions and logic, which may be realized in any combination of hardware, firmware, and software residing in memory 36. Such software may include a software program or application 38, which directs the various hardware features of IP device 22 to perform the functionalities described throughout this document (including potentially sending information or requests to server end 26 to perform certain tasks or functions). Accordingly, during operation of IP device 22, application 38 suitably interfaces with processor architecture 34, memory 36, and I/O features 32 via any conventional OS 40. Application 38 includes control logic 42, which receives input 44 from sensors 28 and user input entered via I/O features 32 and which then carries-out the functions described below.

As does IP device 22, SR device 24 contains a processor architecture 46 (e.g., one or more processors), memory 48, and any number of I/O features 50. An OS 52, as defined by computer-readable code or instructions residing in memory 48, is executed by processor architecture 46 during operation of SR device 24. In the illustrated embodiment, OS 52 supports operation of a software application 54, which can be loaded onto SR device 24 to carry-out the below-described functions. In other embodiments, the SR may utilize SR device 24 to launch a plugin program or applet utilizing a conventional web browser to carry-out one or more of the functions described herein. For example, SR device 24 may communicate with ESW server end 26 over a network 56 to program or otherwise cause the entry of specified messaging into a database 58 maintained by ESW server end 26, as discussed in detail below. Consequently, in a manner similar to IP device 22, SR device 24 may be a portable electronic device readily carried on a user's person, such as a smartphone, a wearable device, or a tablet. Alternatively, SR device 24 may be an electronic device of the type commonly located in a person's home, office, or the like, such as a laptop or desktop computer. Multi-device system 20 may further include a display 60, which receives signals from processor architecture 46 and which may or may not be integrated into SR device 24 itself. For example, in embodiments, display 60 may be integrated into SR device 24 as a unitary system or electronic device when device 24 assumes the form of a mobile phone, tablet, laptop computer, or similar electronic device having a dedicated display screen. In other instances, display 60 can assume the form of an independent device, such as a freestanding monitor or television set, which is connected to SR device 24 via a wired or wireless connection.

As illustrated in FIG. 1, network 56 broadly encompasses any number and type of communications networks, systems, or architectures for transmitting data between the various components or nodes of multi-device system 20 utilizing any common protocols and signaling schemes. These components or nodes include, most notably, IP device 22, SR device 24, ESW server end 26, and possibly other devices (e.g., the below-described gatekeeper device 70 and/or third party server end 199). Network 56, then, can include one or more open content delivery networks, Virtual Private Networks (VPNs), the Internet, cellular networks, and various other communications networks implemented in accordance with transmission control protocol/Internet protocol (TCP/IP) architectures or other conventional protocols. In various embodiments, network 56 may further encompass one or more LANs, wide area networks (WANs), and similar wireless networks established within a residual, business, or commercial structure.

Figure 2:
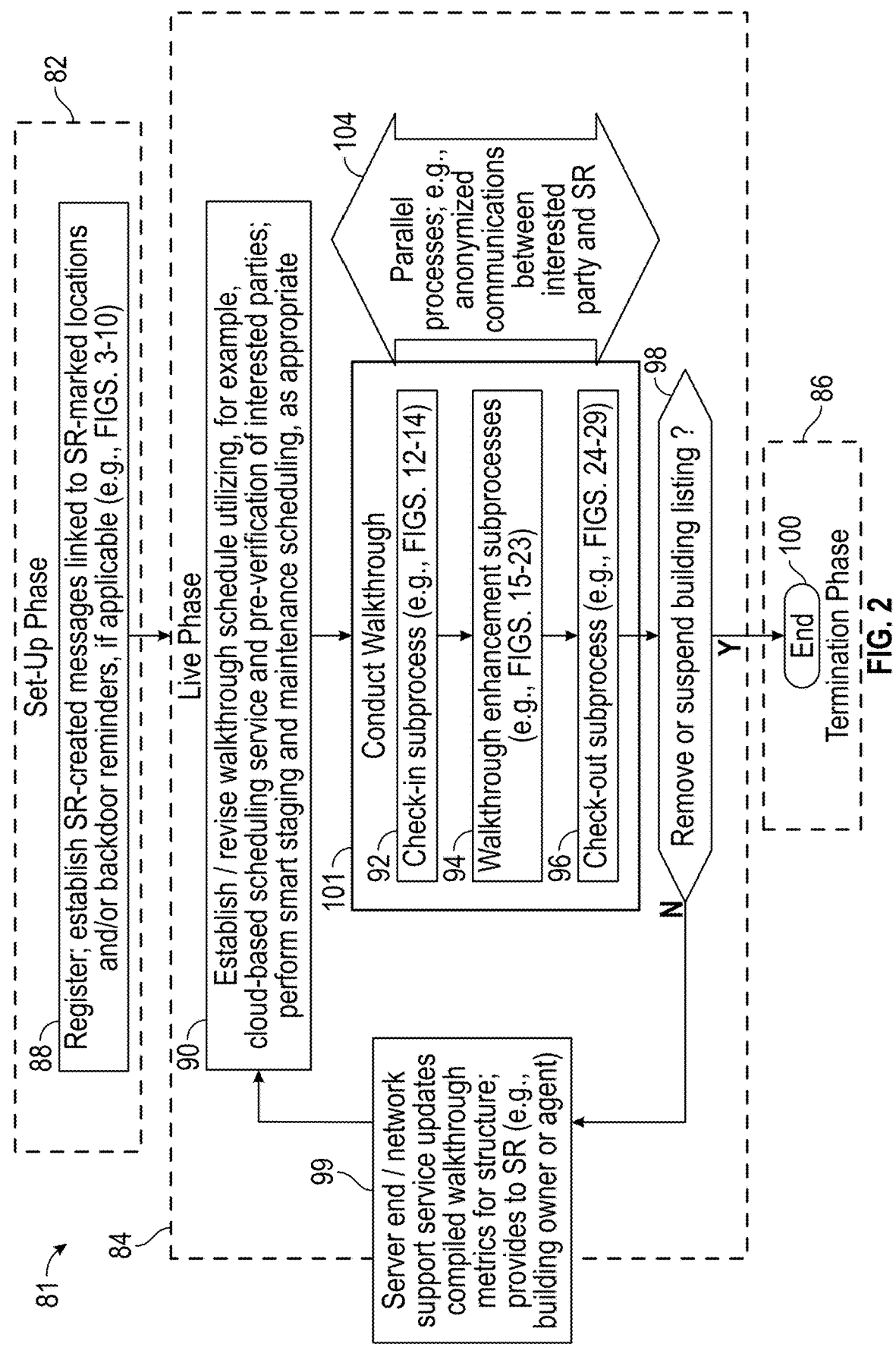
FIG. 2 is a flowchart of an overarching process for enhancing structure walkthroughs, which can be carried-out utilizing various devices included in the multi-device system shown in FIG. 1 and which is depicted in accordance with an example embodiment of the present disclosure.

With continued reference to FIG. 1, ESW server end 26 can be implemented utilizing a cloud computing (distributed server) architecture in embodiments. Whether implemented utilizing a distributed server architecture, a localized server or server farm operating on the Internet, or in some other manner, ESW server end 26 provides software applications 38, 54 access to servers, storage, databases, and other resources supporting operation of software applications 38, 54. In at least some embodiments, application 38 and/or application 54, or certain aspects of these applications, may execute offboard of devices 22, 24 when implemented as SAAS programs. Similarly, in embodiments, application 38 and/or application 54, or certain aspects of these applications, may be plugin programs or applets accessed via devices 22, 24, respectively, utilizing a conventional browser and formatted in accordance with, for example, ActiveX, JAVA, JavaScript, or another standard. Further, in embodiments, ESW server end 26 may provide certain services supporting or facilitating any number of functionalities useful in scheduling and conducting enhanced structure walkthroughs, as described below in connection with STEP 90 of process 81 (FIG. 2). Additionally, in some implementations, certain forms of written electronic communication (e.g., in-app instant messages, text messages, or email communications) may be permitted between IP device 22 and SR device 24 during a defined time window, which may encompass a scheduled structure walkthrough period and, perhaps, may also encompass some amount of time leading up to and/or following the scheduled structure walkthrough. In such embodiments, the written electronic communications may be routed through ESW server end 26 and anonymized to preserve the privacy of the SR (e.g., the structure owner), the interested party, or both. Additional description in this regard is provided below in connection with FIGS. 11 and 19.

As previously indicated, ESW server end 26 may coordinate or help coordinate the scheduling of walkthroughs and possibly other structure-related events. In embodiments, such other structure-related events may include maintenance events or inspections in which gatekeeper 70 (described below) selectively grants access to appropriately-verified home repair personnel, home inspectors, house cleaners, and the like. Contractors and other individuals (herein, "home service providers") may be permitted to follow procedures similar to the below-described check-in and check-out subprocesses, whether utilizing a portable electronic device analogous to IP device 22 or interacting directly with electronic gatekeeper 70, to gain structure access and to resecure the structure upon departure. Generally, then, ESW server end 26 may be described as selectively providing structure access to "users" in embodiments (the term "users" encompassing interested parties and home service providers) via implementations of the below-described check-in subprocess. In the case of home service providers, the home service providers may establish user profiles, including facial pictures or other biometric identifiers, which may be stored in database by ESW server end 26 and then compared to facial pictures or other biometric identifiers recorded by a device during a check-in attempt So too may home service providers schedule time slots for occupying the structure in much the same manner as interested parties schedule time slots for conducting walkthroughs; however, in the case of service providers, such service providers may also be able to set the end time of any time slots for occupying the structure in embodiments rather than having such appointments assigned a fixed duration as in the case of walkthroughs. Accordingly, in embodiments, ESW server end 26 may maintain a scheduling database 68 containing online schedules coordinating structure walkthroughs and other structure-related activities or events, which may facilitate optimal usage of the structure by multiple parties, while decreasing the workload of the SR in scheduling such activities or events. Additional description of manners in which ESW server end 26 may help coordinate scheduling activities for a structure availed for walkthrough is provided below.

In addition to IP device 22 and at least one SR device 24, multi-device system 20 may further include a gatekeeper device or subsystem 70 (hereafter, "electronic gatekeeper 70"). When present, electronic gatekeeper 70 can be any device or group of devices suitable for providing selective physical access to the interior of a structure through at least one entry point into the structure, such as the front door of single family home, a townhome, an apartment, an office building, or the like (herein, the "main entry point"). In various implementations, electronic gatekeeper 70 is a keyless entry system or an electronic door lock including a manual interface (e.g., a keypad or fingerprint sensor) for direct human interaction or manipulation; e.g., as in the case of keypad entry device 72 shown in FIG. 1. Additionally or alternatively, electronic gatekeeper 70 may include a wireless interface for communicating with other wireless devices; e.g., as in the case of deadbolt-type electronic door lock device 74. In this latter case, such wireless communication may occur directly over a short range communication protocol (e.g., BLUETOOTH, ZIGBEE, Z-WAVE, or near field communication (NFC) protocols); or, instead, through a wireless network, including a LAN, a WAN, the Internet, a cellular network, or any combination thereof. The potential for direct, point-to-point or peer-to-peer communication between electronic gatekeeper 70 and IP device 22 is signified in FIG. 1 by arrow 76. In certain instances, gatekeeper 70 may be WiFi-enabled smart-lock, which communicates with a server end (e.g., server end 26 or a third party server end 199) over network 56, as described below. While shown in FIG. 1 and described below, electronic gatekeeper 70 may be omitted in further embodiments of the present disclosure; e.g., as may be the case when a structure is left unlocked, a key is furnished to the interested party in advance, or a person (e.g., the structure owner or a real estate agent) is present to grant an interested party structure access and, perhaps, to resecure the structure following departure of the interested party.

When included within multi-device system 20 and desirably incorporated into one or more of the walkthrough enhancement processes described herein (e.g., the below-described check-in and check-out subprocesses, if practiced), electronic gatekeeper 70 may include or may be associated with one or more cameras, such as a network-connected camera or webcam 79 (which may be integrated into a video doorbell in embodiments). Depending upon its form, electronic gatekeeper 70 may or may not be installed in place of a conventional (purely mechanical) door lock. For example, deadbolt-type electronic door lock 74 may be installed in place of a conventional deadbolt lock. Other types of electronic gatekeeper 70 are also possible and envisioned, however; e.g., in alternative embodiments, gatekeeper 70 may consist of or include a device or lockbox regulating access to a physical key utilized to gain entry to a structure, such as smart lockbox 80 further shown in FIG. 1. In this latter instance, smart lockbox 80 may not be installed in place of door hardware, but rather attached to a structure's door or other infrastructure. Smart lockbox 80 may contain circuitry and processing components suitable for selectively providing access to a key compartment in response to entry of a code into a physical interface of lockbox 80 or, perhaps, in response to provision or a code or other command through a wireless interface; e.g., as may be the case if lockbox 80 is network-enabled or capable of short range wireless (e.g., BLUETOOTH, BLE, ZIGBEE, WiFi DIRECT, Z-WAVE, or NFC) communication with IP device 22.

When an electronic gatekeeper 70 is utilized to carry-out or help carry-out embodiments of the present disclosure, the physical hardware embodying electronic gatekeeper 70 may be furnished by the service maintaining ESW server end 26 or, instead, may be commercially purchased from another source. In this latter regard, electronic gatekeeper 70 can be a commercially-available device or group of devices, such as any one of a number of the many home keyless entry systems presently available on the consumer market One example is the family of WiFi-connected door locks and doorbell cameras marketed by AUGUST, Inc., currently based in San Francisco, Calif. As briefly indicated above, such door locks may communicate over network 56 (FIG. 1) with a dedicated third party server end 199, which functions as an intermediary between ESW server end 26 and gatekeeper 70. Thus, in such embodiments, ESW server end 26 may transmit a request to third party server end 199 to transmit a GRANT ACCESS signal or an UNLOCK command to gatekeeper 70 when server end 26 determines that an interested party carrying IP device 22 (or a home service provider interacting with an analogous device and following a similar check-in process) is appropriately granted access to a tourable structure. In this latter case, electronic gatekeeper 70 may be a pre-installed or a pre-existing device, which cooperates with other components of multi-device system 20 to perform the check-in and/or check-out subprocesses described herein. In other instances, such as when electronic gatekeeper 70 is provided by the service operating ESW server end 26, ESW server end 26 may directly transmit such UNLOCK commands to gatekeeper 70 when appropriate. In other instances in which IP device 22 communicates directly with gatekeeper over a BLUETOOTH or other peer-to-peer connection, an UNLOCK command (whether originating from ESW server end 26, third party server end 199, or another source) may transmitted to gatekeeper 70 through IP device 22 when appropriate.

Electronic gatekeeper 70 is usefully provided with network access to, for example, communicate with ESW server end 26 and/or third party server end 199 over network 56 on an as-needed basis. Accordingly, in many instances, gatekeeper 70 may be connected to the Internet through a wireless LAN or other home network established in a tourable structure. In other embodiments, gatekeeper 70 may access the Internet or other network for communicating with the pertinent network-connected devices (e.g., ESW server end 26 or third party server end 199) through a different route, such using a cellular (e.g., LTE) connection to access the Internet; or, in at least some instances, gatekeeper 70 may connect to network 56 through IP device 22 when brought into proximity of gatekeeper 70. In still other implementations, gatekeeper 70 can operate in an offline mode, whether as a default modality, an exclusive modality, or on an as-needed basis; e.g., should the network connection fail. This may be useful when it is impractical (or undesirably costly) to establish or maintain a LAN within a structure due to, for example, the remote location of the structure or a prolonged vacancy of the structure. In such embodiments, gatekeeper 70 can operate utilizing any suitable technique and prestored information, such as a rolling code or security token. ESW server end 26, operating through IP device 22, may then provide the interested party with the requisite access information (e.g., an alphanumeric or numeric code to gain structure access) if determining that the interested party is appropriately granted access to the tourable structure. Further description of such offline interactions is provided below, as are other possible scenarios in which a gatekeeper is omitted or not utilized in embodiments of the present disclosure.

Examples of Processes And Functionalities for Enhancing Scheduling and Performance of Structure Walkthroughs Referring now to FIG. 2, a flowchart of an overarching multi-phase enhanced structure walkthrough (ESW) process 81 is presented in accordance with an example embodiment of the present disclosure. In the illustrated example, ESW process 81 includes three primary phases performed in support of establishing and conducting enhanced structure walkthroughs. These primary phases include: a SET-UP PHASE 82, an ACTIVE or LIVE PHASE 84, and a TERMINATION PHASE 86. Collectively, PHASES 82, 84, 86 encompass a number of process STEPS 88, 90, 92, 94, 96, 98, 99, 100, with STEPS 92, 94, 96 performed pursuant to a broader enhanced walkthrough subprocess 101. STEPS 88, 90, 92, 94, 96, 98, 99, 100 are described, in turn, below. As illustrated in FIG. 2 and discussed below, ESW process 81 represents but one possible implementation of the present disclosure.

Addressing first SET-UP PHASE 82 of ESW process 81, this phase involves the initial registration of the SR and the tourable structure with an appropriate service or entity, such as the service provider maintaining ESW server end 26. Registration may involve collecting certain information pertaining to the SR, collecting items of information relating to the tourable structure, and gathering other items of information allowing the service provider to generate an online structure listing (if applicable), to provide information accessible to interested parties via application 38 (see, for example, FIG. 21 below), and/or to perform any of the other functions described herein. This information may be collected in various manners including by telephone, online meeting, in-person meeting, the submission of (e.g., digital) forms, and so on. Ideally, however, the submission of such information is streamlined via data entry through a website portal or software application, which can be accessed utilizing a home computer, a smartphone, a tablet, or other network-connected electronic device. In this regard, in certain embodiments, SR convenience is enhanced by allowing registration and information collection utilizing application 54 executing on SR device 24 (FIG. 1). For example, during the registration phase, the SR may be requested to capture and share a current facial image and/or a picture of a government issued identified card, such as a driver's license, which may include a facial image of the SR. Information regarding the building or other structure availed for walk-through may also be gathered. So too may certain customized messages or marked locations be established by the SR for usage in presenting information to or generating reminders for interested parties during walkthroughs based upon IP device location, as described in detail below. Financial information can also be gathered, fees charged, deposits held, or other monetary transactions can occur, depending upon the business model employed. In other approaches, no upfront fees or deposits may be required by ESW server end 26 and, perhaps, no fees may be charged to the SR for utilizing the service in its entirety.

As described above, and as further indicated in FIG. 2 at STEP 88 of ESW process 81, the SR may create a number of customized messages or notifications prior to availing the structure for walkthroughs during LIVE PHASE 84; although it is also possible for the SR to create and edit such customized messages (herein, "SR-created messages") after commencement of LIVE PHASE 84 in implementations. Such notifications may be created utilizing SR device 24 and transmitted over network 56 to ESW server end 26 for storage within SR messaging database 58. Subsequently, the SR-created messages may be selectively transmitted to IP device 22 for presentation (or offered presentation) to the interested party when conducting a walkthrough of the structure. In certain embodiments, the SR-created messaging may be displayed to an interested party on a display screen of IP device 22 when the interested party selects such messages for viewing (and/or audio playback) utilizing, for example, an application executing on IP device 22. In other instances, and as discussed more fully below, such SR-created messages may be automatically presented to an interested party via IP device 22 (e.g., based on a monitored location of device 22) during the walkthrough; or, instead, prompts offering to present such messages may be automatically presented to the interested party via IP device 22 during the walkthrough.

The above-described processes provide the SR with greater control over information sharing with interested parties, as the SR is permitted to create customized messages directing the attention of interested parties to specific features or aspects of the tourable structure and considered particularly relevant by the SR. Such SR-created messages can include text annunciations (that is, typed messages), audio clips, video clips, still imagery, or a combination thereof. In embodiments, the SR-created messaging is then presented (or prompts to present the SR-created messaging are presented) to the interested party via IP device 22 at appropriate junctures during the walkthrough. In certain instances, the presentation of specific SR-created messages (or the offer to present specific SR-created messages) is triggered by the position (and possibly movement characteristics) of IP device 22 during a structure walkthrough. For example, when IP device 22 is brought into the vicinity of a particular location pre-marked by the SR, the SR-created message linked to that particular SR-marked location is presented to the interested party by automatic display or playback on IP device 22. Alternatively, a prompt or offer to present the SR-created message linked to the SR-marked location (rather than the SR-created message itself) may be automatically presented on IP device 22 when IP device 22 is brought into the vicinity of the corresponding location. In further embodiments, other triggers encountered by an interested party and detected by IP device 22 during a walkthrough may be utilized to prompt the presentation or offered presentation of an SR-created message. For example, the presentation or offered presentation of SR-create messages may be triggered when machine readable codes (e.g., quick reference (QR) codes) are scanned utilizing IP device 22 and/or when IP device 22 is brought into proximity of wireless beacons distributed by an SR ahead of the walkthrough, as discussed more fully below.

In one example approach, an SR may create a location-referenced message set during SET-UP PHASE 82 of ESW process 81 by marking a plurality of locations within and/or external to the tourable structure utilizing SR device 24. In such embodiments, the SR may be guided through the following process (e.g., via prompts presented on SR device 24 when assuming the form of a smartphone or other portable device) to compile a location-pinned or a location-referenced message set First (in embodiments in which SR device 24 is a portable electronic device having GPS capabilities and/or capable of measuring the RSSI and/or RTT values of nearby wireless nodes), an SR may walk to a location desirably marked for linkage to an SR-created message, while carrying SR device 24 on his or her person; e.g., if SR device 24 is a smartphone, the SR may carry SR device 24 to a desired location in hand. The SR may then select an option presented on SR device 24 (e.g., as appearing on a graphical user interface (GUI) screen of application 54) to record the location data defining the present position of SR device 24; e.g., captured as any combination of GPS coordinates, RSSI values, and RTT measurements. The SR may also utilize SR device 24 to create one or more messages corresponding to the marked location. In other embodiments, these process steps may be reversed such that an SR creates one or more messages first and subsequently tags or identifies locations within or adjacent the tourable structure, while linking each marked location to a corresponding SR-created message. In either instance, the location data may then be stored in SR messaging database 58 along with the corresponding message (or messages) created by the SR, with such messages including any combination of text, voice recordings, still pictures, and video clips. The SR then repeats this process to create other location-referenced messages, as desired, for other locations throughout (and perhaps outside of) the tourable structure. This information is compiled as a location-reference message set, which is transmitted from SR device 24 to ESW server end 26 for storage in SR message database 58.

Continuing the description from the foregoing paragraph, when an interested party carrying IP device 22 subsequently conducts an enhanced walkthrough of the structure, presentation of different SR-programmed messages may be triggered by the changes in the location of IP device 22, as referenced to the physical locations previously marked by the SR and stored in SR message database 58. Again such physical locations may be defined by GPS coordinates, RSSI measurements of nearby wireless APs or other nodes, RTT measurements, or any other location data previously recorded via SR device 24 when marking each location. For example, during the course of a walkthrough, IP device 22 may repeatedly report its position (e.g., as GPS coordinates supplemented with RSSI or RTT measurements) over network 56 to ESW server end 26. At appropriate junctures, ESW server end 26 may then return command signals over network 56 to IP device 22 instructing device 22 to present a particular SR message (or messages) when the reported position of IP device 22 is within a predetermined distance of a particular SR-marked location contained in the location-referenced message set. The instruction may be transmitted by ESW server end 26, along with the appropriate message or notifications, which IP device 22 may then automatically present or offer to present to the interested party on a display screen of IP device 22. In other instances, IP device 22 may download the SR-created message set prior to a walkthrough and recall SR-created messages from local memory when appropriately presented to the interested party based on the location of IP device 22 within a tourable structure relative to the SR-marked locations, as described below.

FIGS. 3-6 are screenshots of example GUI screens or pages, which are suitably generated on SR device 24 (here, a smartphone) and with which an SR may interact to create a location-referenced message set in various embodiments. In this particular example approach, the SR carries SR device 24 to locations desirably marked for linkage to SR-created messaging when compiling the location-referenced message set in a manner similar to that previously described. Addressing first the example screenshot shown in FIG. 3, a current GUI screen 106 includes a header section 108 containing a text readout of the address of the structure subject to walkthrough, as well as a banner 110 including a text readout indicating the scheduled time of the next upcoming walkthrough. Two user-selection options are further presented below banner 110 enabling user navigation to different screens or pages. These options are presented in tab format, with the "MY BUILDING" tab currently selected (as indicated by underlining) in the present example. Selection of the MY BUILDING tab recalls a GUI page or visual content (as shown in FIG. 3) providing the SR with the selection options of "CREATE LOCATION POP-UP NOTE" (selection option 112) and "CREATE BACKDOOR REMINDER" (selection option 114). Below selection options 112, 114, in lower region 116 of the example GUI screen, the SR-created messages previously created by the SR are displayed in list format. An SR can thus select (e.g., utilizing a cursor device or by touch input when the SR device 24 assumes the form of a smartphone, tablet, or the like) any given SR-created message for viewing and further editing, if the SR desires to add additional messages to, remove messages from, or otherwise edit the SR-created messages contained in the location-referenced message set.

Figure 6:
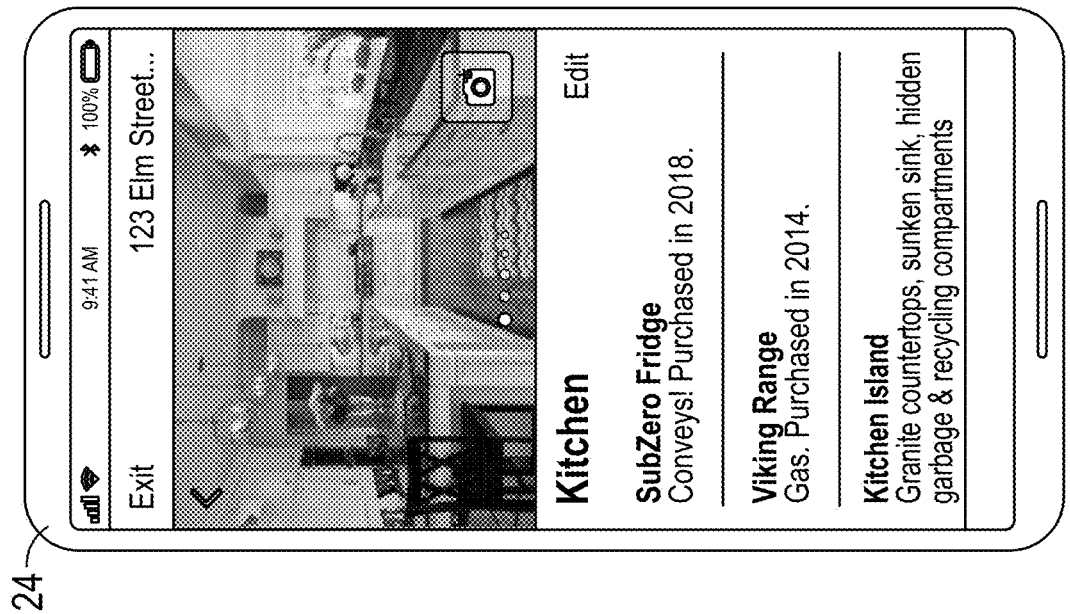
Figure 5:
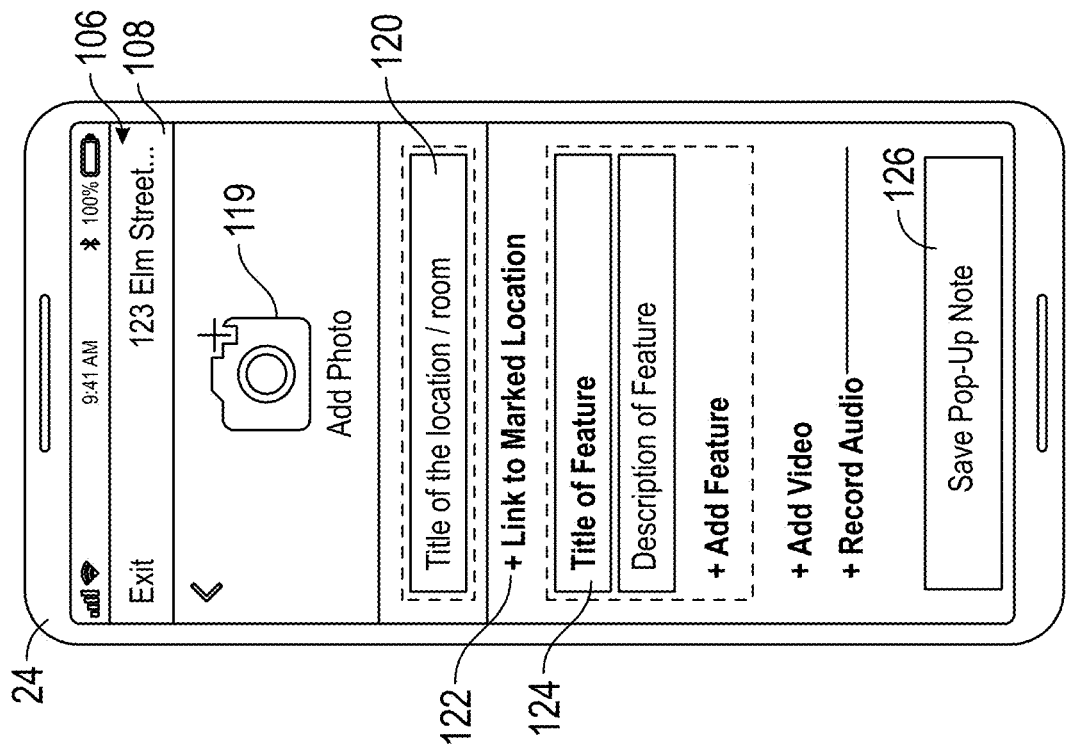

When an SR selects CREATE LOCATION POP-UP NOTE option 112 from the GUI screen shown in FIG. 3, SR device 24 transitions to the example GUI screen shown in FIG. 4. As shown in this drawing figure, a pop-up message or notification 118 is initially presented. Notification 118 contains text describing the manner in which location-referenced notifications can be created for automatic presentation (or automatic offered presentation) to an interested party via an IP device (e.g., IP device 22) during a walk-through. After dismissal of pop-up notification 118, the underlying GUI screen is fully revealed, as shown in FIG. 5. Here, various user-selection options or GUI elements are presented enabling the SR to create messages pertaining to a particular location or room of the structure in question or, perhaps, pertaining to an area or feature external to the structure. As indicated by camera symbol 119, the SR can add one or more pictures for presentation in conjunction with a particular message if desired. When the option represented by symbol 119 is selected, SR device 24 enables the SR to select a picture previously stored on SR device 24 or elsewhere (e.g., in a network-accessible database) or, instead, to capture a new picture of the relevant room, area, or feature utilizing the camera of SR device 24. Selection option 120 further enables the SR to enter a title for the message, such as the name of a particular room, area, or feature to which the message pertains; while selection option 122 enables the SR to link the current message to a particular marked location in the manner further discussed below. Additional GUI selection options, as appearing in lower region 124 of the GUI screen, enable the SR to create notes regarding features or aspects pertaining to the marked locations. In embodiments, the SR may be permitted to create or associate audiovisual content (e.g., video or audio recordings) with the marked locations, as well. After completing this process, the SR selects (e.g., via touch input) the lower virtual button 126 (here entitled, "SAVE POP-UP NOTE") to complete creation of the location-referenced message and return to the previous screen shown in FIG. 3. Further, by way of non-limiting illustration, an example of a fully completed SR-created, location-referenced message corresponding to the kitchen area of a structure is shown in FIG. 6. By repeating the above-described process, the SR may gradually compile a location-referenced data set for the structure in question, which is provided to ESW server end 26 for storage in SR messaging database 58 in the manner previously described.

As noted above, SR selection of option 122 appearing in the example screen of FIG. 5 enables the SR to link the currently-displayed message to a geographical location associated with the structure (within or outside of the structure) and marked by or flagged by the SR. In one approach, in response to SR selection of option 122 via SR device 24, the SR is prompted by an application executing on SR device 24 (e.g., application 54 in FIG. 1) to mark or designate a location in the following manner. Initially, the application executing on SR device 24 instructs the SR to carry device 24 to the particular location the SR desires to mark for linkage to an SR-created message. The SR is then further instructed to indicate (e.g., via selection of an interactive GUI element, such as a virtual button) when the SR has successfully brought SR device 24 to the desired location. If the location is a room or similar area, the SR may be instructed (by prompts generated on SR device 24) to mark a location near the center of the room to decrease the likelihood of cross-confusion in message presentation to an interested party via IP device 22 during ensuing walk-throughs. The SR then provides user input via SR device 24 indicating that SR device 24 has been brought to a location the SR desires to mark for subsequent linking to SR-created messaging. In response to this user input, SR device 24 then captures location data corresponding to its present location, as described below.

In response to receipt of user input indicating that SR device 24 has been brought to a location desirably marked by the SR for linkage to messaging, SR device 24 (specifically, processor architecture 46 executing application 54 on OS 52) captures one or more defining characteristics identifying the newly-marked location (herein, "location data"). Such characteristics will typically, although non-essentially include the current GPS coordinates of SR device 24, as indicated by a GPS module contained in SR device 24. Additionally or alternatively, other identifying characteristics pertaining to the newly-marked location may be captured by SR device 24. Such other identifying information may include, for example, the RSSI values and identities of wireless nodes detected by SR device 24; e.g., as expressed as a Media Access Control (MAC) address or a Data Link Control (DLC) number. Such nodes can be WiFi routers, including nodes within a mesh network installed within home or other residence. As a further possibility, SR device 24 may measure the RTT responses of detected wireless nodes in range of device 24; the term "RTT" referring to the length of time required for the transmission of a signal from SR device 24 (as brought to a newly-marked location) to a wireless node in addition to the length of time until SR device 24 receives an acknowledgment signal from the node in return. SR device 24 may capture a snapshot of location data (e.g., GPS coordinates, detected signal strengths of wireless nodes, RTT measurements of wireless nodes, and/or other location-specific information) in response to receipt of user input indicating that SR device 24 should record or mark the present location of device 24. SR device 24 may record the RSSI and/or RTT measurements along with the network names (e.g., as service set identifiers or SSIDs) as location data in embodiments. Again, other location-specific data (e.g., magnetic field sensing data or the signal strength of wireless beacons distributed about the tourable structure) may also be captured by SR device 24 in embodiments. The location data defining the SR-marked location linked to the currently-created message (see FIG. 5) is captured and forwarded to ESW server end 26 for storage within database 58. SR device 24 provides all such information (the content of the messages and the linked location data) to ESW server end 26 via transmission over network 56 for storage in SR messaging database 58 as a location-referenced message set.

Turning next to FIGS. 7 and 8, there is shown an example GUI screen 128 further selectively generated on SR device 24 in embodiments. An SR may interact with GUI screen 128, as generated on SR device 24, to establish secondary entry point reminders or "backdoor reminders" for the structure subject to walkthrough. GUI screen 128 may be summoned when an SR selects the CREATE BACKDOOR REMINDER option 114 from the example GUI screen 106 shown in FIG. 3. A pop-up notification 130 is shown in FIG. 7 including instructions describing the manner in which the SR may interact with SR device 24 to create one or more secondary entry point reminders. Specifically, in this example scenario, the SR is instructed to carry SR device 24 to the secondary point of entry for which a secondary entry point reminder or backdoor reminder is desirably created, step outside of the secondary entry point by a small distance (e.g., a meter or two), and then select the CREATE REMINDER button 132 appearing at the bottom of GUI screen 128. The SR then indicates when this task has been completed by providing input to SR device 24. In response, SR device 24 records the location data designating the marked position, such as GPS coordinates, detected signal strengths or RTT values of wireless nodes in range of SR device 24, or other such location data, as previously described. This data is provided to ESW server end 26 for storage (e.g., within database 58) and usage in determining the appropriate timepoints at which to generate a backdoor reminder (via IP device 22) as an interested party carrying IP device 22 exits or re-renters the tourable structure through a secondary point of entry.

In other instances, multiple location points may be recorded via SR device 24 to establish each secondary point of entry reminder. For example, in this latter case, SR device 24 may instruct the SR to carry SR device 24 to a first location inside the secondary entry point and to provide user input (as entered into SR device 24) causing SR device 24 to capture a snapshot of location data at that location. After this, SR device 24 may further prompt the user to carry SR device 24 to a second location spaced a short distance (e.g., a meter or two) outside of the secondary entry point (walking directly away from the structure) and then to again provide user input indicating when this is done (causing SR device 24 to capture a snapshot of location data at the second location). The data defining these two marked locations is transmitted by SR device 24, over network 56, and to ESW server end 26 for usage in triggering the generation of secondary entry point or "backdoor" reminders during subsequent walkthroughs. For example, in one approach, ESW server end 26 may monitor the location of an IP device (e.g., IP device 22) during a walkthrough. When IP device 22 is brought into a predetermined proximity of one of the marked locations, ESW server end 26 may then monitor (based upon the location report signals repeatedly received from IP device 22 during the walkthrough) whether IP device 22 is then brought into a predetermined proximity of the second marked location within a predetermined time frame (e.g., within a few seconds). If this is the case, ESW server end 26 may then transmit instructions to IP device 22 to generate a backdoor reminder, as previously described. Otherwise, such a backdoor reminder is not generated. Such an approach may increase the accuracy in triggering such backdoor reminders by, for example, helping to compensate for margins of error in detecting the position of IP device 22. Additionally, such an approach may help prevent the inadvertent generation of backdoor reminders in instances in which an interested party carries IP device 22 by a secondary point of entry, but does not exit the structure through the secondary point of entry; e.g., as may be the case when, for example, the interested party enters the backyard or similar area of single family residence through a side gate.

Continuing the description of an example backdoor reminder creation process in which an SR marks at least one location utilized to trigger the backdoor reminder, and as best shown in FIG. 8 (illustrating example GUI screen 128 after dismissal of pop-up notification 130), a data field 134 may be presented on SR device 24 to allow entry of a title corresponding to a newly-created secondary entry point reminder. Such a title may be, for example, an identifier or nickname of a door (e.g., "side door," "sliding glass door," "patio door," "garage door," "basement outside door," etc.) corresponding to the newly-created secondary entry point reminder. The default textual message or notification for future presentation to the interested party via IP device 22 is further shown in data field 136 and may or may not be editable utilizing SR device 24. When SR device 24 receives touch input from the SR selecting virtual button 132 labeled CREATE REMINDER, SR device 24 then stores the relevant data in local memory for subsequent or immediate transmission to ESW server end 26. The corresponding transmission sent from SR device 24, over network 56, and to ESW server end 26 contains the location data (e.g., GPS coordinates, RSSI and/or RTT measurements of wireless nodes within SR device 24, or other such location data) for the secondary entry point reminder. The location data is stored in a suitable database (e.g., SR messaging database 58) accessible to ESW server end 26. This data is recalled from database 58 when needed and utilized to determine when to generate secondary entry point reminders on an IP device (e.g., IP device 22) during a structure walkthrough by the interested party. Again, such determinations may be made by server end 26 during an ensuing walkthrough based on the previously-marked locations and a monitored position of IP device 22, as repeatedly reported to server end 26 by IP device 22 during the walkthrough. Alternatively, IP device 22 may itself determine when to generate such backdoor reminders if the relevant data from SR messaging database 58 is downloaded to IP device 22 in advance of the walkthrough.

The foregoing has thus provided one example approach in which an SR interacts with SR device 24 to mark locations for reference in triggering the presentation (or the offered presentation) of SR-customized messages pertaining to a tourable structure and/or for reference in triggering the automatic generation of secondary entry point reminders to enhance structure security. In still other instances in which backdoor reminders are desirably generated, it can be determined when an interested party exits or re-enters a tourable structure through a secondary point of entry in a different manner. For example, ESW server end 26 may determine when an interested party exits or re-enters a tourable structure through a secondary point of entry via data provided by a network-connected door sensor (as may be included in a WiFi-enabled alarm system), and then utilize this information (in addition to or in lieu of the above-described position-based processes) to determine when to instruct IP device 22 to generate a backdoor reminder. Generally, then, backdoor reminders are usefully selectively generated when determining that IP device 22 (or the interested party) has exited a tourable structure or re-entered the tourable structure through a secondary point of entry, whether this determination is made based upon the location of IP device relative to SR-marked locations, based upon network-connected door sensors, and/or based upon any other data indicative of usage of a secondary point of entry. Again, in embodiments, ESW server end 26 may render this determination; and, when determining that IP device 22 has been transported through a secondary point of entry (that is, carried outside or brought back into a tourable structure through the secondary point of entry), transmit a signal over network 56 to IP device instructing IP device 22 to generate a backdoor reminder alert or notification reminding the interested party to re-secure the secondary point of entry.

Still other approaches are also possible for marking locations utilized to trigger such SR-created messaging and/or secondary entry point reminders. For example, in another possible approach, a virtual floorplan may be established for the structure in question, georeferenced (e.g., placed in GPS-based framework or other mapped geographical framework), and utilized to mark locations for such purposes. In this latter case, data pertaining to the structure layout and/or the SR may be gathered during SET-UP PHASE 82 of ESW process 81. In certain instances, and by way of non-limiting example, a digital representation of the structure layout or floorplan may be created or otherwise established during this step. If the SR (or other user) is already in possession of a digital copy of the floorplan, the SR can simply furnish the digital copy of the floorplan to ESW server end 26 by, for example, file transmission over network 56. Alternatively, if the SR possesses only a physical copy of the floorplan, the SR may capture a digital picture or scan a digital image of the tangible floorplan for submission to ESW server end 26. Placement of the structure layout in a GPS context may then be accomplished utilizing commercially-available mapping applications or services. In one approach, prompts are generated on SR device 24 instructing the SR to carry SR device 24 to a small number of keys points in the structure (e.g., the front door, main corners, or other locations), capture GPS coordinates and/or other location data (utilizing SR device 24 in the manner previously described) for each key point, and then provide this information to server end 26. Other approaches are also possible for placing the structure layout in a GPS context in further implementations.

In other embodiments, such as when a blueprint or floorplan is non-existent or cannot be located, the interior of the structure may be measured or scanned to compile a digital representation of the floorplan. In this case, the SR may download a dedicated application to SR device 24 (or another device) and then follow specified steps to construct or approximate a structure floorplan. Such an application may employ virtual measuring tools, such as virtual tape measures imposed over a real-world or augmented reality (AR) view through a camera of device 24 (when assuming the form of a tablet or smartphone) to measure interior dimensions of the rooms or other areas of the tourable structure. Various different applications and developer kits containing such virtual measuring tools are commercially available and often function by image processing of a device camera feed to estimate distances between selected spatial points within the camera field of view (FOV). As a still further possibility, a staff member or agent of the service operating ESW server end 26 may be dispatched to the structure to construct the floorplan and, perhaps, to perform other tasks on behalf of the SR. The digital floorplan, once established, may then be georeferenced by, for example, recording the GPS coordinates (e.g., utilizing SR device 24 or another device having GPS capabilities) for selected locations around the structure; e.g., at three or more outer corners of the structure, as previously noted. Such a digital layout may also be usefully included as part of the listing information in embodiments; however, such a digital layout of the tourable structure may not be created or utilized in other implementations of the present disclosure.

Figure 9:
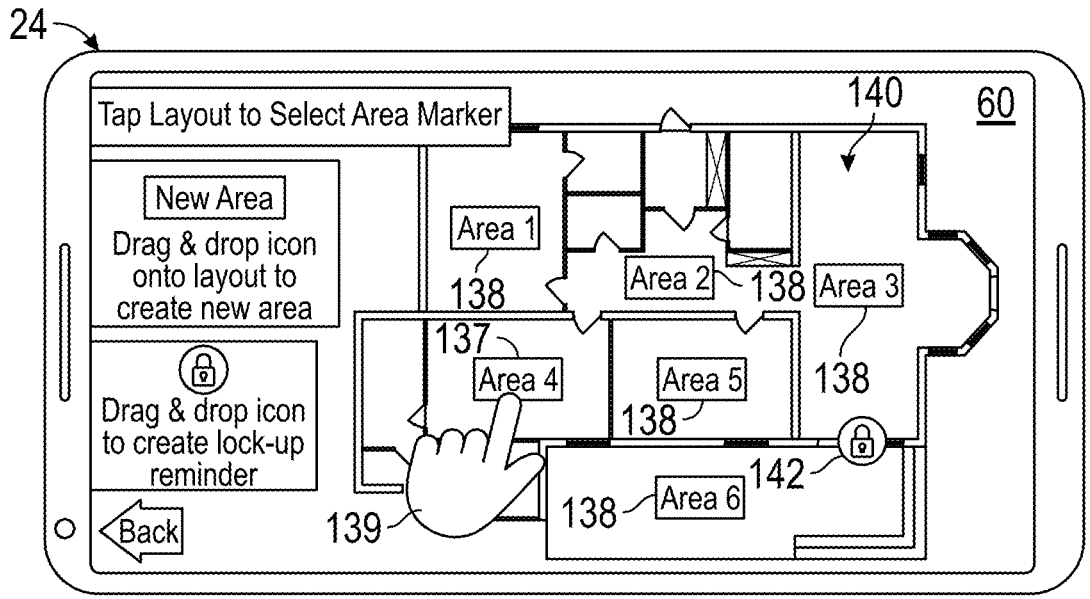
FIGS. 9 and 10 are screenshots generated on an SR device illustrating another manner in which an SR may potentially interact with example GUI elements or screens to create location-referenced messages and secondary entry point reminders, as illustrated in accordance with a second example approach in which the SR marks locations using a digital layout of the structure.

An approach enabling an SR to create location-tagged messaging and backdoor reminders utilizing a digital floor plan of the tourable structure is generally depicted in FIG. 9. This approach may be useful if indoor positioning can be determined with sufficient accuracy utilizing GPS, possibly supplemented with any other type of location data mentioned herein (e.g., RTT or signal strength measurements). In this particular example, a number of virtual buttons or markers 138 may be positioned over a graphical representation 140 of the structure floorplan, which is presented on display 60 of SR device 24. An SR may interact with application 54 via SR device 24 (or another device) to create, delete, and reposition markers 137, 138, as desired. By touching or otherwise selecting a particular marker 137, 138 (indicated in FIG. 9 by touch icon 139), the SR may summon a lower level page (in the menu hierarchy) containing data pertaining to the selected marker. For example, by touching marker 137 labeled "AREA 4" in FIG. 9, the SR may summon the page shown in FIG. 10, which allows entry of area-specific or location data corresponding to the selected area marker. Further, in certain implementations, application 54 may also enable an SR to create other location-specific actions or triggers; e.g., as indicated in the lower left of FIG. 9, the SR may select and position one or more of icons 142 to create backdoor reminders for secondary entry points of the tourable structure, as previously described. This notwithstanding, FIG. 9 is merely a generalized example of one possible manner in which application 54 might appear in one instance, noting that the "look and feel" of application 54 will vary amongst different implementations.

Figure 10:
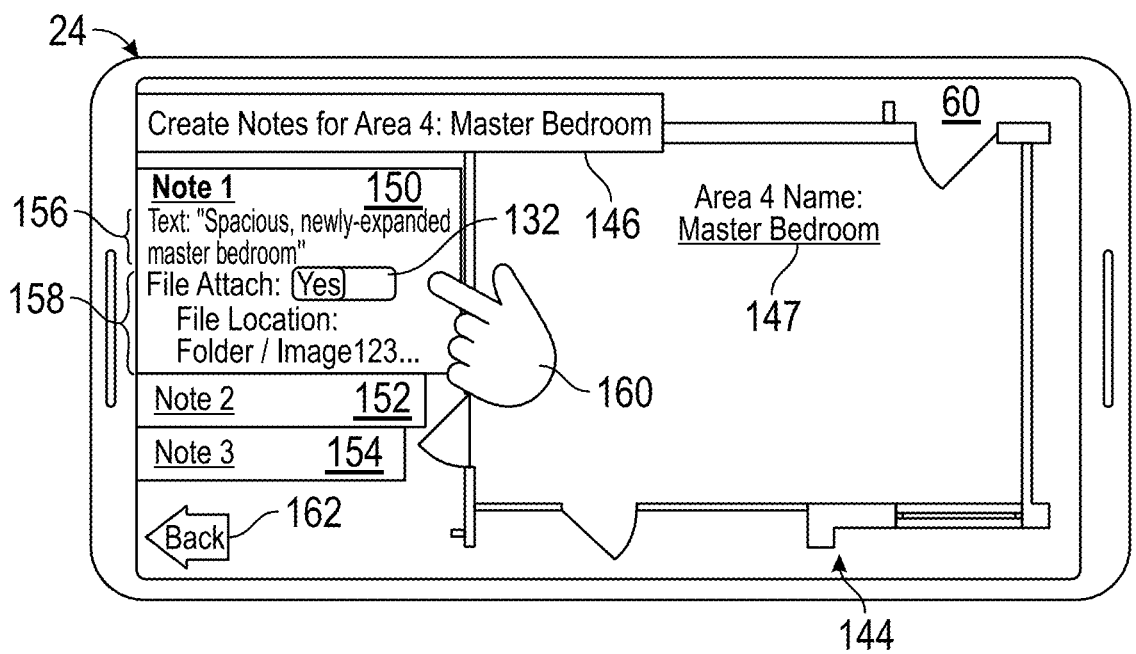

Discussing FIG. 10 in greater detail, there is shown a data entry page or screen 144 for a selected area marker 137. As noted above, selected area marker 137 in this example corresponds to the "AREA 4" marker shown in FIG. 9. By selecting area marker 137, an interactive page or screen is summoned for the selected area, which the SR has entitled "MASTER BEDROOM." This is indicated by top level or marque readout 146 and text readout 147, which an SR may select for editing in any defined manner; e.g., via touch input selecting the text field to summon a virtual keyboard. Several note tabs 150, 152, 154 are also presented on the left side of screen 144 and arranged in a virtually-layered order. Currently, note tab 150 is the forwardmost or frontmost tab and is consequently presented on the left side of display 60 in an unobstructed manner. Note tab 150 allows the SR to create a first note pertaining to AREA 4. For example, a user (the SR) may create a typed message in text field 156, such as "Spacious, newly-expanded master bedroom." To create or modify this typed message, and as indicated by touch icon 160, a user may touch or otherwise select text field 156 to summon a virtual keyboard allowing text input. In certain embodiments, and as indicated by interactive region 158, a user may select whether to attach an associated file, which may be automatically presented or made available for presentation or playback by an interested party in conjunction with display of a message entered into text field 156. Such a file can be, for example, an audio file, a video file, or a still picture related to AREA 4 (Master Bedroom). Finally, the SR may return to the previous level of menu options when desired via selection return arrow 162.

In embodiments, IP device 22 may report its position to ESW server end 26 on a repeated (e.g., real time or near real time) basis during a given walkthrough by transmitting location data, along with any other pertinent data, over network 56 and to ESW server end 26. Upon receiving location data from IP device 22, ESW server end 26 may confer SR messaging database 58 to determine if any previously-created messaging within database 58 corresponds to the current position (or a predicted near future position) of IP device 22. If so determining, server end 26 may then transmit instructions containing the appropriate messaging to IP device 22 for presentation or offered presentation to the interested party via IP device 22. Accordingly, upon receipt of such instructions, IP device 22 then automatically (that is, without requiring user input) presents or offers to present the messaging (whether visual, audible, or both) via IP device 22. In other instances, IP device 22 may directly query database 68 itself during the walkthrough; or the appropriate data set may be downloaded to local memory of IP device 22 ahead of the walkthrough to, for example, reduce network data usage during the walkthrough. Dead reckoning data (e.g., pedometer and compass data) may also be utilized to track the movement of IP device 22 in embodiments to the extent useful, particularly if tracking the position of IP device 22 from a generally known start point (e.g., the main entry point of the tourable structure) and/or if the structure layout is known.

Referring once again to example ESW process 81 shown in FIG. 2, LIVE PHASE 84 generally corresponds to a time period during which the tourable structure is made available for walkthroughs. Accordingly, LIVE PHASE 84 may commence after initially establishing a walkthrough schedule or timetable, as indicated in FIG. 2 at STEP 90. The walkthrough schedule can be established utilizing information stored in scheduling database 68 and maintained by ESW server end 26. The SR may access (e.g., utilizing SR device 24) a calendar application or interface to designate the particular days and times that the tourable structure is available for walkthrough. After this, interested parties may interface with such an online calendar (e.g., as accessed through software application 38 executing on each IP device 22) to reserve particular time slots to conduct walkthroughs, which conform to the time availability windows specified by the SR. When an interested party reserves a time slot, ESW server end 26 may then provide notification to the SR as, for example, an email; as a text message transmitted in SMS, MMS, or RSS format; as an in app message; as a push notification; or as a similar notification sent to SR device 24. Such notifications can also be provided to any third party (e.g., a real estate agent) linked to the SR's account in embodiments, as described further below in connection with FIG. 33.

In other implementations, scheduling may be accomplished via direct communication between an interested party (e.g., utilizing IP device 22) and the SR (e.g., utilizing SR device 24). For example, the interested party may utilize device 22 to enter requests to schedule a walkthrough at a particular day and time; and the SR may then accept, deny, or propose alternative scheduling of the pending walkthrough utilizing SR device 24. If desired, such communications may be routed through ESW server end 26 and anonymized to preserve the privacy of one or both parties, as discussed more fully below. Various other methods for scheduling walkthroughs through communications occurring between the interested party (whether or not utilizing device 22), the SR (whether or not utilizing SR device 24), and ESW server end 26 are equally viable. Scheduling of walkthroughs may further involve, or require, pre-verification of an interested party in some instances. In this regard, it may be desirable to preapprove an interested party in embodiments if, for example, this is stipulated in the structure listing; otherwise requested by the SR (e.g., via interaction with a GUI enabling the SR to set scheduling option preferences); the tourable structure remains furnished; and/or the structure is offered for sale, lease, or rent at a higher price point In other instances, preapproval of the interested party may not be required.

In certain embodiments, ESW process 81 may offer interested parties with an instant or quick access option for scheduling and conducting walkthroughs on a more contemporaneous basis (colloquially, an "on-demand" or "short notice" walkthrough option). For example, in various implementations, an interested party may utilize IP device 22 to request instant access to a tourable structure or to schedule an enhanced walkthrough commencing immediately or in the near future. In such embodiments, IP device 22 may transmit such an instant access or on-demand walkthrough request to ESW server end 26, which may then determine whether this request should be granted. In certain instances, ESW server end 26 may render this determination independently by, for example, checking scheduling database 68 to ensure that granting the short notice scheduling request would not result in a timing conflict with another walkthrough scheduled to occur in the near future, possibly accounting for a brief buffer period or time separation (e.g., on the order of 5 to 30 minutes) between walkthroughs. ESW server end 26 may also store data regarding SR preferences indicating whether such instant access or on-demand scheduling should be permitted. If a short notice request for a walkthrough is permitted, and if ESW server end 26 (particularly processor architecture 143) determines that no such scheduling conflict is indicated in database 68, ESW server end 26 may grant the interested party's short notice scheduling request ESW server end 26 may also transmit a notification to SR device 24 for presentation on device 24 to advise the SR of the newly-scheduled walkthrough. In other embodiments, such an on-demand walkthrough option may not be offered or may be selectively activated by the SR in accordance with user preference settings.

During the above-described process, ESW server end 26 may assign a default or predicted duration to the short notice scheduling request, such as a duration of thirty minutes. In certain cases, ESW server end 26 may also considering shortening the default duration of the walkthrough if doing so would cure any scheduling conflict discovered after checking database 68. For example, in this case, if allotting a reduced time period (e.g., twenty minutes) for the walkthrough would remedy the scheduling conflict (also possibly accounting for a buffer period between walkthroughs of, for example, 15 or 30 minutes), ESW server end 26 may transmit instructions over network 56 to IP device 22 to offer the interested party of such an abbreviated walkthrough. For example, IP device 22 may present the interested party with a text prompt, such as "A 20 MINUTE WALKTHROUGH OPENING BEGINS IN 5 MINUTES. WOULD YOU LIKE TO SCHEDULE THIS WALKTHROUGH?" In response to this prompt, the IP device 22 may then receive user input accepting or declining the offer. In further implementations, ESW server end 26 may not independently determine whether such short notice scheduling requests should be granted, but rather transmit a message to SR device 24 (e.g., as a text message or push notification) querying the SR whether the request should be granted. If then receiving a reply from SR device 24, as transmitted over network 56 to ESW server end 26, indicating that the short notice scheduling request should be granted, ESW server end 26 may then take those steps appropriate to grant the request; e.g., ESW server end 26 may update scheduling database 68 and transmit an acceptance notification to IP device 22 for presentation to the interested party. This may also afford the SR an opportunity to leave the premises, if desired or needed, prior to the walkthrough. The enhanced walkthrough may then progress in the manner described herein (possibly including the below-described check-in subprocess), with any combination of the below-described walkthrough enhancement processes performed during the ensuing walkthrough.

With continued reference to ESW process 81 (FIG. 2), after an interested party schedules a walkthrough of a structure in the above-described manner, the interested party then conducts the walkthrough at the scheduled day and time (SUBPROCESS 101). As outlined previously and as indicated in FIG. 2, a given enhanced walkthrough may entail one or more of the following subprocesses: check-in subprocess 92, any number of walkthrough augmentation or enhancement subprocesses 94, and check-out subprocess 96. Subprocesses 92, 94, 96 are each discussed, in turn, below. Further, as indicated in FIG. 2 by double-headed arrow 104, any number of additional computer-implemented subprocesses may be performed concurrently or in parallel with one or more of subprocesses 92, 94, 96. Such concurrently-performed subprocesses may include, for example, enabling time-limited, contact-anonymized communications or a "live chat" between the interested party and the SR (e.g., via IP device 22 and SR device 24 shown in FIG. 1), possibly while automatically including any agents linked to the accounts of the interested party and SR. Upon conclusion of a given walkthrough, ESW process 81 advances to STEP 98. During STEP 98, it is determined whether the structure listing should be suspended or removed due to, for example, withdrawal of the SR from the service or placement of the structure under contract. If this is the case, ESW process 81 progresses to STEP 100 and terminates. Otherwise, ESW process 81 returns to STEP 90 and the above-described process steps repeat.

ESW server end 26 usefully compiles walkthrough data at various points in time; e.g., following each iteration of STEPS 90, 92, 94, 96, 98, as indicated by STEP 99 of example ESW process 81. IP device 22 and possibly other devices included in multi-device system 20 (e.g., gatekeeper 70) may forward pertinent data to ESW server end 26 during or following walkthrough. Additionally or alternatively, ESW server end 26 may track and compile such data (herein "walkthrough metrics") in real time based on, for example, transmissions received from IP device 22 during a walkthrough, with such transmissions reporting the current location (e.g., GPS coordinates and/or other location data) of IP device 22 at each recorded timepoint during the walkthrough. The walkthrough metrics can include data indicating, for example, the total duration of the walkthrough; the amount of time IP device 22 (and therefore the interested party) spends in different rooms or areas of the structure (e.g., as may be related by a timeline of the path followed by IP device 22 during the walkthrough); data regarding the movements of IP device 22; and/or any survey or feedback data collected from the interested party via IP device 22 during or following the walkthrough, as discussed below. If desired, such data may be aggregated with other walkthrough data of the structure captured during previous walkthroughs and stored at ESW server end 26 for future reference. In embodiments, ESW server end 26 may also share this data with the SR as, for example, a digital copy of a report transmitted to SR device 24 over network 56. Data captured by cameras (included in IP device 22 and/or installed within the tourable structure), microphones (e.g., as contained in any network-connected smart speakers present in the structure), security system motion sensors (if present), or other sensors within the structure during an enhanced walkthrough may also be forwarded to server end 26 for storage as part of a walkthrough record in at least some instances; noting that such information may be temporarily stored for security purposes and will not typically be shared with the SR unless appropriate.

Figure 11:
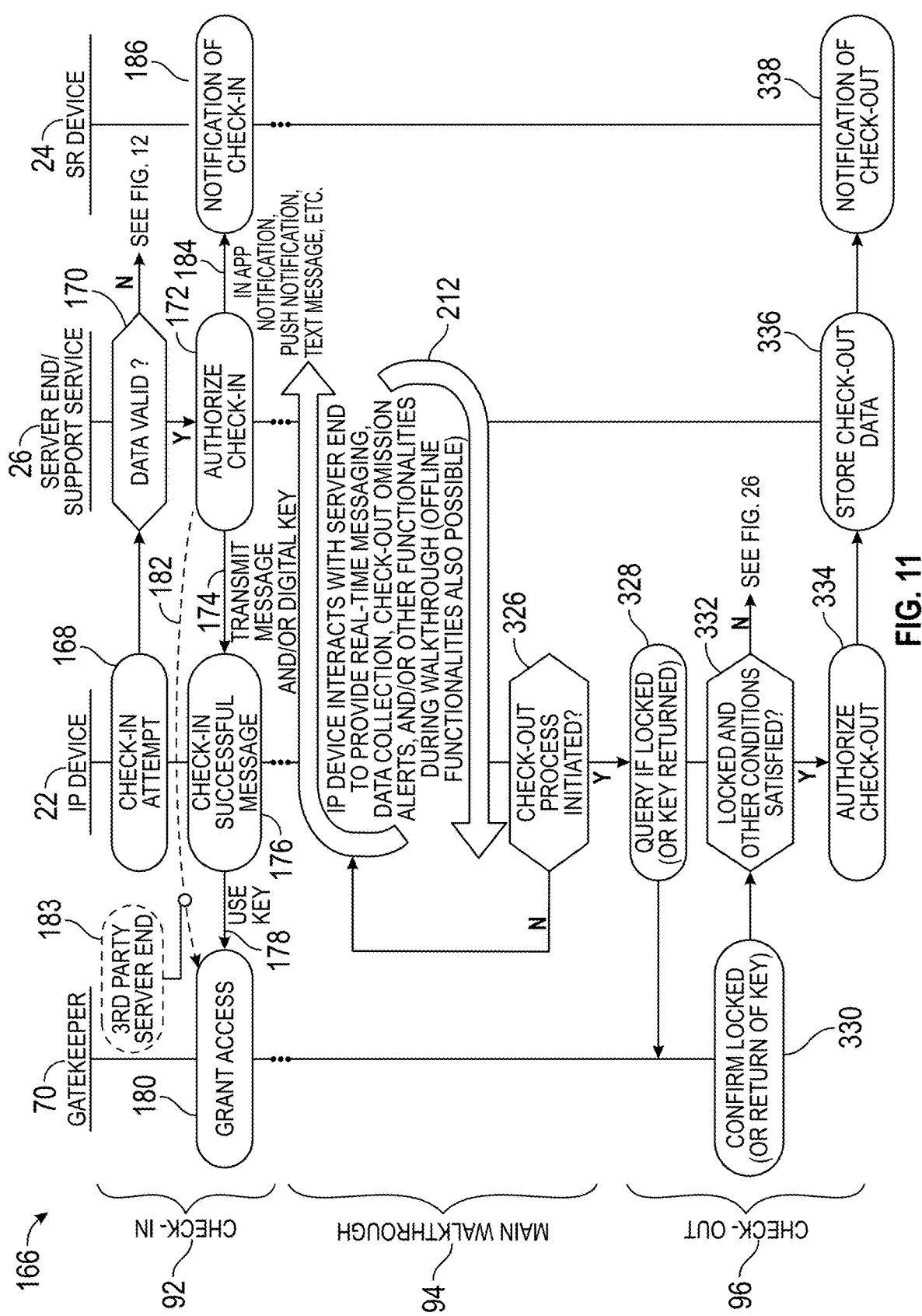
FIG. 11 is a message timing diagram illustrating complementary processes suitably carried-out by a gatekeeper device, an interested party (IP) device, a support or host service including a server end, and/or an SR device during certain example implementations of the present disclosure.

Advancing to FIG. 11, a signal timing diagram 166 depicts one manner in which data exchange may occur between IP device 22, SR device 24, ESW server end 26, and electronic gatekeeper 70 during an example implementation of ESW process 81 (FIG. 2). For consistency with the foregoing description, signal timing diagram 166 (or "process 166") is divided into the three subprocess sections or stages introduced above in conjunction with FIG. 2, namely, a check-in subprocess (STEP 92), a walkthrough augmentation subprocess (STEP 94), and a check-out subprocess (STEP 96). Addressing first FUNCTION 168 occurring during check-in subprocess 92, an interested party initially utilizes IP device 22 to request structure access to initiate a scheduled walkthrough. This request, along with any corresponding information, may be provided directly to electronic gatekeeper 70 (e.g., over a short range, peer-to-peer wireless connection) without requiring action from ESW server end 26. In other embodiments, ESW server end 26 may assess or help assess whether the interested party operating IP device 22 is appropriately granted access to the structure, as indicated in FIG. 11 at FUNCTION 170. If, at FUNCTION 170, ESW server end 26 and/or electronic gatekeeper 70 determines that the interested party is properly granted structure access, process 166 progresses to FUNCTION 172, as described below. Otherwise, structure access is not provided to the interested party; and, perhaps, certain entry denial actions may be taken by ESW server end 26 or by electronic gatekeeper 70, as discussed more fully below in connection with FIG. 12.

In at least some implementations, ESW server end 26 (specifically, processor architecture 143 (FIG. 1) of server end 26) determines whether IP device 22 is appropriately granted structure access based upon information stored in memory, such as information stored in scheduling database 68, taken in conjunction with data collected during the check-in attempt ESW server end 26 may communicate with either IP device 22, electronic gatekeeper 70, third party server end 199, or a combination thereof to provide structure access. In one possible approach, ESW server end 26 may provide a message or a digital key to IP device 22 for usage by the interested party in interacting with gatekeeper 70 to gain structure access, as indicated by transmission symbol 174 in FIG. 11. Alternatively, in a second potential approach, ESW server end 26 may send an UNLOCK command (or cause the transmission of an UNLOCK command by third party server end 199) over network 56 and to gatekeeper 70. In either case, IP device 22 may also generate a visual indication or provide some other form of indicia (e.g., an audio message or other audible alert) notifying the interested party that the check-in subprocess was successful (FUNCTION 176). For example, in embodiments in which server end 26 transmits or causes transmission of an UNLOCK command to gatekeeper 70 when determining that structure access should be granted, ESW server end 26 may also transmit a command to IP device 22 to generate a message conveying to the interested party that the check-in attempt was successful. Substantially concurrently, ESW server end 26 may transmit a command to SR device 24 to present a notification (e.g., as an in-app notification, push notification, or text message) indicating to the SR that structure access has been granted to the interested party (FUNCTIONS 184, 186).

If a digital key was transmitted to IP device 22 during FUNCTION 176 of process 166, this key may then be shared with electronic gatekeeper 70 in some manner (STEP or ACTION 178). In this regard, IP device 22 can send any type of data or code to electronic gatekeeper 70 if a direct, peer-to-peer wireless connection (e.g., a BLUETOOTH® connection) has been established between device 22 and electronic gatekeeper 70. Alternatively, if electronic gatekeeper 70 includes a camera or similar optical sensors for reading machine-decipherable (e.g., QR) codes, a QR code may be produced on the screen of IP device 22. The interested party may then scan the QR code by placement under an optical scanner of electronic gatekeeper 70 to gain access to the structure (FUNCTION 180). As a still further possibility, ESW server end 26 may simply transmit a digital code (e.g., a multi-digit numeric or alphanumeric code) to IP device 22. The numeral or alphanumeric code may be presented to the interested party on the screen of IP device 22, and the interested party may then manually enter the code into a keypad provided on electronic gatekeeper 70 by the interested party to gain structure access. Similarly, in other instances, ESW server end 26 may cause a third party server (e.g., third party server 199 shown in FIG. 1) associated with gatekeeper 70 to transmit such a digital code to IP device 22. In yet other embodiments, gatekeeper 70 or IP device 22 may be equipped with a biometric (e.g., fingerprint) sensor, which can be utilized by the interested party to gain access to the structure providing the other check-in conditions are satisfied.

In at least some implementations, and as briefly noted above, ESW server end 26 may communicate with electronic gatekeeper 70 over network 56 when instructing electronic gatekeeper 70 to provide or deny structure access in response to a check-in attempt by IP device 22 (indicated in FIG. 11 by dashed line 182). In such implementations, pertinent data may be gathered by electronic gatekeeper 70, by IP device 22, or a combination thereof; and forwarded to ESW server end 26 over network 56 for consideration. If authorizing structure access, server end 26 may return a remote GRANT ACCESS signal or UNLOCK command to electronic gatekeeper 70. In other instances, and as indicated above, ESW server end 26 may cause the transmission of such an UNLOCK command by sending a request to a network-connected intermediary server (e.g., third party server 199 shown in FIG. 1) via network 56. In this latter case, such a third party server may function as a securitized interface for interacting with commercially-available gatekeeper devices, such as WiFi-connected smart locks and video doorbells. The request may identify the particular gatekeeper (e.g., a WiFi-connected smart lock) to which an UNLOCK command signal is desirably sent and, perhaps, provide information by which third party server 199 can verify the authenticity of ESW server end 26. If validating the request of ESW server end 26, third party server 199 may then transmit the UNLOCK command to electronic gatekeeper 70 to allow structure access to the interested party. This latter possibility is indicated in FIG. 11 at FUNCTION 183. A more in-depth discussion of one possible check-in subprocess will now be provided in conjunction with FIG. 12.

Figure 12:
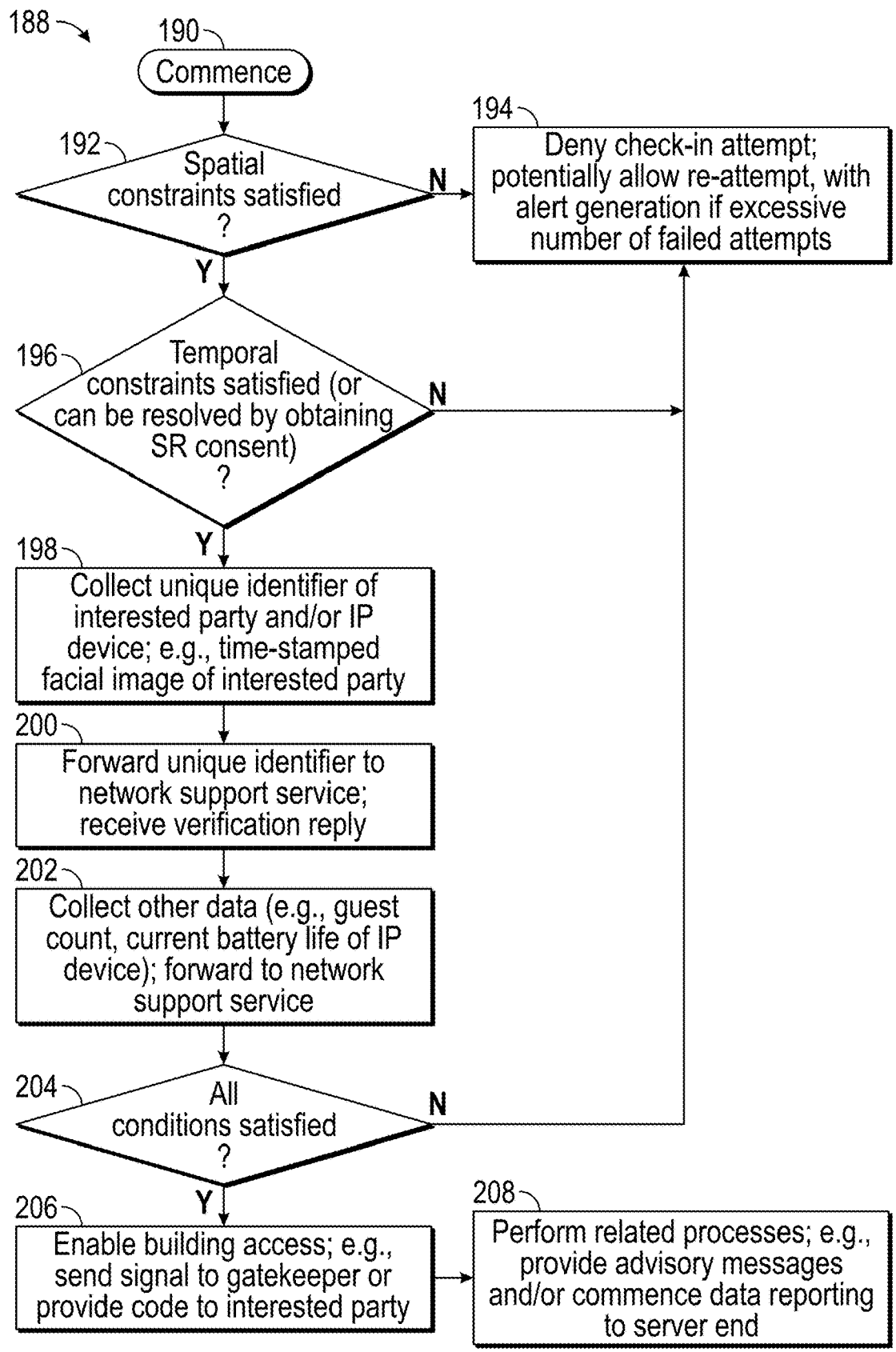
FIG. 12 is a flowchart of an example check-in subprocess, which may be performed during the course of the overarching structure walkthrough process set-forth in FIG. 2 in various embodiments.

Progressing to FIG. 12, a flowchart of an example check-in subprocess 188 is shown. Check-in subprocess may be performed during the course of ESW process 81 (FIG. 2) in embodiments. By way of non-limiting example, the following describes ESW server end 26 as principally performing subprocess 188; however, any combination of electronic gatekeeper 70, ESW server end 26, and IP device 22 may be utilized to implement subprocess 188. Subprocess 188 includes a number of STEPS 190, 192, 194, 196, 198, 200, 202, 204, 206, 208; again noting that, in further embodiments of subprocess 188, certain steps may be omitted, other steps may be performed, or the below-described process steps may be performed in alternative sequences.

After commencing check-in subprocess 188 (STEP 190), ESW server end 26 (or any other device involved in performing the check-in subprocess) determines if certain spatial constraints and temporal constraints are satisfied in favor of granting the interested party structure access. Initially addressing spatial constraints (STEP 192), subprocess 188 may require that IP device 22 and/or the interested party are within a predetermined proximity of the tourable structure. This may be determined by estimating a distance between IP device 22 and electronic gatekeeper 70 (if present), the main entry point of the tourable structure, or a similar location prior to granting structure access. For example, a distance between IP device 22 and a reference point (e.g., gatekeeper 70 or the main entry point of the structure) may be estimated by, for example, locating the approximate position of IP device 22 utilizing GPS, by the detected signal strength or an RTT measurement of gatekeeper 70 detected by IP device 22, or in another manner. ESW server end 26 (or IP device 22) may deem the spatial constraint satisfied if IP device 22 is determined to be located within relatively close proximity of (e.g., with a few meters of) the structure or gatekeeper 70 (if present). In addition to or in lieu of such spatial constraints, satisfaction of temporal constraints (STEP 196) may also be required to gain structure entry in at least some implementations. In this latter regard, ESW server end 26 (or any other device performing the check-in subprocess) may grant structure access to the interested party carrying IP device 22 exclusively within a designated timeframe, such as a timeframe previously scheduled during STEP 90 of LIVE PHASE 84.

Check-in subprocess 188 may thus be time-dependent in nature, as described above, potentially granting structure access to the interested party only if arriving in a particular timeframe or otherwise avoiding conflicts with the actively-updated walkthrough schedule for the tourable structure in question. In certain embodiments, an interested party may be permitted to request an exception if arriving outside of the pre-scheduled time window. For example, if an interested party arrives several minutes before or after a scheduled window, software application 38 executing on IP device 22 may present an option allowing the interested party to request an accommodation from the SR by, for example, submitting such a request via IP device 22. This request may then be transmitted by ESW server end 26 over network 56 to SR device 24. Afterwards, the SR may accept or deny the accommodation request utilizing SR device 24, with electronic gatekeeper 70 notified as appropriate. In other cases, ESW server end 26 may independently whether to grant the interested party's request; e.g., ESW server end 26 may automatically grant requests for earlier entry (e.g., up to five or ten minutes before the scheduled start time of the walkthrough), providing this does not create a conflict with another walkthrough currently in progress.

If either the spatial constraints or the temporal constraints are not satisfied in the example of FIG. 12, subprocess 188 moves to STEP 194 and denies the check-in attempt. Rationale behind denying the check-in attempt may or may not be presented on display screen 30 of IP device 22. The present iteration of subprocess 188 then terminates, with electronic gatekeeper 70 preventing structure access. If desired, the interested party may be permitted to re-attempt check-in. If unsuccessfully attempting the check-in subprocess a predetermined number of times, a notification or warning may be generated. For example, in this instance, a notification is usefully transmitted to IP device 22 indicating the reason or reasons underlying the failed check-in attempts to afford the interested party an opportunity to consider this information. This may be useful when, for example, the interested party has inadvertently confused the scheduled walkthrough day or time. A warning may also be generated that certain countermeasures may be taken should an interested party continue efforts to gain structure access after a certain number of failed attempts. For example, if ESW server end 26 detects repeated attempts to gain structure access after an allotted number of failed check-in attempts, or detects other suspicious activity associated with the check-in subprocess, ESW server end 26 may itself perform and/or transmit instructions to electronic gatekeeper 70, IP device 22, or both to perform one or more of actions. Such actions can include recording camera feeds or other data captured by IP device 22, gatekeeper 70, network-connected security cameras (if any), or another device. Additionally or alternatively, electronic gatekeeper 70 may be instructed to generate an alarm if capable. Similarly, any structure (e.g., building) alarm system may be instructed to alert if the structure is equipped with a network-connected alarm. Further, in certain instances, dispatch of the local police or other authorities may be requested. Such actions may be tiered in severity such that, for example, local authorities are only alerted if the other countermeasures do not have the desired deterrent effect.

If determining that the established spatial and temporal constraints are satisfied during STEPS 192, 196 of subprocess 188, the device or system performing subprocess 188 (e.g., processor architecture 145 of ESW server end 26 and/or processor architecture 145 of electronic gatekeeper 70) continues to STEP 198. During STEP 198, the identity of the interested party, the identity of IP device 22, or both the identity of the interested party and of IP device 22 may be confirmed or authenticated. In embodiments, information uniquely identifying IP device 22 (e.g., a previously-shared secret or token) may be provided to the device or system performing subprocess 188 during STEP 198 (FIG. 12); and, after appropriate authorization of IP device 22, this may be considered sufficient to establish the presence of the interested party, providing that the interested party has not reported IP device 22 as stolen or lost Various embodiments may make use of a token-based authentication standard (e.g., OAuth 2.0 or another open access standard) or stored secrets (e.g., cookies) previously established between IP device 22 and ESW server end 26 may be utilized to authenticate the identity of IP device 22.

In addition to or in lieu of confirming the authenticity of IP device 22, biometric information uniquely identifying the interested party may be collected during STEP OR FUNCTION 168. Such data may be collected utilizing IP device 22 or, perhaps, utilizing electronic gatekeeper 70 in implementations. As a specific example, IP device 22 (when located within a predetermined proximity of electronic gatekeeper 70 or the tourable structure) may utilize a camera to capture a time-stamped facial image of the interested party, which is then processed to confirm the identity of the interested party. In one specific example, and as indicated in FIG. 12 at STEP 200, electronic gatekeeper 70 or IP device 22 is utilized to capture such a facial image, which is then transmitted to processor architecture 145 of ESW server end 26. Again, depth measurement data of the interested party's face may also be captured in embodiments when this capability is available. ESW server end 26 then compares the facial image to a previously-stored image (e.g., obtained during STEP 88 of ESW process 81) of the interested party utilizing any known image comparison technique or analysis tool, such as scale invariant feature transform, speed up robust feature, robust independent elementary features, oriented FAST, rotated BRIEF, or the like. In other embodiments, a video clip of the interested party may be captured and/or other biometric data (e.g., a fingerprint or voice sample) of the interested party may be entered via electronic gatekeeper 70 or IP device 22 for identity validation purposes, whether identity validation is performed by ESW server end 26, IP device 22, gatekeeper 70, or a combination thereof. In this latter regard, for example, a video clip of the interested party pronouncing a word or phrase (e.g., the interested party's first and last name) may be captured by IP device 22 and forward to ESW server end 26 for facial matching and, perhaps, for voice matching comparisons with profile information stored in a memory accessible to server end 26.

In certain embodiments, structure access may be granted after confirming the identity of the interested party, of IP device 22, or both. In other instances, additional information may also be collected during STEP 172 of check-in subprocess 188 (FIG. 12), with an interested party prompted to enter any such additional information via electronic gatekeeper 70 or IP device 22. For example, an interested party may be required to report whether any additional guests will accompany the interested party during the walkthrough. Pictures, a video clip, or other biometric data of the additional guests (if present) may also be captured in embodiments and, perhaps, transmitted to and stored by ESW server end 26 in one of databases 66, 68; although this may not be required in other embodiments. Additionally, if desired, an interested party may be prompted to confirm that the interested party has read or otherwise been advised of certain rules or conditions prior to commencing the structure walkthrough. This information may include policies regarding theft or breakage occurring during the walkthrough, or policies regarding the capture and storage of data (e.g., video, audio, or location data) utilizing IP device 22 or other recording devices within the structure during the walkthrough. The interested party may also be reminded of the duration of the scheduled walkthrough and advised not to power down IP device 22 until after completion of the walkthrough.

The satisfaction of still other conditions may be required to gain structure access pursuant to check-in subprocess 188 in embodiments. For example, as further indicated in STEP 202 of subprocess 188, the current charge state or battery level of IP device 22 may be required to surpass a certain threshold value. Structure access may be denied to the interested party if the current battery level of IP device 22 is less than the predetermined threshold value, which may be expressed in terms of battery life percentage (e.g., 10% of the full battery capacity) or remaining operational time of IP device 22 until shutdown (absent charging). In one potential approach, the remaining battery life duration of IP device 22 may be estimated and compared to the scheduled duration of the walkthrough. If the estimated duration of the battery life of IP device 22 (as reported to ESW server end 26 over network 56 by IP device 22) is insufficient to cover the scheduled duration of the walkthrough (and perhaps some additional time buffer), structure access may be denied. In embodiments, this determination may be rendered by ESW server end 26 after receiving data over network 56 from IP device 22 indicating the current charge level of IP device 22. Such battery life-dependent requirements may be enforced, in embodiments, to ensure that IP device 22 has sufficient battery life to remain operational for the duration of the walkthrough to perform the below-described functions related to check-out, check-out omission alerts, and the like (when such functions are desirably performed). Further, in such instances, the interested party may be advised such battery life requirements ahead of the walkthrough; e.g., notifications may be generated on IP device 22 reminding the interested party to fully charge IP device 22 before the scheduled start time of the walkthrough. In other embodiments, such minimum battery life or charge state requirements may not be considered when determining whether to grant the interested party structure access during the check-in subprocess. Generally, then, the satisfaction of all of the above-described conditions, any subset of the above-described conditions, or other conditions may be required to gain structure entry during the check-in process.

If the above-described check-in conditions are satisfied, as determined at STEP 204 of subprocess 188, the device or devices conducting check-in subprocess 188 (e.g., ESW server end 26) may take the appropriate actions to provide structure access to the interested party (STEP 206). Otherwise, the entity or device conducting subprocess 188 may progress to STEP 194 and deny the current check-in attempt In embodiments in which electronic gatekeeper 70 carries-out subprocess 188, whether in whole or in part, electronic gatekeeper 70 may simply provide structure access at STEP 206; e.g., by allowing access to a physical key or by automatically unlocking the main entry point, such as the front door of the structure. Alternatively, in embodiments in which ESW server end 26 performs subprocess 188, ESW support service/server end 26 may transmit or cause the transmission of an appropriate command to electronic gatekeeper 70 instructing electronic gatekeeper 70 to provide structure access; e.g., by enabling access to a mechanical key, by disengaging an electromechanical deadbolt, or by performing another action enabling the interested party to now enter the tourable structure. As another possibility, ESW server end 26 may transmit a code (e.g., or other means) to IP device 22 for manual entry into electronic gatekeeper 70 by the interested party to gain structure access.

In instances in which the structure is equipped with a third party commercial gatekeeper device, such as a smart lock communicating over WiFi or Bluetooth, ESW server end 26 may transmit a signal over network 56 to a third party server end (represented in FIG. 1 by box 199), which serves as an interface or administrator for gatekeeper devices marketed by a particular company. Third party server 199 may then transmit an UNLOCK signal over network 56 and to gatekeeper 70 to provide the interested party with access to the structure. The UNLOCK signal may be transmitted directly to gatekeeper 70 over a local WiFi connection bypassing IP device 22 in embodiments; or instead, may be transmitted to gatekeeper 70 over a short range connection (e.g., a BLUETOOTH or NFC connection) through IP device 22. ESW server end 26 may also perform other related processes after granting structure access to the interested party (STEP 208). Such action may include commencing recording location data and other any other data gathered by IP device 22, providing advisory messages to IP device 22 for presentation to the interested party ahead of the walkthrough, sending a notification to SR device 24 (possibly along with the newly-captured facial picture of the interested party) informing the SR that structure access has been granted to the interested party, or performing other any other desired actions, with further examples described below.

As noted above, embodiments of gatekeeper 70 can operate in the absence of a persistent or continuous network connection. For example, in certain instances, gatekeeper 70 may be installed on the door of a structure lacking a LAN or other home network; or a structure including such network, but which is not presently active or connected to the Internet. This may be the case when, for example, the tourable structure is vacant or when the tourable structure is remotely located. Also, in such a scenario, gatekeeper 70 may lack a cellular connection or other alternative means for gaining network access. In such instances, gatekeeper 70 can still function to provide the check-in and check-out functionalities described herein by implementing certain workaround solutions. For example, gatekeeper 70 can selectively provide structure access utilizing a code-based approach. In one such approach, gatekeeper 70 may store one or a small number of predetermined access codes; or gatekeeper 70 may generate such access codes utilizing, for example, a rolling code technique. During check-in, gatekeeper 70 can determine whether to grant the interested party access based upon entry of such a code and, specifically, whether the code entry properly matches the prestored or newly-generated access code. Again, such a code entry attempt can take place over a wireless connection between IP device 22 and gatekeeper 70 (when established via BLUETOOTH, NFC, or a similar short range connection), via visual means (e.g., scanning of a QR code or other machine-readable code on generated on the screen of IP device 22, providing gatekeeper 70 is so capable), or via manual entry of the code on a keypad or other physical interface of gatekeeper 70 (in which case, the access code may be furnished by ESW server end 26 to IP device 22 for viewing and entry to the interested party when appropriate).

In other instances in which gatekeeper 70 lacks a persistent network connection, gatekeeper 70 may instead access network 56 through IP device 22 during the check-in subprocess (and possibly also during the below-described check-out subprocess). Such an approach may entail initially establishing a wireless connection between gatekeeper 70 and IP device 22 when brought into proximity of gatekeeper 70. For example, gatekeeper 70 and IP device 22 may be paired over a BLUETOOTH connection or another short range wireless connection if needed, with software application 38 automatically establishing pairing or guiding the interested party through the pairing process. If then successfully completing the check-in subprocess, ESW server end 26 may transmit the appropriate access code to gatekeeper 70 through network 56 and through IP device 22 to provide structure access. In this case, ESW server end 26 may encrypt the access code utilizing a chosen encryption approach, with gatekeeper 70 then decrypting the code-containing message upon receipt thereof.

Providing the above-described conditions for check-in have been satisfied, the device or devices conducting check-in subprocess 188 (FIG. 12) may further perform one or more additional steps after (or shortly before) granting structure access, as indicated at STEP 178 of subprocess 188. In certain instances, and as previously noted, advisory messages may be transmitted to IP device 22 for automatic presentation to the interested party. Additionally or alternatively, processes to be performed continually or iteratively during the ensuing enhanced structure walkthrough, such as the below-described location data reporting processes, may now commence. Check-in subprocess 188 concludes after this, thereby returning the present description to FUNCTION 212 of process 166 (FIG. 11). Accordingly, and as indicated in FIG. 11 at FUNCTION 212, any number of online or offline functionalities may be performed by IP device 22 and/or ESW server end 26 during the ensuing structure walkthrough until (and possibly for some time period following) initiation of the check-out subprocess at FUNCTION 214.

FIGS. 13 and 14 are screenshots of an example GUI screen 216 generated on IP device 22 with which an interested party may interact during check-in subprocess 188

(FIG. 12). In this example, three items or tasks to be completed by the interested party are presented adjacent icons 218, 220, 222 appearing on GUI screen 216. These items set-out tasks for the interested party to perform utilizing IP device 22 prior to gaining structure entry. The first task (adjacent icon 218) is listed as: "Arrive during your scheduled time window." This task is automatically deemed complete (as denoted by the checkmark graphic within icon 218 in FIG. 13) when the interested party brings IP device 22 into proximity of the tourable structure during the timeframe scheduled for the walkthrough. To this end, IP device 22 (more specifically, processor architecture 34 executing application 38 on OS 40), ESW server end 26, or a combination thereof may compare the GPS coordinates of IP device 22 to a known location associated with the tourable structure (e.g., the general location of the main entry point, or the general centerpoint of the structure or property) to determine if IP device 22 is brought into sufficient proximity of the known location. Additionally or alternatively, the detected signal strength or an RTT ping of gatekeeper 70 (or another wireless node associated with the structure) may be considered in determining whether IP device 22 has been brought into sufficient proximity of the tourable structure to satisfy this task item.

The current time of day may also be compared to the scheduled time for the walkthrough stored in scheduling database 68 to determine if the interested party has arrived within the scheduled walkthrough time window. The time condition may be satisfied if the interested party arrives within the scheduled walkthrough time window or, perhaps, a few minutes (e.g., five or ten minutes) beforehand. The first task is deemed complete if both these criteria are satisfied, with a corresponding checkmark graphic shown in icon 218. Again, in embodiments, ESW server end 26 may render this determination based upon location reporting signals transmitted from IP device 22 to ESW server end 26 and other data inputs, including the current time of day and the scheduling data stored in database 68; and transmit instructions to IP device 22 to update GUI screen 216 to indicate that the first task item has been completed if and when determining that the above-described criteria have been met. As noted above, in certain embodiments, steps may be taken to potentially accommodate the interested party and permit the check-in process to continue if an interested arrives substantially outside of the time window. In such embodiments, ESW server end 26 may independently determine whether to accommodate such a modified walkthrough scheduled (e.g., based on SR preference settings and whether accommodation would result in a scheduling conflict), or ESW server end 26 may query the SR through SR device 24 to determine whether to accommodate such a scheduling modification.

The second task item (adjacent icon 220 on example GUI screen 216) prompts the interested party to capture a picture of his or her face at a convenient location exterior to the tourable structure, such as outside the front door of the tourable structure. When selecting icon 220 associated with this task, the camera function of IP device 22 is summoned. A facial picture is then captured of interested party, in this example utilizing IP device 22. IP device 22 transmits the facial picture to ESW server end 26. IP device 22 may also transmit other related data, as appropriate, such as a timestamp, location data, and/or facial depth measurements (if IP device 22 is capable of capturing such measurements utilizing stereoscopic cameras, radar, or other such sensors integrated into IP device 22). Upon receipt of this data, ESW server end 26 compares this newly-captured picture and any associated data to the facial picture (and any other pertinent information, such as facial depth measurements) stored in database 68 within a user profile created for the interested party. If an adequate match is found, the second task item is deemed complete. IP device 22 may await a confirmation transmission from ESW server end 26 over network 56 indicating that the user picture has been verified and then generate a checkmark graphic within icon 220 (as shown in FIG. 14) in response to receipt of such a confirmation transmission. In other instances, IP device 22 may prompt the interested party to capture a short video clip or live image of the interested party stating his or her name. This video clip may then be provided to ESW server end 26 for comparison to a previously stored video clip to determine whether the provided imagery matches a similar video clip captured when registering the interested party, as recalled from a user profile database (e.g., included in any one of databases 68 maintained by the ESW server end 26). Additionally, voice matching can be performed in embodiments in which such a video clip is captured, if so desired. In other embodiments, such a facial recognition process may be performed by IP device 22 itself or such a facial recognition process may not be performed. In the latter instance, other identifying information (e.g., a unique identifier of IP device 22) may be considered sufficient verification of the interested party to satisfy the task item associated with icon 220. However, even in these later examples, the facial picture of the interested party is usefully (although non-essentially) transmitted to ESW server end 26 for storage in database 68 as part of the walkthrough record, which can later be recalled and examined if, for example, an issue should arise related to the tourable structure following the walkthrough.

Finally, to complete the task item adjacent icon 222, the interested party is presented with a small number of questions to answer. Specifically, when the interested party selects GUI icon 222 from GUI screen 216 shown in FIG. 13, certain typed questions are presented to the interested party on the screen of IP device 22. Such questions may pertain to whether the interested party is alone or accompanied by guests. If the interested party is accompanied by guests, IP device 22 may present questions regarding the number and/or identity of the guests. The interested party may also be asked to confirm having read and understood legal disclaimers or other advisory information to complete task item 222 and gain potential admittance to the structure. Further, in some instances in which pathogens and infectious disease are prevalent within the area and of concern, questions may be asked of the interested party regarding whether the interested party (or any guests accompanying the interested party) has been diagnosed with a particular disease, such as COVID-19. The interested party may also be asked whether he or she (or any guests) have experienced a fever or any other symptoms of the disease within a particular timeframe, such as within the past two weeks. Various other questions may also be asked to better evaluate the potential likelihood that the interested party (or any guests) may currently be carrying any such pathogens, with structure access potentially denied if determining there is a high likelihood that the interested party is currently carrying such pathogens. Similarly, if IP device 22, gatekeeper 70, or another network-connected device in communication with ESW server end 26 has such capabilities, the temperature of the interested party may be taken with structure access potentially denied if the body temperature of the interested party is excessively high.

In still further embodiments, during the question-answer phase of the example check-in subprocess, the interested party may be required to verify that IP device 22 has been recently charged; or IP device 22 may provide data to ESW server end 26 regarding the current charge state or battery level of IP device 22, which ESW server end 26 may then consider in determining whether to grant structure access. In particular, and as previously indicated IP device 22 may transmit data over network 56 to ESW server end 26 estimating a current charge state of IP device 22, whether expressed as a charge percentage level or a time remaining battery estimate (e.g., an estimated number of minutes IP device 22 will remain powered up given its current charge stage and the power requirements to support usage of PI device 22 during the walkthrough). ESW server end 26 may then assess the current charge state of IP device 22 is sufficient to permit IP device 22 to remain powered-up and functional during the ensuing walkthrough and, perhaps, for some time duration thereafter. If determining this to be the case, ESW server end 26 may determine this task item to be completed and take actions to grant the interested party structure access. Otherwise, ESW server end 26 may deny the current check-in attempt.

After all three tasks items adjacent icons 218, 220, 222 have been properly completed, IP device 22 may generate a success notification on the screen of IP device 22, such as that shown in the lower region of FIG. 14. Additionally, a selection option 224 may appear, which the interested party can then select (e.g., via touch input) to gain access to the structure. In this particular example, the tourable structure is equipped with a gatekeeper device (e.g., gatekeeper 70 shown in FIG. 1). For example, by touching (or otherwise selecting) virtual button or selection option 224, the interested party may cause an UNLOCK command to be transmitted to gatekeeper 70. In other instances, the UNLOCK command may be automatically generated after the third task item described above is deemed complete. Such an UNLOCK command may be transmitted to gatekeeper 70 over network 56 from ESW server end 26 or from third party server 199 (in response to a request by ESW server end 26 issued after determining that the interested party is appropriately granted access to the structure in question), as described above. In certain instances, such an UNLOCK command may be transmitted from ESW server end 26 or third party server 199 through IP device 22, which may communicate directly with gatekeeper 70 over BLUETOOTH, NFC, ZIGBEE, or another short range wireless connection, as previously mentioned. In other embodiments, ESW server end 26 may provide the interested party with structure access via IP device 22 in one of the other manners described above.

Figure 15:
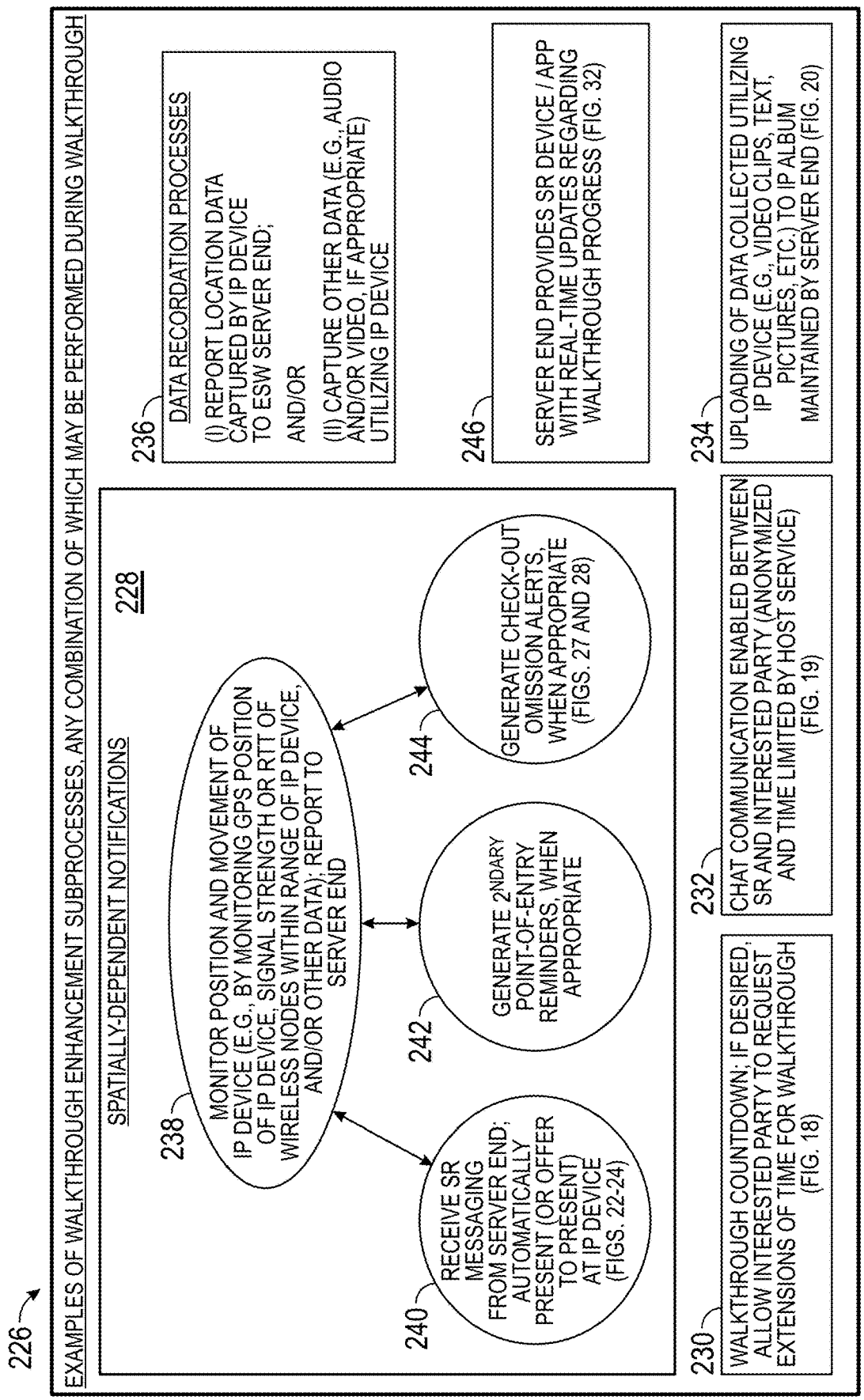
FIG. 15 is a schematic presenting multiple example subprocesses, any combination of which may be conducted by the multi-device system shown in FIG. 1 during the course of an enhanced structure walkthrough.

Referring next to FIG. 15, several example walkthrough enhancement subprocesses 226 are shown, any combination of which can be performed during FUNCTION 212 of process 166 (also corresponding to STEP 94 of ESW process 81 shown in FIG. 2). Addressing first subprocess grouping 228, multi-device system 20 (particularly, IP device 22, SR device 24, and/or ESW server end 26 communicating over network 56) can perform one or more location-dependent actions during a walkthrough; that is, actions trigged in response to movement or changes in the positioning of IP device 22 relative to (within or external to) the tourable structure. When performed, execution of the location-dependent actions may involve monitoring the position and movement of IP device 22 relative to the tourable structure. Such location data may be reported to ESW server end 26 on an iterative (e.g., real-time) basis in embodiments, with ESW server end 26 then sending instructions to IP device 22 to generate location-dependent notifications corresponding to FUNCTIONS 240, 242, 244, when appropriate. The position and movement of IP device 22 may be monitored during a structure walkthrough utilizing any suitable location system, algorithm, and methodology. The position and movement of IP device 22 will often be monitored by device 22 itself and is consequently principally described below as such; however, additional data regarding position and movement of IP device 22 can also be captured by other network-connected devices (e.g., cameras and motion sensors) within or adjacent the tourable structure in embodiments, providing such data is reported to ESW server end 26 for usage in tracking the position of IP device 22. In this regard, sounds captured by any active, network-connected devices containing microphones, such as smart speakers, can be utilized to assist in discerning the position and/or movement of IP device 22 in embodiments. IP device 22 may repeatedly report its position to ESW server end 26 during the walkthrough as position report signals, which contain a time-stamped snapshot of location data and may also contain other data useful in performing the functions described herein.

To improve the accuracy of indoor position tracking in various embodiments, IP device positioning may be tracked utilizing GPS coordinates supplemented with RSSI values and/or RTT responses from wireless nodes in range of IP device 22 during the walkthrough. As noted above, such wireless nodes can include wireless APs, routers, WiFi extenders, beacons, and other devices. If present, gatekeeper 70 can potentially serve as one such wireless node in embodiments; and other IOT appliances emitting a wireless signal may also potentially serve as wireless nodes. GPS data and/or any other location data can be combined with knowledge of the structure layout established during STEP 88 of ESW process 81 to determine the location of IP device 22 relative to the tourable structure (e.g., in which room or region of the structure IP device 22 currently resides) with increased accuracy. For example, in certain embodiments, the RSSI values and/or RTT responses of wireless nodes may be compared and utilized (at least in part) to track the position of IP device 22, as described above, while further compensating for scattering, fading, and other effects utilizing an appropriate algorithm or processing techniques; e.g., algorithms compensating for wireless signals reflected or bounced from walls, floors, ceilings, or other surfaces of the tourable structure. Magnetic field sensing may also be utilized in tracking the position and movement of IP device 22 in embodiments.

Figure 16:
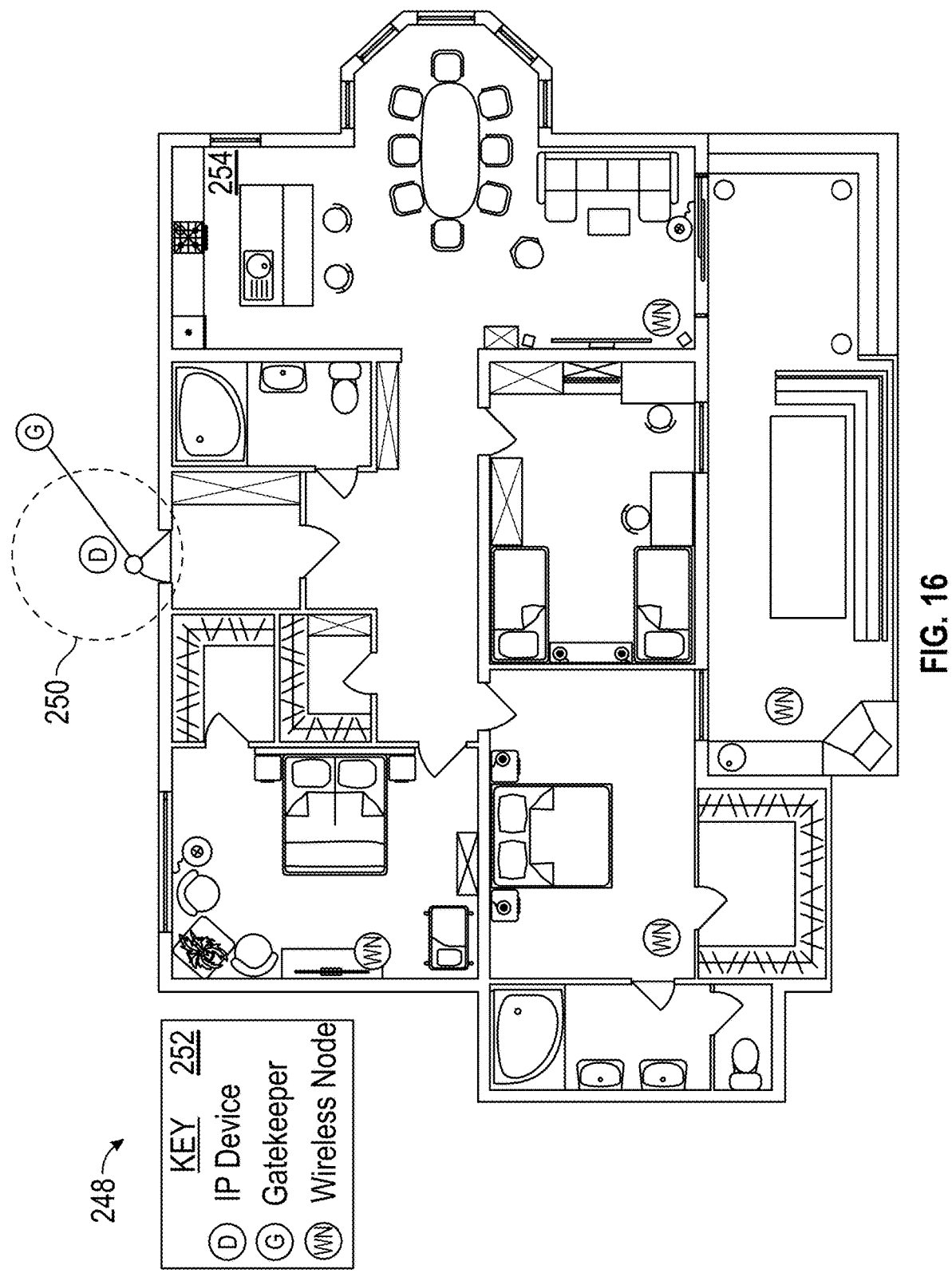
FIGS. 16 and 17 are plan views of a structure floorplan and markers representing the IP device, the gatekeeper, and a number of wireless nodes in an example implementation of the multi-phase structure walkthrough process of FIG. 2.
Figure 17:
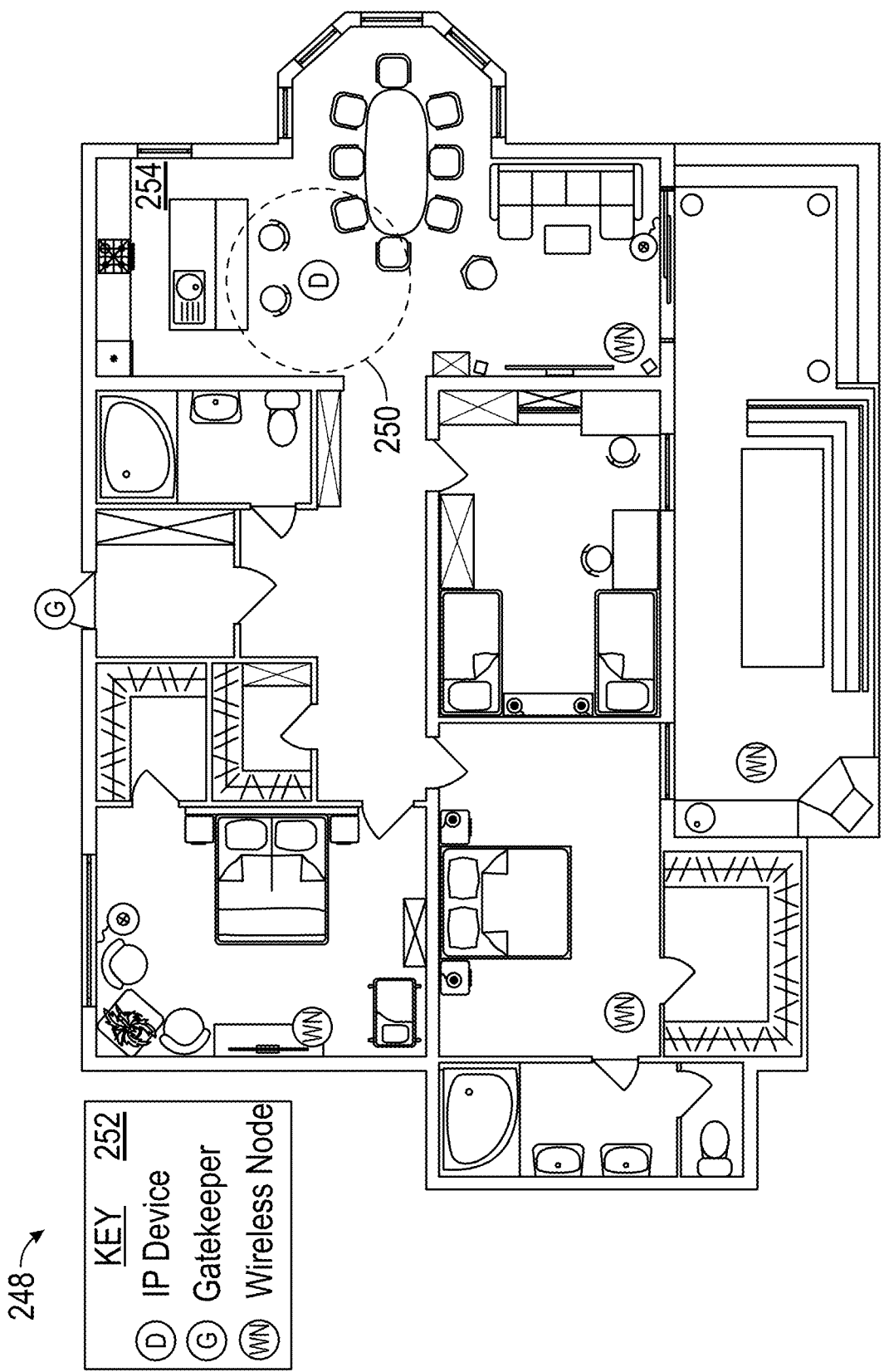

FIGS. 16 and 17 provide a top-down or layout view of an example structure 248 (here, a residential home) toured by an interested party during the course of an enhanced walkthrough. In these drawing figures, dashed circle 250 represents a horizontal zone of uncertainty surrounding IP device 22; hereafter, "uncertainty region 250." Further, circular icons "D," "G," and "WN," represent IP device 22, gatekeeper 70, and wireless nodes, respectively, as indicated by key 252 appearing in the upper left corner of FIGS. 16 and 17. As generally indicated above, the wireless nodes located with the example structure may be any combination of APs, wireless routers, and extenders included in a mesh LAN installed in the residence, wireless beacons, IOT appliances or the like, or other such devices emitting a wireless signal detectable by IP device 22. The various nodes of a WiFi mesh router systems (e.g., NETGEAR ORBI, GOOGLE, NEST, or EERO WiFi mesh WiFi systems) may be utilized in addition to or in lieu of GPS signals to determine, with greater accuracy, the indoor position of IP device 22 utilizing measured signal strengths and/or RTT values. Additionally, in certain embodiments, wireless nodes in the form of proximity beacons may be placed adjacent secondary entry points; or other regions of structure 248 in which it is desirable to monitor the location of IP device 22 with a higher degree of accuracy. The usage of proximity beacons may also be beneficial in embodiments in which the structure has multiple levels or floors to provide greater accuracy in determining vertical position or the height above ground level of IP device 22.

In the scenario shown in FIG. 16, IP device 22 is located adjacent the front door or main entry point of structure 248. The precise position of IP device 22 is unknown, but rather estimated at approximately the center of uncertainty region 250. Here, the interested party has successfully completed the check-in subprocess, and gatekeeper 70 has granted access to structure 248 (indicated by the open door symbol within uncertainty region 250). The interested party, carrying IP device 22, may now enter structure 248 through the main entry point and proceed with the enhanced walkthrough or self-guided tour. In embodiments, certain location-dependent actions (e.g., the presentation of or offered presentation of SR-created messages on IP device 22) may be performed via IP device 22 in response to changes in the positioning of device 22 during the walkthrough. Consider, for example, a scenario in which the interested party carries IP device 22 into kitchen area 254 of structure 248, as indicated in FIG. 17. Pre-established SR messaging pertaining to kitchen area 254 may be presented via IP device 22 as the interested party enters kitchen area 254, with the presentation of such SR messaging triggered by the movement of IP device 22 into kitchen area 254; e.g., as reported by IP device 22 to ESW server end 26, with server end 26 then transmitting the SR messaging to present via IP device 22 at the appropriate juncture based on the reported IP device location. A brief time delay may also be introduced such that pre-established SR messaging assigned to kitchen area 254 is presented upon elapse of a set time period (e.g., a few seconds) occurring after IP device 22 first enters kitchen area 254. Examples of such SR-created messaging corresponding to kitchen area 254 are discussed below in connection with FIGS. 22 and 23. Prior to this, examples of a GUI home screen that may be initially generated on IP device 22 upon commencement of the walkthrough are discussed in conjunction with FIG. 18.

FIG. 18 is a screenshot of a GUI home screen 256 suitably presented via IP device 22 during an enhanced walkthrough in a non-limiting example embodiment of the present disclosure. In this particular example, a time remaining readout 258 is presented indicating, in countdown format, the time remaining for completion of the walkthrough, as determined based on a time of check-in (or the current time of day) and the scheduling data stored within scheduling database 68. A user-selectable GUI element 260 is displayed on GUI home screen 256, the selection of which enables the interested party to request an extension of time for the current walkthrough. Similarly, a selection option 262 for initiating the check-out subprocess is likewise presented on home screen 256, along with several navigation options 264, 266, 268. When selected, navigation option 264 summons a live chat function; navigation option 266 summons a walkthrough album interface; and navigation option 268 summons an information page regarding the property currently subject to walkthrough. Below this, in lower region 270 of home screen 256, a listing of all notifications presented via IP device 22 thus far during the walkthrough is shown and arranged in reverse chronological order (the most recent notification appearing at the top of the displayed list). The interested party can navigate through this list and select any notification for viewing on IP device 22 if desired.

As indicated above, an interested party may be provided with an option for requesting an extension of time to complete the current walkthrough. In embodiments, the interested party may be able to select the duration for the requested extension via interaction with IP device 22. Alternatively, for simplicity, such walkthrough extension requests may be offered in set increments of, for example, 10 or 15 minutes. Such a walkthrough extension option may be presented as, for example, a virtual button 260 or other user-selectable GUI element allowing the interested party to request additional time for completion of the walkthrough. If receiving user input from the interested party requesting an extension of time, IP device 22 may relay this request to ESW server end 26 via signal transmission over network 56, with ESW server end 26 then forwarding this request to SR device 24 in the previously-described manner. If the SR responds by entering input into SR device 24 indicating that the time extension is acceptable, SR device 24 provides a corresponding signal to ESW server end 26, which instructs IP device 22 to display a message notifying the interested party that the extension request has been approved. Countdown 258 is then updated accordingly. In other instances, ESW server end 26 or IP device 22 may automatically approve a predetermined number of (e.g., one or two) time extension requests; and, when so approving, provide notification to SR device 24 of the granted time extension as, for example, a text message or a notification within a software application. Additional requests beyond the predetermined number of requests may then be forward to the SR device 24 for approval or denial; or, perhaps, the interested party will not be permitted to make additional extension of time requests after the predetermined number has been reached. Further, in certain implementations, the ESW server end 26 may consider whether granting such a walkthrough extension request would interfere with any upcoming walkthrough scheduled for that day by checking scheduling database 68.

As indicated by selection option 264 in FIG. 18, during process 232 in FIG. 15, the interested party may be permitted to open a text message or "live chat" interface with the SR during a given walkthrough and, perhaps, for a limited period of time before or after the walkthrough. Such a chat interface may allow the interested party to pose any questions arising during the walkthrough or otherwise communicate directly with the SR; e.g., a building owner or an agent of a building owner. Such communications are usefully, although non-essentially routed through ESW server end 26 and anonymized to preserve the privacy of the SR and/or the interested party. In this regard, text messages originating from IP device 22 may be initially transmitted to ESW server end 26, which then forwards the text messages to SR device 24, while obscuring or removing any relevant contact information; e.g., any phone numbers, email addresses, and perhaps full names that might otherwise be included. Similarly, reply messages originating from SR device 24 are likewise routed to server end 26, which then forwards the text messages to IP device 22, while removing any direct contact information. Thus, such communications are considered "anonymized" in the present contact when lacking information (e.g., due to removal or obfuscation by ESW server end 26) that could otherwise be utilized to directly contact one of the parties in a manner bypassing ESW server end 26 outside of the permitted timeframe. Anonymized communications will, of course, typically include generalized information such as a categorization of the person from which the communication originates (e.g., whether a buyer, seller, renter, landlord, or the like), a first name or nickname, potentially a profile picture or selected profile graphic, and possibly other such generic information short of full contact credentials. In this manner, direct communications between the interested party and the SR may be permitted, while limited to a finite time window and anonymized, if desired, to preserve the privacy of either or both parties. Further, as noted above, the duration of such a live chat interface may be limited in time to further provide privacy; e.g., in one embodiment, live chat may only be available during the walkthrough and, thus, may commence upon check-in and terminate upon check-out (or a few minutes thereafter). Any and all such parameters may be adjustable by the SR (e.g., via interaction with software application 54 executing on SR device 24) as user preference settings in embodiments. In certain cases, parties having accounts linked to the accounts of the interest party and SR, such as real estate agents, may automatically be included in any such live chat along with the SR and the interested party.

An example of a GUI screen 272 supporting such an anonymized live chat is shown in FIG. 19. When accessed via IP device 22, example GUI screen 272 enables the interested party to enter text messages in field 274, whether by typing such messages utilizing a virtual keyboard (not shown) or utilizing voice entry through selection of microphone icon 276 (which is then converted to text entry). The interested party may also be able to capture and share pictures or video with the SR in the chat string by selecting a camera icon 278. The SR may then respond in a similar manner. In certain scenarios in which the SR assumes the form of a building owner seeking to sell the tourable structure, the chat group may automatically include the seller's agent, the buyer's agent, or a combination thereof in addition the building owner and interested party. Additional description in this regard is provided below in connection with FIG. 33. In this manner, the seller's agent and/or buyer's agent may be made privy to any such communications between the building owner and the interested party. In other instances, an agent serving as the SR may respond on behalf of a building owner in the context of a such a live chat function. Various other GUIs are also possible, with FIG. 19 providing but one suitable example. In other embodiments, such an anonymized live chat function may not be provided; or may be enabled or disabled by the SR through selection of an option within application 54. When a chat function is provided, the chat history occurring during a walkthrough of a particular tourable structure may be stored within IP walkthrough album database 66 as part of the walkthrough album created for the tourable structure to allow the interested party or others to access review the chat history if desired. So too may ESW server end 26 automatically (that is, without requiring interested party input) add the SR-created messaging presented (or offered for presentation) during an enhanced walkthrough to the walkthrough album in embodiments for subsequent viewing or review by the interested party and any other individuals with which the interested party may share the walkthrough album.

With continued reference to GUI screen 256 shown in FIG. 18, and also referring to function 234 shown in FIG. 15, walkthrough album database 66 maintained by ESW server end 26 may store a collection of content related to the enhanced walkthrough or walkthroughs performed by an interested party. To compile a walkthrough album, the interested party can capture pictures, video clips, audio notes, create typed text entries, and otherwise create content related to the structure during an enhanced walkthrough. Such entries are stored in a virtual log or online album for the interested party to view or playback at a later juncture; e.g., after completion the walkthrough. This may be useful if a prolonged period of time passes as the interested party considers purchasing, leasing, renting, or otherwise entering into an agreement concerning the structure. Such a functionality may also help the interested party recall specifics regarding the structure, as may be useful if an interested party tours multiple structures in a short period of time. Such entries may be created utilizing IP device 22 and transmitted over network 56 to ESW server end 26 for storage in walkthrough album database 66, with the entries potentially stamped with time and location metadata. ESW server end 26 may automatically then assign all such entries to a folder or grouping dedicated to the tourable structure; and, if multiple structures are visited, server end 26 may automatically organize all such entries into appropriate groupings or unique albums associated with each structure. Thus, multiple walkthrough albums may be associated with a single user account for an interested party having conducted multiple enhanced walkthroughs, with a unique walkthrough album created for each tourable structure visited by the interested party. ESW server end 26 may also add various other items of information to each walkthrough album for subsequent viewing or review by the interested party, such as structure listing information (e.g., similar or identical to that shown in FIG. 21), the SR-created messaging presented to (or offered for presentation to) the interested party during an enhanced walkthrough, and/or the SR-selected POI recommendations discussed below in connection with FIG. 31.

If desired, the walkthrough album created by the interested party and maintained in walkthrough album database 66 may also be availed to others in embodiments. For example, the interested party may be able to post content, such as pictures or videos, which can be then viewed by other individuals utilizing network-connected devices. In this manner, friends or family can view the content captured by the interested party and potentially comment regarding the content. Such content can also potentially be shared with the SR, a home inspector, a cleaning service, repair personnel, or the like. For example, in certain embodiments, software application 38 executing on IP device 22 may provide a flag option, which, when selected, may allow the interested party to mark a particular area or item within the tourable structure for future discussion, inspection, cleaning, or repair. In such embodiments, content (e.g., still images, video, or typed notes) uploaded to the walkthrough album for a given structure may be flagged by the interested party by interacting with the GUI generated on IP device 22, with the flagged content then separately categorized or otherwise easily discovered by searching the walkthrough album for subsequent review and potential online sharing with other parties granted access to the album.

Figures 20, 21:
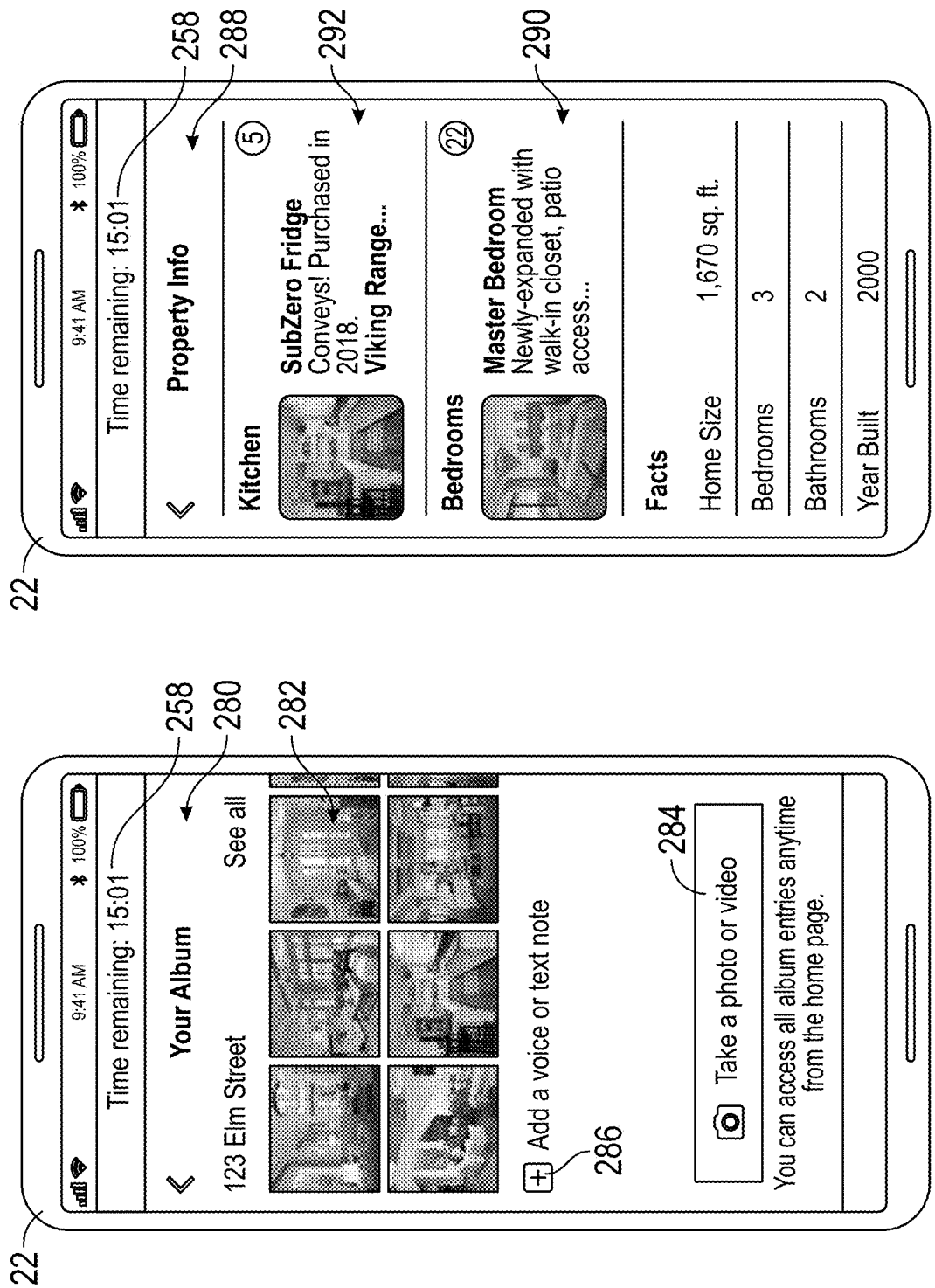

FIG. 20 provides an example screen 280 that may be presented via IP device 22 utilizing data retrieved from walkthrough album database 66 when an interested party selects the walkthrough album option adjacent icon 266 in FIG. 18. In this example, a collection of videos and still pictures captured by the interested party during the walkthrough is displayed as thumbnail gallery 282. A selection option to capture additional pictures or video clips for addition to gallery 282 is also presented as virtual button 284. Additionally, a selection option to create voice or text notes for storage in the walkthrough album is presented as virtual button 286. Selection of property information option 268 from GUI screen 256 (FIG. 18) recalls an additional page or screen providing information pertaining to the structure. Such information may include list price, square footage, price per square foot, room count, acreage, home type, heating and/or cooling system specifications, Homeowner Association (HOA) information, and other such information commonly provided in conjunction with real estate listings. An example of a GUI screen 288 containing such information is shown in FIG. 21. Various facts or data points pertaining to the tourable structure are presented in lower region 290 of example GUI screen 288. Additionally, in upper region 292 of example GUI screen 288, the SR-created messages are again displayed for selection and potential viewing by the interested party.

Figure 22:
FIGS. 22 and 23 are example screenshots illustrating different manners in which SR-created messages may be automatically presented on the screen of an IP device when triggered by, for example, changes in the positioning of an IP device within or adjacent a structure subject to walkthrough.

Turning to FIG. 22, a potential manner in which SR-created messages may be automatically presented on the screen of an IP device when triggered by, for example, the location of the IP device relative to the tourable structure is shown. Such notifications can be stored on IP device 22 in advance of the walkthrough; or, instead, transmitted to IP device 22 over network 56 by server end 26 on an as-needed basis, as previously described. In the latter regard, IP device 22 may repeatedly provide ESW server end 26 with position or location data indicating the location of device 22 within (or otherwise relative to) the tourable structure during the walkthrough. ESW server end 26 may then compare the location of IP device 22 to various notification entries contained in SR messaging database 58, each associated with a particular region or area (e.g., room) of the structure. If determining that IP device 22 has been carried into (or is about to be carried into) a particular area of the structure for which SR-created message entries are stored in SR messaging database 58, ESW server end 26 then transmits the corresponding entries to IP device 22 for presentation (or offered presentation) to the interested party. In the above-introduced example scenario in which the interested party initially carries IP device 22 into the kitchen of the tourable structure, as indicated in FIG. 17, SR messaging pertaining to the kitchen may be retrieved from the location-referenced data set (e.g., as stored in database 58) and presented on display screen 30 of IP device 22. An example of a GUI screen 294 including an automatically-presented SR-created message is shown in FIG. 22. In the illustrated example, the SR-created content or messaging (linked to a location within the kitchen previously marked by the SR) is shown as text annunciation or typed message 296; hereafter, SR-created message 296. SR-created message 296 is presented as part of GUI screen 294, which further includes a title 298 identifying the room (or other area) to which the messages pertain. Additionally, imagery 300 (e.g., a picture or short video clip) of the room or other area may also be presented, as previously uploaded by the SR to SR messaging database 58 utilizing SR device 24. After viewing SR-created message 296, the interested party may dismiss the pop-up notification by selecting icon 302 appearing in the upper right corner of this screen.

Figure 23:
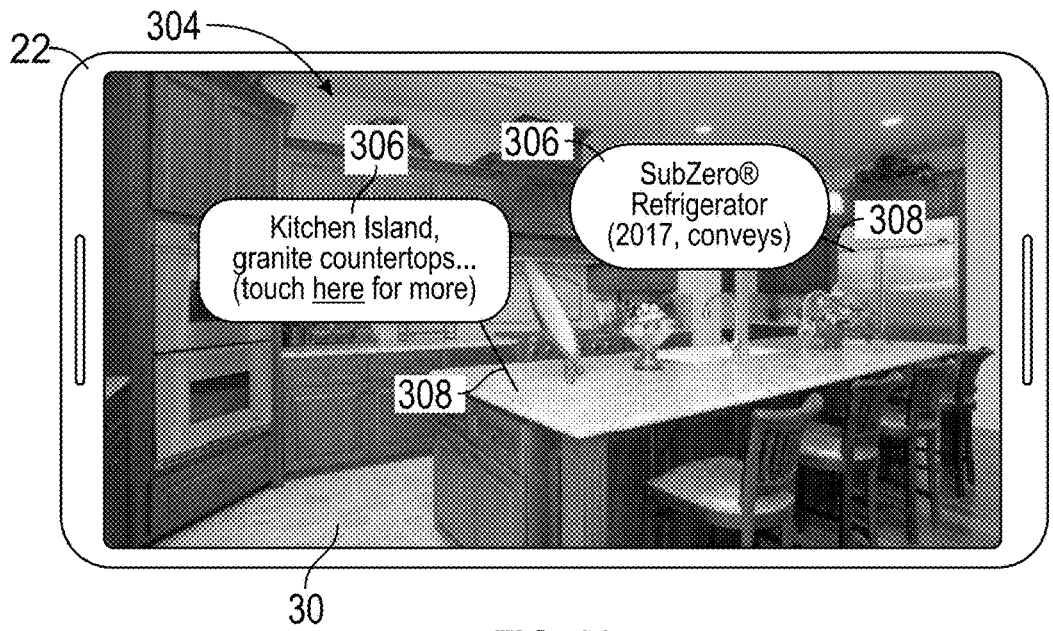

FIG. 23 further presents an example GUI screen 304 including a number of SR-created messages 306, which are presented in a mixed reality or augmented reality (AR) format; e.g., superimposed over a real-world view captured by the camera of IP device 22. When displayed in this manner, such AR messages 306 may appear as, for example, free-floating typed notes positioned in a three-dimensional, real-world context. AR messages 306 may each be generally positioned adjacent a room, a region of the structure, or another real-world item to which the messages pertain. In certain instances, AR messages 306 may be visually tied to the item or region to which the messages pertain (e.g., by tails or lead lines 308 connecting the text bubbles to the item or region) if such a physical association can be established utilizing image recognition or another approach. In further embodiments, the SR-created messages may be presented in another manner. For example, an AR display approach similar to that shown in FIG. 23 may also be employed if IP device 22 should assume the form of a head-worn or head-mounted display device, such as smart glasses, which produces graphics overlaid onto the real-word view through a transparent head-up-display of the device. Various other methods of presenting the SR notifications are also possible, depending upon the particular form assumed by IP device 22. For example, in certain embodiments, IP device 22 may assume the form of a smartwatch or other worn display device, and corresponding SR messaging may be presented on device 22 as visual (e.g., in-app, push, or text) notifications or audible (spoken) notifications. In such embodiments, when entering a particular room or other area of the tourable structure, the interested party need only glance at the smartwatch (serving as IP device 22 in this example) to read the SR-created message or notification pertaining to the room or area, as automatically presented on IP device 22 based upon the present position thereof.

In the examples of FIGS. 22 and 23, the SR-created messages are automatically presented on IP device 22 in response to movement of IP device 22 into a predetermined proximity of SR-marked locations linked to the SR-created messages (again, as contained in a location-referenced message set stored in SR messaging database 58). The SR-created messages may not be automatically presented to an interested party via IP device 22 in further implementations. Rather, prompts offering to present the SR-created messages may be automatically generated (that is, generated without requiring input from the interested party operating IP device 22) when appropriate. An example of such a prompt 310, as presented in a pop-up window superimposed over home screen 256, is shown in FIG. 24. Prompt 310 includes an area title 312 for the SR-created message (here, entitled "the kitchen") and indicates the number of messages that the SR (e.g., a building seller or landlord) has created for the area. Prompt 310 further includes GUI elements enabling the interested party, interacting with IP device 22, to either choose to view the SR-created messages (via touch selection of option 314) or to dismiss the prompt (via touch selection of option 316). Further, ESW server end 26 (or IP device 22) may track which SR-created messages have been presented (or offered for presentation) during an enhanced walkthrough and avoid duplicate presentation (or offered presentation) of any given SR-created message. In this regard, if a particular SR-created message (or an offer to present the particular SR-created message) has already been presented during a walkthrough (as tracked by ESW server end 26 in embodiments), ESW server end 26 refrains from sending instructions to IP device 22 to present (or offer to present) the particular message a second time should the interested party carry IP device 22 into proximity of a particular marked location on multiple occasions. In this manner, ESW server end 26 (or IP device 22 if independently determining when to present the SR-created messaging) avoids creating a potential nuisance by repeatedly presenting or offering to present a given SR-created message on multiple occasions during the same walkthrough.

As a still further possibility, neither SR-created messages nor prompts offering to display such SR-created message may be presented on IP device 22 automatically during the course of a walkthrough. In this instance, the SR may still be permitted to create message content pertaining to different areas or regions of the structure (and the structure surroundings) for presentation to an interested party via IP device 22. However, the interested party may instead access the SR-created messages by interacting with a user-selectable list or other GUI structure generated on IP device 22 and selecting which, if any of the SR-created messages the interested party wishes to view at that time. Referring briefly to FIG. 25, an example of such a GUI screen 318 including SR-created message categories 320, 322 is shown. The number of SR-created messages for each category 320, 322 is further indicated by icons 324 appearing on the right of GUI screen 318. Interacting with the GUI on IP device 22 in this manner, an interested party may scroll and select the desired SR-created message category 320, 322 to view the SR-created messages in that category when the interested party desires.

Referring once again to FIG. 15, secondary entry point reminders may also be selectively generated via IP device 22 during the walkthrough in embodiments of the present disclosure (FUNCTION 202). Such reminders may be generated when determining that IP device 22 has been brought outside of the structure through a secondary entry point, such as a backdoor or patio door; or immediately after device 22 has re-entered the structure through such a secondary entry point In this case, IP device 22 may automatically generate a reminder (e.g., a visual reminder on display screen 30 or an audible message) advising the interested party to secure the secondary entry point when re-entering the structure. As an example, if the secondary entry point is a backdoor to a patio area, the following reminder may be generated on IP device 22 when determining that IP device 22 has been carried to the patio area through the patio door or when determining that IP device 22 has been brought back inside the structure through the patio door: "PLEASE REMEMBER TO LOCK ALL DOORS WHEN RE-ENTERING THE HOME (OR APARTMENT)." Thus, in embodiments, it may be determined when the IP device is transported through (that is, carried outside of the structure or brought back into the structure through) the secondary entry point; and, when so determining, ESW server end 26 causes generation of (and/or IP device 22 independently generates) a reminder on IP device 22 advising the interested party to close and lock the secondary entry point when re-entering the structure therethrough. In a somewhat similar manner, location-based check-out omission alerts may also be generated during the walkthrough process, as indicated in FIG. 15 at FUNCTION 244. Further description of such check-out omission alerts is set-forth below in connection with FIG. 27.

Various types of data can be recorded utilizing IP device 22 and coordinated with time points during an enhanced walkthrough, as still further indicated in FIG. 15 at FUNCTION 236. Such timestamped data can include video, audio, and/or location data captured by IP device 22 during the walkthrough. Further, timestamped data may be reported to ESW server end 26 on a repeated basis and then stored by the ESW host service in database 68 as part of a record or log of the walkthrough. With respect to location data, such data can be utilized to construct a timeline of the location of IP device 22 during the enhanced structure walkthrough. Thus, such a walkthrough timeline may indicate the duration of the walkthrough, the amount of time the interested party spent in different regions of the structure (e.g., rooms of the single family home) or the structure's exterior area, and the like. In other instances, video and/or audio may be collected utilizing IP device 22 and stored in a securitized database maintained by server end 26. Such video and/or audio data may be subsequently accessed if, for example, a question arises regarding potential theft, property damage, or another issue. Otherwise, such collected data may be deleted after a certain duration of time. In still other instances, video and/or audio data may not be collected.

If video is collected during an enhanced structure walkthrough, whether utilizing one or more cameras integrated into IP device 22 or other cameras present in and/or around the tourable structure, alerts may be generated to discourage obfuscation of the camera or cameras utilized for video capture in embodiments. In such instances, it may be determined if a camera or cameras are subject to obfuscation by ESW server end 26 when receiving a live video feed from IP device 22 or from other cameras located within or around the structure, with server end 26 then transmitting instructions to IP device 22 to generate such an alert when appropriate. Alternatively, IP device 22 may itself make this determination and trigger such an alert when deemed proper. In further embodiments, such an alert may not be generated; or video (and/or audio) data may not be collected from IP device 22 during the enhanced structure walkthrough. Further, in embodiments in which video and/or audio data is collected via IP device 22 during the walkthrough, the video and/or audio collection may be temporarily halted under certain instances; e.g., if IP device 22 is brought into a region of the building identified as a bathroom or another area in which privacy is reasonably expected. In other implementations, audio data may be collected during the walkthrough (and transmitted over network 56 to server end 26 for temporary storage as part of the walkthrough record or memorialization) utilizing microphones included in IP device 22, smart-speakers located within the home, or other sources.

Returning once again to signal timing diagram 166 shown in FIG. 11, any combination of the above-described process steps repeat (as indicated by graphic 212) until, for example, initiation of the check-out subprocess (FUNCTION 326). Upon initiation of the check-out subprocess, STEPS 328, 330, 332, 334, 336, 338 may be performed. At STEP 328, ESW server end 26 or IP device 22 may query gatekeeper 70 to determine whether the main entry point has been shut and locked after the interested party (carrying IP device 22) has exited the tourable structure. At STEP 330, gatekeeper 70 may provide a reply signal transmitted to ESW server end 26 and/or to IP device 22 confirming whether the main entry point has been locked. Such a confirmation may be provided after transmitting a LOCK command from ESW server end 26 and/or from third party server 199 (at the request of server end 26) to gatekeeper 70 following confirmation that the interested party has vacated the structure, as further discussed below. In further implementations, gatekeeper 70 may automatically report when the main entry point has been locked to IP device 22, to ESW server end 26, or to third party server end 199, with third party server end 199 then forwarding this information to ESW server end 26. In still other instances, gatekeeper 70 may not provide such a lock confirmation signal, and the interested party may be prompted via IP device 22 to confirm that the structure has been properly resecured upon conclusion of the walkthrough. If, at STEP 332, it is determined that these and other conditions are satisfied, check-out may be authorized (STEP 334). Additional discussion of example check-out conditions is set-forth below in connection with FIGS. 29 and 30. E SW server end 26 may then store the final check-out data (STEP 336) and provide SR device 24 with an electronic communication (e.g., a text message, push notification, in-app notification, email, or the like) notifying the SR that the walkthrough has concluded (STEP 338).

Figure 26:
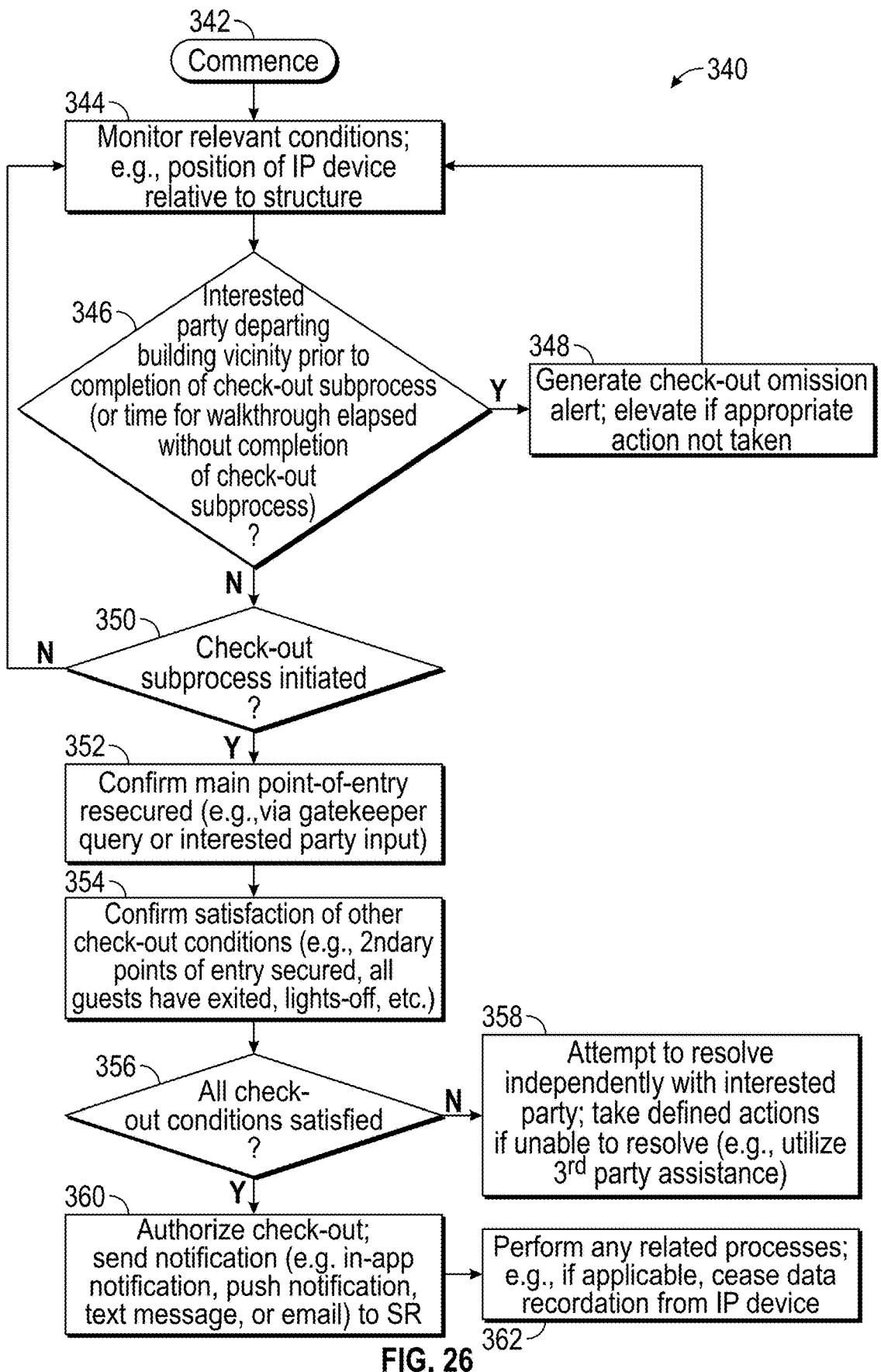
FIG. 26 is a flowchart of an example check-out subprocess, which may be performed during the course of the overarching structure walkthrough process set-forth in FIG. 2 in various implementations.

Additional description of an example check-out subprocess, and an example check-out omission alert functionality, will now be provided in connection with FIG. 26.

FIG. 26 is a flowchart of an example check-out subprocess 340, which may be performed during the course of multi-phase structure ESW process 81 (FIG. 2) in embodiments. Subprocess 340 includes a number of process STEPS 342, 344, 346, 348, 350, 352, 354, 356, 358, 360, 362. Check-out subprocess 340 commences at STEP 342, such as upon completion of the check-in subprocess by the interested party. At STEP 344, IP device 22 monitors its location within or adjacent the structure. The location of IP device 22 may be reported to ESW server end 26 on an essentially continual or on an iterative basis in embodiments in which device 22 tracks its position; e.g., utilizing GPS tracking potentially combined with dead reckoning, signal strength or RTT comparisons of wireless nodes located within the structure, proximity beacons (or another indoor positioning system (IPS) type architecture), magnetic field sensing, and so on, as previously discussed. In this manner, ESW server end 26 may monitor the current location of IP device 22 based, at least in part, on location report signals repeatedly transmitted from IP device 22, over network 56, and to server end 26 during the walkthrough. If the interested party travels an excessive distance away from the structure in question (e.g., beyond a predetermined threshold distance, such as 100 to 200 meters or more, away from the center of the structure, the location of gatekeeper 70, or another such building-related reference point), ESW server end 26 may conclude that the interested party has left (or is in the process of leaving) the vicinity of the structure. In other instances, a virtual boundary or geofence may be established around structure or the property on which the structure is located, and ESW server end 26 may determine whether an interested party is leaving the vicinity of the structure based, at least in part, on whether IP device 22 breaches the geofence without completion of the check-out subprocess. Other data may also be considered when predicting whether the interested party (and, specifically, IP device 22) is traveling away from the structure without completion of a mandatory check-out subprocess after commencement of the walkthrough. For example, predicting whether the interested party is traveling away from the structure without completion of the mandatory check-out subprocess may be further based on whether IP device 22 is traveling at a speed exceeding a predetermined speed threshold, such as 10 or 15 miles per hour (mph). If exceeding this speed threshold, ESW server end 26 may conclude that IP device 22 is traveling away from the tourable structure in a vehicle.

If determining, based at least in part upon the reported location of IP device 22, that the interested party is attempting to leave the vicinity of the structure without completion of the check-out subprocess (STEPS 346, 350), a checkout omission alert is generated at IP device 22. This determination can be rendered by IP device 22 or instead by ESW server end 26 (based on location and motion data transmitted from IP device 22), with server end 26 then transmitting instructions to IP device 22 over network 56 to generate alerts or warnings, as appropriate (STEP 348). In certain embodiments, a single check omission alert may be generated. In other instances, multiple graduated check-out omission alerts varying in urgency may be generated on IP device 22, beginning with a first, informational or cautionary alert as described below. Appropriate time delays (e.g., on the order of a few minutes) may also be provided to afford the interested party an opportunity to become aware of the check-out omission alert and return to the structure subject to walkthrough. Accordingly, in embodiments, ESW server end 26 and/or IP device 22 may determine whether the interested party continues to travel away from the structure after generation of the first check-out omission alert on IP device 22 and elapse of a first predetermined wait period. This determination may be made utilizing location data provided by the IP device 22 relative to the geolocation of the tourable structure, with ESW server end 26 (or IP device 22) considering if the distance between IP device 22 and the tourable structure continues to increase after generation of a check-out omission alert, if IP device 22 continues to travel in a direction away from the tourable structure, and other such factors. If so determining, ESW server end 26 and/or IP device 22 may further generate (or, in the case of server end 26, cause the generation of) a second check-out omission alert on IP device 22, the second check-out omission alert having a higher urgency than does the first check-out omission alert. Similarly, if it's determined that the interested party continues to travel away from the structure after generation of the high urgency check-out omission alert(s) and elapse of the second predetermined wait period, a command signal may be transmitted from ESW server end 26, over network 56, and to SR device 24 instructing SR device 24 to present a notification advising the SR that the interested party has departed the structure without completion of the mandatory check-out subprocess.

Figure 27:
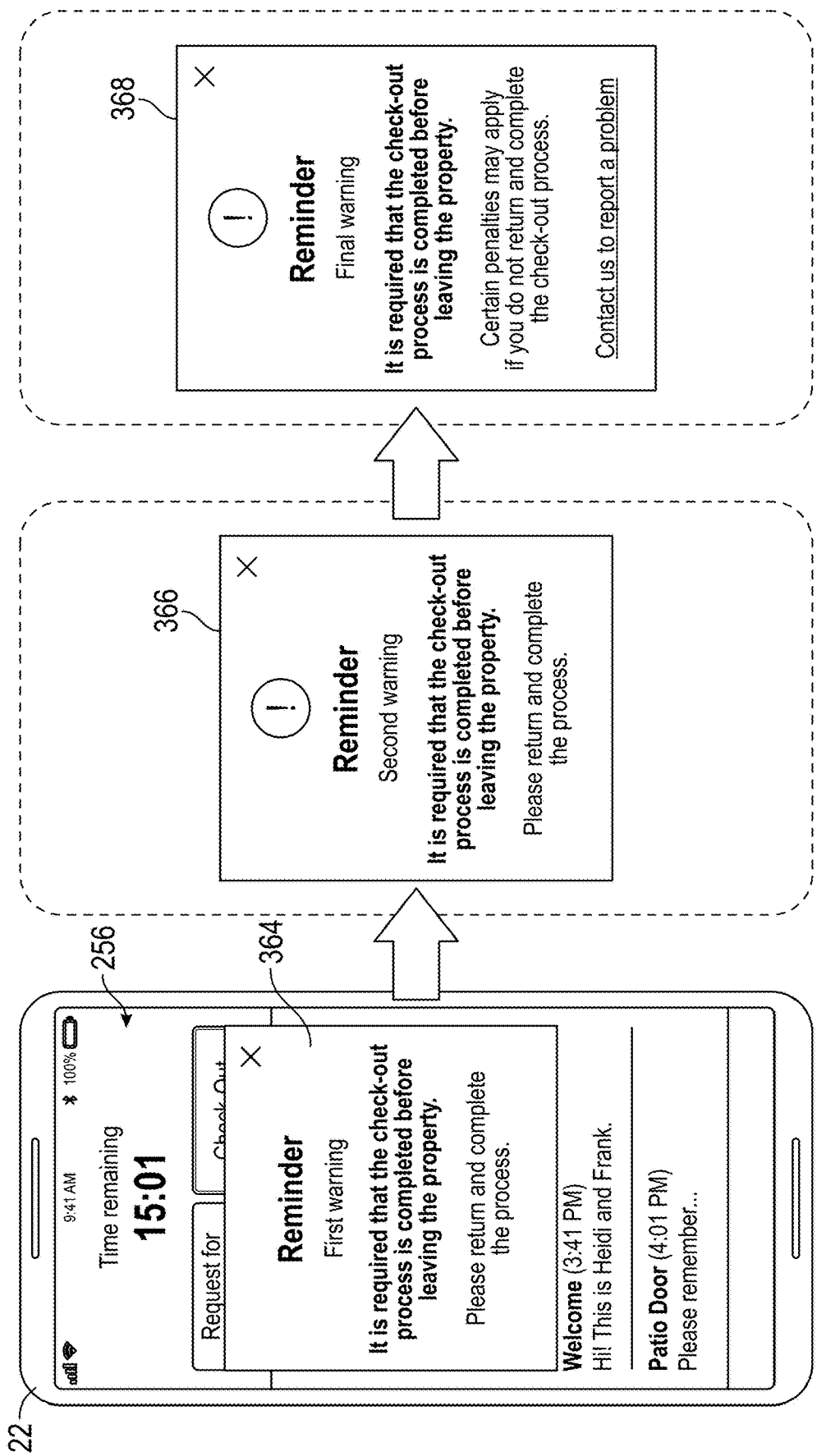
FIG. 27 illustrates check-out omission alerts (increasing in urgency moving in a rightward direction), which may be generated on the IP device in response to an interested party's failure to complete the check-out subprocess in embodiments of the present disclosure.

Examples of check-out omission alerts are set-forth in FIG. 27, with the example alerts progressively increasing in urgency moving from the left to the right in this drawing figure. Specifically, a first, low level check omission alert 364 is presented in a pop-up window superimposed over walkthrough home screen 256 on the left side of FIG. 27; a second, mid-level check omission alert 366 is presented in a pop-up window appearing in the middle of this figure; and a third, high level check out omission alert 368 is presented in a pop-up window on the right of this figure. Check-out omission alerts 364, 366, 368 progressively increase in urgency as indicated by changes in the wording, symbology, color coding, or any combination thereof. In embodiments, generation of mid-level and high level check-out omission alerts 366, 368 may be accompanied by audible or haptic alerts, as well. Again, as noted above, if an interested party does not return to the property and attempt to complete the check-out subprocess after the generation of high level check-out omission alert 368, certain measures may be taken by ESW server end 26, such as transmitting a message to SR device 24 warning that the interested party may have departed the premises without properly completing the check-out subprocess. ESW server end 26 may also instruct IP device 22 to generate similar check-out omission alerts if determining, from the location report signals repeatedly transmitted to ESW server end 26 by IP device 22 that IP device 22 remains within the tourable structure after elapse of the scheduled timeframe or duration for the current walkthrough. Thus, generally stated, ESW server end 26 (or IP device 22) may (i) monitor a current location of IP device 22 utilizing data collected by IP device 22 during the walkthrough; (ii) determine, based at least in part on the monitored current location of IP device 22, whether the interested party completes a mandatory check-out process within a predetermined time period prior to leaving the vicinity of the structure; and (iii) when determining that the interested party fails to complete the mandatory check-out process within a predetermined time period prior to leaving the vicinity of the structure, generate or cause the generation of a check-out omission alert on the IP device 22. Again, a given check-out omission alert may be generated if determining that the interested part is traveling away from the structure without completion of the mandatory check-out subprocess; or if determining that IP device 22 remains within the structure (or has not yet initiated check-out subprocess) after elapse of a scheduled duration for the walkthrough.

With continued reference to check-out subprocess 340 shown in FIG. 36, the check-out subprocess may be initiated by selection of a "CHECK OUT" option presented on IP device 22. Alternatively, the interested party may be prompted to check-out when ESW server end 26 determines that the interested party is leaving or beginning to leave the structure through the main entry point or, perhaps, when the time allotted for the walkthrough has elapsed or will soon elapse. The check-out subprocess may instruct the interested party to vacate the structure, while ensuring that the main entry point (e.g., the front door of the structure) is closed. In certain embodiments, data may be captured to verify the interested party has, in fact, exited the structure (or is at least within a predetermined proximity of the main entry point and/or gatekeeper 70) prior to proceeding further with the check-out subprocess. Such data can be, for example, location data (e.g., GPS coordinates) reported by IP device 22; a video feed from IP device 22, gatekeeper 70, or another camera having a FOV encompassing the exterior of the main entry point; and/or motion sensor data captured by a motion sensor monitoring the exterior area adjacent the main entry point.

When determining that the check-out subprocess has been initiated (STEP 350), subprocess 340 progresses to STEP 352. At STEP 352 of subprocess 340, ESW server end 26 or IP device 22 may further transmit a command signal to electronic gatekeeper 70 to lock the front door of the structure. In response, electronic gatekeeper 70 may lock the front door and then transmit a confirmation signal that the door has been successfully locked, providing that gatekeeper 70 has such capabilities. Alternatively, if the electronic gatekeeper is not capable of self-locking the front door, or if a gatekeeper is not present, the interested party may be instructed to lock the front door and then to confirm that the front door is locked. For example, in embodiments, the interested party may utilize a software application 38 executing on IP device 22 to verify (e.g., via selection of a virtual GUI icon) that the front door (or other main entry point) has been locked. In certain instances, the interested party may be instructed to utilize IP device 22 capture a video clip of an action related to the check-out subprocess. In other implementations, such a video clip may not be captured.

Next, at STEP 354, IP device 22 and/or ESW server end 26 may confirm that other conditions in furtherance of check-out have been completed. Such other conditions can include obtaining verification from the interested party that all guests have exited the structure and that all secondary entry points have been resecured. In certain embodiments, the tourable structure may be equipped with a home security system including network-connected sensors monitoring, for example, whether all doors into the structure are locked and/or whether all windows are properly closed. In this case, either IP device 22 or ESW server end 26 may further query such a network-connected home security system to confirm that all such other potential entry points have been properly resecured. If the home security system indicates that the secondary entry points have been resecured, the check-out subprocess may continue. Otherwise, if a particular secondary entry point remains unsecured (e.g., a backdoor is not locked or a window has been left partially open), this information may be relayed to IP device 22, whether directly from the security system or through ESW server end 26. IP device 22 may then provide instructions to reenter the structure and remedy the issue before proceeding with the check-out subprocess; e.g., in an example scenario in which a backdoor remains unlocked, IP device 22 may provide a textual message to encourage the interested party to correct this issue, such as "PLEASE RE-ENTER HOME AND LOCK THE BACKDOOR."

In certain embodiments, the tourable structure may be equipped with a network-connected (e.g., a WiFi-enabled) home security system, as just described. Such a security system may include wired or wireless sensors for monitoring whether the structure doors are locked, and the structure windows are shut Additionally, such a home security system may include interior cameras, motion sensors, glass break sensors, or the like. Such sensors may be preinstalled or preexisting prior to enlistment of the structure with the enhanced structure walkthrough service; or, instead, the service may provide such sensors (and possibly other hardware, such as gatekeeper 70, the below-described machine-readable tags, the proximity beacons, etc., if used) for installation in conjunction with preparing the structure for enhanced walkthroughs. When present, such sensors may also be leveraged during the check-out subprocess to ensure that all monitored doors permitting structure entry have been locked, all monitored windows have been shut, and/or that the interior of the structure has been properly vacated (as indicated by lack of motion detected by any motion sensors or image analysis of video feeds provided by any interior cameras). Additionally, any interior home cameras, whether or not included in such a home security camera, can also be utilized to capture live video feeds during a given structure walkthrough, with the live camera feeds transmitted to ESW server end 26 and stored in database 68 as desired. Sound data captured by microphone-equipped devices, such as smart-speakers, located within the tourable structure may also be stored and/or considered in verifying that the structure has been vacated prior to completion of the check-out subprocess.

In some implementations, after the check-out subprocess has been initiated, IP device 22 may present the interested party with a checklist of tasks to complete before the interested party is permitted to leave the premises. During the check-out subprocess, some conditions may be automatically deemed satisfied if this can be determined utilizing data provided by IP device 22, gatekeeper 70, and/or any other network-connected devices in communication with ESW server end 26 over network 56. Additionally or alternatively, the interested party may be required to confirm that some or all conditions have been satisfied by entering input into IP device 22, as appropriate; e.g., software application 38 may present a suitable GUI allowing the interested party to confirm that all such conditions have been met. If the interested party indicates that one or more conditions have not been met, additional actions may then be taken to attempt to resolve any issues preventing check-out (STEP 358); and, if needed, third party assistance may be employed. For example, if electronic gatekeeper 70 is unable to lock the front door (in instances in which gatekeeper 70 normally has such capabilities), a technician or other personnel member may be dispatched by the service operating ESW server end 26 to repair the gatekeeper or to monitor the tourable structure (thereby allowing the interested party to depart) until security is no longer a concern. Other actions can also be performed as further discussed herein.

Upon successful check-out of the interested party (STEP 360), the SR may be notified by, for example, transmitting an email, a text message, a push notification, or another electronic communication from ESW server end 26, over network 56, and to SR device 24. In various embodiments, such a notification may be provided as an in-app. message generated in the context of a specialized software application or program executing on SR device 24, such as an application utilized by an SR to monitor status updates pertaining to an ongoing walkthrough, as described more fully below in connection with FIG. 32. Position tracking of IP device 22 by ESW server end 26 may cease at this juncture or shortly thereafter. Additionally, if desired, feedback may be collected from the interested party utilizing the IP device at STEP 360. For example, the interested party may be presented with a brief survey or a simple rating system regarding the structure and/or the structure walkthrough experience. This feedback may then be forwarded to ESW server end 26 and possibly shared with the SR by, for example, providing a report to the SR as discussed above in conjunction with STEP 99 of process 81 (FIG. 2). Finally, any smart capabilities of the structure may be controlled to switch to a dormant or non-active mode, if applicable; e.g., lights may be turned-off and thermostat settings may be adjusted. Notably, such smart capabilities may only be deactivated if appropriate based upon, for example, the duration of time until the next scheduled walkthrough (particularly in the case of thermostat settings) or in accordance with SR preference settings.

FIGS. 29 and 30 are screenshots of an example GUI screen 370, which may be generated on IP device 22 in embodiments and with which an interested party may interact during check-out subprocess 240. In this example, and somewhat similar to the above-described check-in subprocess, three items or tasks (adjacent icons 372, 374, 376) are presented to the interested party utilizing IP device 22. The first task reminds the interested party to ensure that all windows and doors of the structure are closed and locked. This task may be deemed completed when the interested party confirms having done this by touching or otherwise selecting icon 372. In other instances, before deeming the first task complete, ESW server end 26 may confirm that all doors and windows are shut and locked (aside from the main entry point) utilizing network-connected security sensors if installed in the tourable structure. If the security sensors indicate that a particular window or door remains open, a notification may be generated on IP device 22 instructing the interested party to re-enter the structure and close the particular window or door. To complete the second task (adjacent icon 374) involved in the check-out subprocess, the interested party is asked to answer a small number of brief questions. Such questions may confirm that the interested party has left the structure in a desired state (e.g., any appliances have been turned-off if previously turned-on and water has stopped running if used) prior to departure by the interested party. Other questions may be presented in the form of a brief survey requesting feedback from the interested party pertaining to the structure, the enhanced walkthrough process, or another topic. After the interested party has answered such questions, the second task is deemed completed. This is indicated in FIG. 30 by the checkmark graphic appearing in icon 374.

Finally, the interested party performs the third-listed task (adjacent icon 376 on GUI screen 370) to complete the check-out subprocess. This task instructs the interested party to exit the structure, close the front door, and press lock icon 374 appearing on the screen of IP device 22, as shown in FIG. 29. This causes the transmission of a LOCK signal from IP device 22 to gatekeeper 70; or, IP device 22 may transmit a signal to server end 26 that icon 374 has been selected, and ESW server end 26 may then transmit a LOCK signal to gatekeeper 70 (or server end 26 may transmit a request for third party server 199 to send such a LOCK signal over network 56 and to gatekeeper 70, as previously described). In certain embodiments, IP device 22 and/or ESW server end 26 may await receipt of a confirmation reply from gatekeeper 70 confirming the locked status of the door prior to indicating that the front door has been locked and the check-out subprocess complete. Upon receipt of such a confirmation signal, a message indicating that the door is locked and the check-out subprocess has been complete may be generated on the screen of IP device 22, as indicated in FIG. 30 at icon 378. In other embodiments in which a gatekeeper is not present or is unable to provide a LOCK confirmation signal, the third task may be deemed complete when the interested party exits the structure and confirms locking the front door by pressing icon 374 or otherwise interacting with GUI screen 370.

FIG. 31 is a screenshot of an example GUI screen 380, which may be generated during or immediately after the above-described check-out process. In certain embodiments, GUI screen 380 may be present to an interested party if, when answering the questions during the task associated with icon 374 in FIG. 30, the interested party indicates further interest in the structure subject to walkthrough or interest in the surrounding neighborhood generally. In this case, IP device 22 may provide feedback to ESW server end 26 over network 56, with server end 26 then returning an instruction signal to IP device 22 to generate a GUI screen on IP device 22 (herein, example GUI screen 380) presenting one or more SR-created recommendations of nearby locations to visit that may be of further interest to the interested party; referred to herein as SR "point-of-interest" or "POI" recommendations. In the illustrated example, specifically, three local or nearby POI visitation recommendations are presented adjacent icons 382, 384, 386. By selecting a particular icon (e.g., via touch input), the interested party may summon another window or display screen with additional information regarding the suggested highlight or visitation recommendation. Such information may include a map location of the visitation recommendation, with the address potentially loaded into a GPS map application on IP device 22 to allow an interested party to quickly access GPS navigation providing directions to any SR-specified POI visitation recommendation the interested party may select from GUI screen 380.

The above-described POI recommendations may be created by the SR prior to the walkthrough by, for example, interacting with application 54 executing on SR device 24. In one approach, an SR may create content for the POI recommendations in a manner similar to that described above in connection with the location-referenced SR-created messaging; and mark the locations corresponding to the POI recommendations by carrying SR device 24 to each location and then recording location-specific data, here GPS coordinates. Additionally or alternatively, an SR may select businesses, schools, parks, community centers, or other such POI recommendations by interacting with a GPS map application executing on SR device 24. In other implementations, an SR may create the POI recommendations by selecting locations from a GPS navigation application or interactive map, with the content of the POI recommendations then automatically populated from the information stored by the navigation application. Thus, generally stated, ESW server end 26 may store the SR-specified POI recommendations in a memory accessible to server end 26 (e.g., in one of databases 58, 66, 68); determine when an interested party has completed the check-out process, is nearing completion of the check-out subprocess, or is otherwise in the process of concluding a walkthrough via data entered into IP device 22. When determining that the interested party is completing the check-out subprocess or is otherwise concluding the enhanced walkthrough, transmit instructions to IP device 22 to present the SR recommendations for POIs with the area in which the structure is located. In other embodiments, EWS server end 26 may transmit such POI recommendations to IP device 22 for presentation to the interested party if, during the check-out subprocess, the interested party expresses further interested in the structure or the surrounding area in which the structure is located.

Structure Representative Monitoring of Walkthrough Progress

As noted above, ESW server end 26 repeatedly receives location reporting signals from IP device 22 during a walkthrough. Utilizing this and possibly other data, ESW server end 26 may provide SR device 24 with status updates regarding the progress of the walkthrough. Such updates may be presented in any suitable format, including as in-app notifications, as text (e.g., MMS, SMS, or RSS) messages, or as push notifications. In one embodiment, such status updates are presented within software application 54, which further enables the SR to perform other functions, such as initiating or participating in the above-described anonymized live chat function. An example of a GUI home screen 392 generated on SR device 24 for this purpose is shown in FIG. 32. GUI home screen 392 enables an SR to interface with SR device 24 during a walkthrough, while receiving real-time or near real-time status updates pertaining to the progress of the walkthrough. The status updates are provided to SR device 24, over network 56, and by ESW server end 26, which monitors the progress of the walkthrough based, at least in part, on location reports and other communications received from IP device 22 over network 56. In certain embodiments, ESW server end 26 may also monitor events pertaining to walkthrough utilizing data provided by other network-connected sources, such as gatekeeper 70 and/or a network-connected security system if installed in the structure subject to walkthrough. GUI screen 392 further provides the SR with a walkthrough countdown readout 394 of the time remaining for completion of the walkthrough, based upon the previously-established walkthrough schedule or the time at which the interested party completes the check-in process; e.g., completion of the check-in process may commence a countdown of a timer initially set to the scheduled duration of the walkthrough. Again, this readout 394 is updated should the interested party request an extension of time for the walkthrough in the above-described manner, providing the extension request is granted. Certain information pertaining to the interested party currently conducting the walkthrough (e.g., a name, a profile picture if available, and possibly other information) is further presented in the header section of GUI screen 392 as readout 396.

Two user-selectable tabs 398, 400 on example GUI screen 392 are provided allowing user navigation between two content pages. When selected, tab 398 (entitled "MY BUILDING") recalls content pertaining to the building (or other structure) subject to walkthrough, which may be editable by the SR utilizing SR device 24. Comparatively, tab 400 (entitled "TOURING") can be selected by the SR to recall functionalities and information pertaining to the current walkthrough. Specifically, in the illustrated example, the TOURING page or content area provides a LIVE CHAT option 402, with icon 404 identifying the number of yet-to-be viewed messages appearing in the live chat string. Further, as appearing in lower region 406 of GUI screen 392, a listing of events occurring during the walkthrough is provided in chronological order, with the newest event appearing first in this list Such events may include the times at which initiation and/or successful completion of the check-in and check-out subprocesses occur, if practiced. Additionally or alternatively, such events may include times at which notification or messages (e.g., SR-programmed messaging and backdoor reminders) are presented to or viewed by the interested party. Further notifications may include, for example, the failure of an interested party to complete the check-out subprocess following the generation of a certain number of check-out omission alert warnings, as previously described.

Additional Discussion of Agent Linking

Addressing lastly FIG. 33, embodiments of the systems, methods, and program products described herein permit various communication flows through ESW server end 26 and between different combinations of network-connected devices associated with the enhanced walkthrough process. As indicated in this drawing figure, such network-connected devices may include IP device 22, SR device 24, any number of service provider devices 410, one or more agent devices 412 linked to an account or profile created for the SR operating SR device 24 (hereafter, "SR-linked agent devices 412"), and one or more agent devices 414 linked to an account or profile created for the interested party operating IP device 22 (hereafter, "IP-linked agent devices 414"). Communication exchange between SR device 24 and ESW server end 26 is represented in FIG. 33 by double-headed arrow 416. Relatedly, double-headed arrows 418 represent communication exchange between service provider devices 410 and ESW server end 26, as well as between SR-linked agent devices 414 and ESW server end 26. As indicated by the manner in which double-headed arrows 418 stem from a mid-section of double-headed arrow 416, ESW server end 26 may include or copy multiple parties (that is, two or more of service provider devices 410, SR device 24, and SR-linked agent devices 412) in communication transmissions occurring during or otherwise related to the above-described enhanced walkthrough process. Similarly, communications between ESW server end 26 and IP device 22 (represented by double-headed arrow 420 in FIG. 33) may be shared with one or more IP-linked agent devices 414 in embodiments, as indicated by double-headed arrow 422.

In embodiments, an SR can interact with ESW server end 26 through a network-connected device, such as SR device 24 (particularly, when executing application 54), to create a user account or profile stored in one of databases 68, as previously described. After this is done, the SR may be permitted to further link an agent device, such as the smartphone or other network-connected device of a real estate agent or building manager, with the SR's account; again, such an option may be offered utilizing application 54 executing on SR device 24. Once linked, the SR agent may be permitted to interact with the agent's device to participate in certain actions or functions described throughout this document. For example, in certain embodiments, an SR-linked agent device or devices 412 may be automatically included in any live chat session initiated between the interested party utilizing IP device 22 and the SR utilizing SR device 24. This permits the SR agent to conduct such chat interactions on behalf of the SR when desired, to selectively interject in the text communication when appropriate, or to simply monitor the text communications between the SR and the interested party. Again, ESW server end 26 enables this functionality by storing in memory (e.g., in one of databases 68) contact information (e.g., a phone number) for one or more agent devices 412 linked to the SR account associated with the device 24; and, when routing text communications between SR device 24 and IP device 22, further directing such text communications to agent device(s) 412. As noted above, such text communications may be anonymized in embodiments such that full contact information is not shared and/or such text communication may be limited to a finite time window encompassing a scheduled walkthrough. Similarly, ESW server end 26 may further send notifications to the linked agent devices 412 noting the occurrence of key events during the walkthrough, such as the successful completion of the check-in subprocess, the presentation of SR-created messaging, the successful completion of the check-out subprocess, and any check-out omission alerts that may be generated. In still further embodiments, an SR may grant a linked agent "write" access (in addition to "read" access) such that the SR agent may utilize an SR-linked agent device 412 to create content (e.g., the above-described SR-created messaging), to schedule the availability of a structure for walkthroughs, and/or to perform any of the other actions described above in connection with SR device 24, as determined by user preference settings.

In an analogous manner, an interested party operating IP device 22 may create a user account or profile with ESW server end 26 and subsequently link one or more IP agents, and associated agent devices 414, to the interested party account in embodiments. Again, text communications or live chat occurring between SR device 24 and IP device 22 are routed through EWS server end 26, which may automatically include any IP-linked agent devices 414 in such live chat communications or walkthrough event notifications. Further, in implementations, such live chat communications may occur in the context of a specialized application 38 executing on IP device 22, a complementary application 54 executing on SR device 24, and a further complementary software application executing on IP-linked agent devices 414. Generally, then, ESW server end 26 enables agent linking of user accounts (SR and interested party accounts) in embodiments, with ESW server end 26 storing contact information for such agent devices in memory (e.g., in one of databases 68), recalling this information when needed, and automatically including the appropriate agent device or devices in (e.g., anonymized) text communications/or and event notifications occurring during an enhanced walkthrough.

The above-described check-in subprocess, check-out subprocess, and online scheduling functions are usefully extended to home service providers in embodiments, such as repair personnel, home cleaning services, home inspectors, and the like. Such home service providers may further communicate with ESW server end 26 utilizing service provider devices 410 in a manner similar to that described above in connection with IP device 22 when attempting to gain structure access through the above-described check-in subprocess, when re-securing the structure upon leaving through a check-out subprocess, and/or when scheduling a time slot to occupy a tourable structure. As will be appreciated in view of the foregoing description, and as mentioned above, certain modifications will be made to the check-in subprocess, the check-out subprocess, and/or the scheduling process in the case of analogous processes carried-out utilizing a service provider device 410. For example, in the case of check-in, the above-described questions may not be posed to the service provider. Nor may a minimum battery charge level threshold be required to gain structure access. Essentially, then, check-in may involve confirming the identity of the service provider and/or a service provider device 410 by comparing data (e.g., a timestamped image or video of the service provider's face) collected during the time of check-in via the service provider device 410 to profile information stored in one of databases 68 as a previously-created service provider account or profile. Similarly, the service provider may perform a check-out subprocess utilizing the corresponding service provider device 410, with appropriate modifications made to the check-out process described above in connection with IP device 22.

Finally, as noted above, online scheduling of time slots to occupy a tourable structure may be carried-out in a manner substantially identical to that described above, with the exception that a service provider may be able to block-out or reserve longer periods of time (perhaps time slots without a specified end time) to occupy the tourable structure. All such interactions, or certain key interactions, between service providers utilizing service provider devices 410 and ESW server end 26 may be reported to SR device 24 via transmissions or notifications sent from ESW server end 26, over network 56, and to SR device 24. Such notifications may thus advise the SR as to key scheduling events, check-in events, and/or check-out events involving service providers for a single tourable structure or, perhaps, multiple tourable structures, with such notifications presented in any suitable manner on SR device 24; e.g., as in-app messages or notifications within application 54 executing on SR device 24, as push notifications, as text or email messages, or similar electronic communications, or any combination thereof.

Additional Discussion of SR-created Messaging for Presentation or Offered Presentation to an Interested Party During an Enhanced Walkthrough As discussed above, embodiments of the present disclosure enable an SR to create location-referend or geotagged messaging, which is presented to (or offered for presentation to) an interested party during an enhanced walkthrough based upon location tracking of an IP device carried by the interested party. A similar approach can also be employed when other environmental targets, such as wireless beacons or machine-scannable or machine-readable codes (e.g., a QR code or another matrix barcode), are utilized to trigger presentation of SR-created messaging corresponding to a specific target In the case of machine-readable codes, SR notifications may be assigned or corresponding to tags (physical markers) distributed throughout the structure by an SR or another party. The SR messaging is thus not directly tied to fixed spatial locations in such embodiments, but rather associated with tags for placement in the walkthrough environment by the SR. The tags can be scanned utilizing IP device 22; e.g., in embodiments, the tags may feature unique imagery recognize by IP device 22, such as machine-readable (e.g., QR) codes, which can be captured utilizing a camera of device 22 and then utilized to trigger corresponding SR-created notifications. In this instance, the SR may be supplied with a plurality of machine-readable visual tags or markers for distribution around the structure, with tags bearing QR codes representing one suitable possibility. The SR may be provided with a plurality of such tags and then utilize a webpage, a GUI provided in the context of a software application (e.g., application 54) executing on SR device 24, or otherwise access a GUI enabling programming messaging into an online or cloud-based database, such as database 58 maintained by ESW server end 26 (FIG. 1). The SR may then enter one or messages into database 58 for each uniquely-identified QR tag, with a message corresponding to a particular tag presented (or offered for presentation) to the interested party when the particular tag is scanned utilizing IP device 22.

As mentioned in the previous paragraph, wireless beacons can also be utilized to trigger message presentation (or offers to present SR-created messaging) to the interested party during the course of a walkthrough in further embodiments. In this latter case, as an example, the automatic presentation of a particular SR-created message or notification may be triggered when IP device 22 is brought into a predetermined proximity of a particular beacon, such as such as BLE, NFC, and/or RFID (if readable by IP device 22) beacon. When brought into sufficiently proximity of a particular beacon, IP device 22 may receive a signal from the beacon, with the signal including a unique identifier for the beacon. IP device 22 may then transmit a signal containing the unique identifier to server end 26 over network 56. In response, server end 26 may then return to IP device 22 one or more corresponding SR notifications extracted from database 58 corresponding to the unique identifier (e.g., as recalled from a lookup table or other data structure) for presentation or offered presentation to the interested party via IP device 22. Again, such messaging may be created by the SR (e.g., utilizing SR device 24), with the SR-created messaging provided to server end 26 for storage in database 58 as a SR-created message set. In further embodiments, beacons emitting a wireless signal may be distributed at different locations around a tourable structure for usage in more accurately tracking the indoor position of IP device 22 during a walkthrough; e.g., through RTT or RSSI measurements of such beacons or nodes as captured by IP device 22 and compared to data stored in the location-referenced message set identifying the locations previously marked by the SR using SR device 24, as previously described.

Embodiments of the Present Disclosure Can Include Any Number and Combination of the Aspects or Technical Features Described Herein Embodiments of the present disclosure can encompass any number and combination of the aspects or features described throughout this document. Any particular feature set-forth herein should therefore be considered non-essential and potentially omitted from implementations unless otherwise expressly described as essential. For example, the above-described electronic gatekeeper functions can be performed independently of the other aspects of an enhanced walkthrough. In this scenario, an electronic gatekeeper may perform one or more of the above-described functionalities related to check-in (providing physical admission to) and/or check-out (ensuring re-securing of) a particular structure. In such embodiments, the experience of the interested party and SR may be improved through the provision of the other walkthrough enhancement functions described above; however, the implementation of such functionalities is unnecessary to the operation of the electronic gatekeeper. Consequently, in such embodiments, an interested party may not execute a software application on an IP device or otherwise carry an IP device as an electronic gatekeeper itself may perform one or more of the above-described functions.

Conversely, it is unnecessary to include an electronic gatekeeper in all embodiments of the present disclosure. Instead, in certain implementations, a human gatekeeper (e.g., the SR, a seller's agent, or a buyer's agent) may open the structure for entry of the interested party and/or resecure the structure after the interested party completes the walkthrough; or, as a further possibility, the structure may be simply left unlocked if security concerns permit In this instance, location-based presentation of SR-created messages may still be carried-out utilizing IP device 22 and ESW server end 26 in a manner similar or identical to that previously described. Additionally or alternatively, any of the other above-described ESW functions can be performed including the data recordation and anonymized chat functionalities. Accordingly, embodiments of the present disclosure can be utilized in conjunction with licensed real estate agents (or other human chaperones), which may perform the traditional functions of allowing an interested party into a structure, providing information related to the structure, re-securing the structure after conclusion of the walkthrough, and so on. Again, in such an instance, any combination of the above-described SR-created message presentation (or prompting), secondary entry point reminders, IP walkthrough album creation, anonymized chat, SR-created POI recommendations, or other functionalities may still be performed during the walkthrough, as desired.

Enumerated Examples of the Systems, Devices, Methods, and Program Products Described Herein The following examples of the systems, devices, methods, and program products for enhancing structure walkthroughs are provided and numbered for ease of reference.

1. In embodiments, a method is performed during a walkthrough of a structure having or associated with an SR. The walkthrough is conducted by an interested party carrying an IP device, which communicates over a network with a server end during the walkthrough. The method includes the steps or processes of: monitoring a current location of the IP device utilizing data collected by the IP device during the walkthrough; detecting, based on the current location of the IP device, when the IP device is brought into proximity of a first SR-marked location included in a plurality of SR-marked locations associated with the structure; and, in response to detecting that the IP device has been brought into proximity of the first SR-marked location, (i) identifying a first SR-created message corresponding to the first SR-marked location and contained in a location-referenced message set, the location-referenced message set including a plurality of SR-created messages each linked to at least one of the plurality of SR-marked locations; and (ii) generating or causing generation of an SR message notification on the IP device, the SR message notification presenting or offering to present the first SR-created message to the interested party via the IP device.

Discussing example 1 further, the server end, the IP device, or a combination of the server end and the IP device can practice the method of example 1 in embodiments. In a scenario in which the server end performs the step of "generating or causing generation," the server end may "cause generation" of the SR message by transmitting a command signal to the IP device instructing the IP device to present the SR message notification, whether audibly, visually (by display on a display screen of the IP device), or a combination thereof. See example 4 below. Similarly, the step of "identifying" may be performed by the server end when recalling the first SR-created message from the server-accessible memory in which the location-referenced message set is stored. Comparatively, in a scenario in which the IP device practices the step of "generating or causing generation," the IP device itself (or, more specifically, a processor architecture within the IP device) "generates" the SR-created message on the IP device by audible playback and/or by displaying the SR message notification on a display screen of the IP device. In such embodiments, the IP device may independently determine when to generate the first SR message notification if the IP device is so capable; or, instead, the IP device may determine that the first SR message notification is appropriately generated by awaiting and receiving a command signal from the server end instructing the IP device to present the first SR message notification. See example 5 below. The IP device may also perform the step of "identifying," in embodiments, by recalling the first SR-created message from the location-referenced data set if, for example, the data set is downloaded to local memory ahead of the walkthrough (noting that the location-referenced message set will still typically reside in the memory accessible to the server end in such a scenario). Alternatively, the IP device may perform the step of "identifying" by transmitting a request for the first SR-created message and receiving the first SR-created message from the server end. In other words, the IP device may "fetch" the first SR-created message from the server end when appropriate based, at least in part, on the monitored location of the IP device during the walkthrough. Stated still differently, the IP device may transmit "if-then" requests to the ESW server end asking, in essence, "If this is my current location, then what actions (if any) do I, the IP device, take?"

Still discussing example 1 above, the recitation appearing in example 1 stating that the current location of the IP device is monitored during the walkthrough does not preclude that the location of the IP device may be monitored some time before and/or some time following the walkthrough. Note also that the recitation that "the location-referenced message set [contains] a plurality of SR-created messages linked to the plurality of SR-marked locations" indicates that the SR-created messages are each linked (that is, correspond to) at least one of the plurality of SR-marked locations. Additionally, in embodiments, the step of "generating or causing generation of an SR message notification on the IP device" may not be repeatedly performed if it is determined that the SR message notification (presenting or offering to present the first SR-created message to the interested party) has already been presented to the interested party via the IP device at any earlier juncture during the walkthrough. Reference to the IP device brought into "proximity" of the first SR-marked location denotes that the IP device is brought near or adjacent the first SR-marked location. For example, in an implementation in which the first SR-marked location is defined by GPS coordinates (and perhaps also identified utilizing other location-specific information, such as the signal strengths and/or RTT of nearby wireless nodes detected by the IP device), the IP device may be considered to have been brought into proximity of the SR-marked location when the IP device is brought into a predetermined number of (x) feet or meters (e.g., 9 feet or about 2.7 meters) of the GPS coordinates of the first SR-marked location. The location of the IP device during the walkthrough can be monitored by the IP device and/or the server end utilizing data collected by the IP device (e.g., GPS coordinates, RSSI or RTT data of identified nodes, magnetic field sensing, dead reckoning data, and the like). In certain instances, it is also possible for the server end to monitor the location of the IP device during the walkthrough utilizing other sensors, such as cameras, microphones (e.g., as included in a smart-speaker), motion detectors (e.g., as included in a home security system), if present in the structure subject to walkthrough. In other embodiments, only sensor data collected by the IP device may be utilized to track the position of the IP device during the walkthrough.

2. The method of example 1, wherein the location-referenced message set is stored in a memory accessible to the server end. Further, the first SR-created message is transmitted from the server end, over the network, and to the IP device during or prior to the walkthrough.

3. The method of example 2, wherein monitoring includes monitoring the current location of the IP device at the server end based, at least in part, on location report signals repeatedly transmitted from the IP device, over the network, and to the server end during the walkthrough.

4. The method of example 3, wherein generating or causing generation involves transmitting a command signal from the server end, over the network, and to the IP device, the command signal containing the first SR-created message and instructing the IP device to generate the SR message notification thereon.

5. The method of example 2, wherein generating or causing generation involves: (i) receiving, at the IP device, a command signal transmitted over the network from the server end, the command signal containing the first SR-created message and instructing the IP device to generate the SR message notification thereon; and (ii) in response to receipt of the command signal, generating the message notification on a display screen of the IP device.

6. The method of example 2, wherein a gatekeeper device selectively permits access to the structure through a main entry point. The method further includes the steps or processes of: (i) receiving, at the server end, check-in data transmitted from the IP device, over the network, and to the server end, the check-in data entered into the IP device by the interested party when attempting to gain access to the structure; (ii) determining, at the server end, whether the check-in data is valid; and (iii) if determining that the check-in data is valid, transmitting or causing transmission of a signal over the network and to the gatekeeper device instructing the gatekeeper device to grant the interested party access to the structure. In this example, the action of "transmitting" may be performed when server end directly sends the GRANT ACCESS signal or UNLOCK command to the gatekeeper. Comparatively, the action of "causing transmission" may be performed when the server end requests that another entity or network-connected device (e.g., a third party server) send such a signal to the gatekeeper.

7. The method of example 6, wherein, during the walkthrough, the server end communicates with an SR device operated by the SR. The method further includes, substantially concurrently with instructing the gatekeeper device to grant the interested party access to the structure, sending a command signal from the server end, over the network, and to the SR device instructing the SR device to generate a notification advising the SR that the walkthrough has commenced.

8. The method of example 6, further including: (i) if determining that the check-in data is valid, further calculating a time remaining for completion of the walkthrough based on a time of check-in and a predetermined walkthrough duration; and (ii) generating or causing generation, on a display screen of the IP device, a running countdown of the time remaining for the completion of the walkthrough.

9. The method of example 2, wherein a Graphical User Interface (GUI) element is presented on a display screen of the IP device enabling the interested party to request an extension of time for completion of the walkthrough via the IP device. The method further includes: (i) if the interested party requests an extension of time for completion of the walkthrough via the IP device, determining whether the request should be granted; and (ii) if determining that the request should be granted, generating or causing generation of a first notification on the IP device indicating that the request for the extension of time has been granted.

10. The method of example 1, further including: (i) predicting, based at least in part on the monitored current location of the IP device, whether the interested party is traveling away from the structure without completion of a mandatory check-out subprocess after commencement of the walkthrough; and (ii) when predicting that the interested party is traveling away from the structure without completion of the mandatory check-out subprocess, generating or causing generation of a first check-out omission alert on the IP device.

11. The method of example 10, wherein predicting entails predicting whether the interested party is traveling away from the structure without completion of the mandatory check-out subprocess based, at least in part, on whether the IP device is traveling at a speed exceeding a predetermined speed threshold.

12. The method of example 10, further including: (i) determining whether the interested party continues to travel away from the structure after generation of the first check-out omission alert on the IP device and elapse of a first predetermined wait period; and (ii) if determining that the interested party continues to travel away from the structure after generation of the first check-out omission alert and elapse of the first predetermined wait period, generating or causing the generation of a second check-out omission alert on the IP device, the second check-out omission alert having a higher urgency than does the first check-out omission alert.

13. The method of example 1, further including the steps or processes of: (i) determining, based upon the current location of the IP device and a scheduled duration of the walkthrough if the interested party remains within the structure following elapse of the scheduled duration of the walkthrough; and (ii) if determining that the interested party remains within the structure following elapse of the scheduled duration of the walkthrough, generating or causing generation of an alert on the IP device instructing the interesting party to conclude the walkthrough and exit the structure.

14. The method of example 1, further including: (i) determining, at the ESW server end via data entered into the IP device, when the interested party is completing the walkthrough; and (ii) when determining that the interested party is completing the walkthrough, transmitting instructions to the IP device to present SR recommendations of points-of-interest within an area in which the structure is located.

15. The method of example 1, further including: (i) constructing, at the server end, the location-referenced message set prior to commencement of the walkthrough; and (ii) storing the location-referenced message in the memory accessible to the server end for subsequent reference during walkthroughs of the structure.

16. The method of example 15, wherein constructing entails: (i) receiving, at the server end, data transmitted from an SR device identifying the plurality of SR-marked locations, as captured by the SR device when carried to each of the plurality of SR-marked locations by the SR; and (ii) further receiving, at the server end, additional data transmitted from the SR device specifying a plurality of SR-created messages linked to the plurality of SR-marked locations.

17. The method of example 1, wherein the structure has a main entry point and a secondary entry point, the interested party entering the structure through the main entry point when commencing the walkthrough. The method further includes: (i) determining when the IP device is carried outside of the structure or brought back into the structure through the secondary entry point; and (ii) when determining that the IP device has been carried outside of the structure or brought back into the structure through the secondary entry point, generating or causing generation of a reminder on the IP device advising the interested party to re-secure the secondary entry point when re-entering the structure therethrough.

18. The method of example, further including the steps or processes of: (i) calculating a time remaining for completion of the walkthrough based on a time of check-in and pre-established scheduling data for the walkthrough; and (ii) generating or causing generation, on a display screen of the IP device, a running countdown of the time remaining for the completion of the walkthrough.

19. In further embodiments, the method includes the step or process of: storing, in a memory accessible to the server end, a location-referenced message set containing a plurality of SR-created messages linked to a plurality of SR-marked locations associated with the structure; determining when a first SR-created message included in the plurality of SR-created messages is desirably presented to the interested party via the IP device based, at least in part, on data transmitted from the IP device, over the network, and to the server end during the walkthrough; and when determining that the first SR-created message is desirably presented to the interested party, (i) recalling the first SR-created message from the location-referenced message set; and (ii) transmitting an instruction signal from the server end, over the network, and to the IP device instructing the IP device to generate a notification on the IP device, the notification presenting or offering to present the first SR-created message to the interested party via the IP device.

20. In still further embodiments, a method performed utilizing an SR device in communication with a server end over a network, the SR device operated by an SR for a structure availed for walkthrough. The method includes the step or process of receiving SR input data entered into the SR device, the SR input data: (i) identifying a plurality of SR-marked locations associated with the structure, (ii) creating a plurality of SR-created messages, and (iii) specifying which of the plurality of SR-created messages is desirably linked to which of the plurality of SR-marked locations. The method also includes transmitting the SR input data from the SR device, over the network, and to the server end, the server end storing the SR input data end as a location-referenced message set in a memory accessible to the server. The step of receiving includes, in turn: generating a prompt (e.g., a message, such as typed instructions) on the SR device instructing the SR to carry the SR device to a location desirably marked for linkage to an SR-created message; when determining that the SR has carried the SR device to the location desirably marked for linkage to an SR-created message, recording location data captured by the SR device and identifying the newly-marked location; and repeating the steps of generating and recording to identify the plurality of SR-marked locations for linkage to the plurality of SR-created messages.

21. The method of example 20, further including: (i) determining when the SR device has been carried to an SR-selected location desirably marked for linkage to an SR-created message; (ii) when so determining, recording location data captured by the SR device and pertaining to the SR-selected location; (iii) receiving data, via the SR device, specifying content for an SR-created message desirably linked to the SR-selected location; (iv) repeating the steps of determining, recording, and receiving to compile the location-referenced message for storage in the server end-accessible memory.

22. In other instances, a method includes the steps or processes of: (i) monitoring a current location of the IP device utilizing data collected by the IP device during the walkthrough; (ii) determining, based at least in part on the monitored current location of the IP device, whether the interested party completes a mandatory check-out process within a predetermined time period prior to leaving the vicinity of the structure; and (iii) when determining that the interested party fails to complete the mandatory check-out process within a predetermined time period prior to leaving the vicinity of the structure, generating or causing generation of a first check-out omission alert on the IP device.

23. The method of example 22, wherein determining whether the interested party completes the mandatory check-out process includes determining whether the interested part is traveling away from the structure without completion of the mandatory check-out subprocess.

24. The method of example 23, further including repeatedly transmitting data from the IP device to the server end reporting the current location of the IP device during the walkthrough. Further, determining includes determining, at the server, whether the interested party is traveling away from the structure without completion of the mandatory check-out subprocess based, at least in part, on the data received from the IP device. Additionally, the step of generating or causing generation includes, when predicting that the interested party is traveling away from the structure without completion of the mandatory check-out subprocess, transmitting an instruction from the server end, over the network, and to the IP device commanding the IP device to generate the first check-out omission alert.

25. The method of example 23, wherein predicting includes predicting whether the interested party is traveling away from the structure without completion of the mandatory check-out subprocess further based on whether the IP device is traveling at a speed exceeding a predetermined speed threshold.

26. The method of example 23, further including the steps or processes of: (i) determining whether the interested party continues to travel away from the structure after generation of the first check-out omission alert on the IP device and elapse of a first predetermined wait period; and (ii) if determining that the interested party continues to travel away from the structure after generation of the first check-out omission alert and elapse of the first predetermined wait period, generating or causing the generation of a second check-out omission alert on the IP device. The second check-out omission alert is generated to have a higher urgency than does the first check-out omission alert.

27. The method of example 22, further including: (i) determining whether the IP device remains within the structure based after elapse of a scheduled duration for the walkthrough, and (ii) if determining that the IP device remains within the structure based after elapse of the scheduled duration for the walkthrough, generating or causing generation of a first check-out omission alert (e.g., an overstay alert) on the IP device.

28. The method of example 22, further including: (i) detecting, based upon input received via the IP device, when the interested party requests an extension of time for completion of the walkthrough; (ii) when detecting that an extension of time has been requested, determining whether the extension of time request should be granted, and (iii) if determining that the extension of time request should be granted, updating the predetermined time period to include the extension of time.

29. The method of example 22, wherein a gatekeeper device regulates access to the structure through a main entry point; and wherein the method further includes determining whether the mandatory check-out process has been completed based, at least in part, on data received from the gatekeeper device.

30. The method of example 29, wherein the data indicates whether the main entry point has been relocked after the interested party has exited the structure.

31. In additional implementations, the method includes the steps or processes of: (i) monitoring a current location of the IP device utilizing data collected by the IP device during the walkthrough; (ii) determining, based at least in part on the monitored current location of the IP device, whether the interested party remains within the structure following elapse of scheduled duration for the walkthrough; and (iii) in response to determining that the interested party remains within the structure following elapse of scheduled duration for the walkthrough, generating or causing generation of a check-out omission alert on the IP device instructing the interested party to exit the structure and complete a mandatory check-out subprocess.

32. The method of example 31, further including repeatedly transmitting data from the IP device to the server end reporting the current location of the IP device during the walkthrough. The step of determining entails determining, at the server, whether the interested party remains within the structure following elapse of scheduled duration for the walkthrough. Further, the step of generating or causing generation involves, when determining that the interested party remains within the structure following elapse of scheduled duration for the walkthrough, transmitting an instruction from the server end, over the network, and to the IP device commanding the IP device to generate the check-out omission alert.

33. The method of example 31, further including: (i) monitoring a time remaining for completion of the walkthrough based upon a scheduled duration of the walkthrough and a time of check-in; and (ii) if the time remaining for completion of the walkthrough is less than a minimum time threshold, generating a warning on the client device prompting the interested party to complete the check-out subprocess and terminate the walkthrough.

34. In yet further embodiments, a method is performed during a walkthrough of a structure having a main entry point and a secondary entry point. The method includes the steps or processes of: (i) monitoring a current location of the IP device utilizing data collected by the IP device during the walkthrough; (ii) determining, based at least in part on the monitored current location of the IP device, when the IP device is transported through (that is, carried outside of the structure or brought into the structure through) the secondary entry point; and (iii) when determining that the IP device has been transported through the secondary entry point, generating or causing generation of a secondary entry point reminder on the IP device advising the interested party to re-secure the secondary entry point when re-entering the structure through the secondary entry point.

35. The method of example 34, further including repeatedly transmitting data from the IP device to the server end reporting the current location of the IP device during the walkthrough. The step of determining involves determining, at the server, when the IP device is carried outside of the structure through the secondary entry point. The step of generating or causing generation includes, when determining that the interested party remains within the structure following elapse of scheduled duration for the walkthrough, transmitting an instruction from the server end, over the network, and to the IP device commanding the IP device to generate the secondary entry point reminder thereon.

36. The method of example 34, wherein, during the walkthrough, the server end communicates with an SR device operated by the SR. Additionally, the method further includes the steps or processes of: (i) prior to commencement of the walkthrough, receiving data at the server end transmitted over the network from the SR device marking one or more locations corresponding to the secondary entry point; and (ii) storing the data in a memory accessible to the server for subsequent usage in determining if and when to generate the secondary entry point reminder on the IP device during the walkthrough.

37. In further implementations, the method includes the steps or processes of: (i) receiving check-in data during a check-in attempt by an interested party requesting access to a structure to conduct a walkthrough, the structure equipped with a gatekeeper device regulating access through a main entry point of the structure, at least a portion of the check-in data received via an IP device operated by the interested party; (ii) determining, at a server end, whether the interested party is properly granted access to the structure based, at least in part, on a current battery charge level of the IP device indicated by the check-in data; and (iii) if determining that the interested party is properly granted access to the structure, transmitting or causing transmission of a signal over the network and to the gatekeeper device instructing the gatekeeper device to grant the interested party access to the structure.

38. The method of example 37, further comprising determining whether the interested party is properly granted access to the structure based, in part, on whether the remaining battery life of the IP device exceeds a predetermined threshold, which encompasses a time period equal to or greater than a scheduled duration of the walkthrough.

39. In further embodiments, a method is carried-out by a server end supporting an enhanced walkthrough of a structure. The method includes the steps or processes of: (i) receiving check-in data during a check-in attempt by an interested party requesting access to the structure to conduct a walkthrough, the structure equipped with a gatekeeper device regulating access through a main entry point of the structure, (ii) determining, at the server end, whether the interested party is properly granted access to the structure based, at least in part, on whether the check-in data corresponds to data stored in a memory accessible to the server end; and (iii) if determining that the interested party is properly granted access to the structure, transmitting or causing transmission of a signal over the network and to the gatekeeper device instructing the gatekeeper device to grant the interested party access to the structure.

40. The method of example 39, further comprising if determining that the interested party is not properly granted access to the structure, transmitting an instruction to the IP device to display a message indicating that the check-in attempt was unsuccessful.

41. The method of example 39, wherein the transmitting or causing transmission includes sending a request from the server end, over the network, and to a third party to transmit the signal to the gatekeeper device instructing the gatekeeper device to grant the interested party access to the structure.

42. The method of example 39, further including: (i) receiving data from the IP device indicating a remaining battery life of the IP device; and (ii) further determining whether the interested party is properly granted access to the structure based, in part, on whether the remaining battery life of the IP device exceeds a predetermined threshold.

43. The method of example 42, wherein the predetermined threshold encompasses a time period equal to or greater than a scheduled duration of the walkthrough.

44. The method of example 39, wherein, during the walkthrough, the server end communicates with an SR device operated by the SR. The method further includes, substantially concurrently with instructing the gatekeeper device to grant the interested party access to the structure, sending a command signal from the server end, over the network, and to the SR device instructing the SR device to generate a notification advising the SR that the walkthrough has commenced.

45. The method of example 39, further including the steps of processes of: (i) receiving structure-related content (e.g., still images, videos, typed notes, or voice recordings) from the IP device, transmitted over the network, and to the server end during the walkthrough; and (ii) storing, in a memory accessible to the server end, the content in a walkthrough album for subsequent access by the interested party.

46. The method of example 39, further including the steps or processes of: (i) repeatedly receiving location report signals from the IP device at the server end during the walkthrough; (ii) utilizing the location report signals to compile a device location timeline of the walkthrough at the server end; and (iii) storing the device location timeline in a memory accessible to the server end.

47. In various other implementations, the method includes the steps or processes of: (i) initiating a check-in subprocess, utilizing the first client device, to determine whether a user (e.g., an interested party or a home service provider, such as contractor, repair personnel, home inspector, home cleaner, or the like) is appropriately granted access to a structure; (ii) capturing, at the first client device, biometric data (e.g., a digital picture, video, or fingerprint of the interested party or the home service) from the user in response to initiation of the check-in subprocess; (iii) transmitting from the first client device, over the network, and to the server end, the biometric data for comparison to previously-collected biometric data stored in a database accessible to the server end; (iv) receiving, at the first client device, a reply transmission from the server end indicating whether the user has been granted access to the structure; and (v) performing, at the first client device, at least one predetermined action in response to whether the reply transmission indicates that the user is properly granted structure access.

48. The method of example 47, wherein the at least one predetermined action includes generating, on a display screen of the first client device, a notification of a successful check-in if the reply transmission from the server end indicates that the user is properly granted structure access.

49. The method of example 47, wherein the biometric data includes or assumes the form of a facial picture of the user, as captured utilizing the first client device (e.g., the IP device or gatekeeper).

50. The method of example 47, wherein the biometric data includes or assumes the form of a video clip captured utilizing the first client device (e.g., the IP device or gatekeeper) of the user's face, while the user states the user's name.

51. The method of example 47, wherein the first device further transmits GPS coordinates or other location data (e.g., RTT or RSSI measurements of wireless nodes) collected by the first client device to the server end. In some cases, the server end may determine whether to grant structure access to the interested party based, at least in part, on whether the location data indicates that the first client device is within a predetermined proximity of the structure.

52. The method of example 47, wherein the server end includes time of check-in to a prescheduled walkthrough or service window and determines whether structure access is appropriate (and provide a corresponding reply transmission to the first client device) based, at least in part, upon the time of check-in as compared to the prescheduled walkthrough window.

53. In further embodiments, the method includes the steps or processes of: (i) determining, at the first client device, when a user or interested party desires to terminate a walkthrough of a structure; and (ii) when determining that the interested party desires to conclude the walkthrough, initiating a check-out subprocess including confirming that a main entry point of the structure has been resecured or locked after the interested party has exited the structure. In embodiments, it is determined when a user or interested party desires to terminate a walkthrough by receiving user input via the first client device (e.g., IP device 22) selecting a check-out option presented on the first client device.

54. The method of example 53, wherein confirming that the main entry point has been resecured includes: (i) transmitting a signal from the first client device or from a server end (in direct or indirect communication with the gatekeeper over a network) querying the gatekeeper as to whether a lock mechanism controlled by the gatekeeper has been engaged; and (ii) receiving a response in return.

55. The method of example 53, further including confirming that the interested party has exited the structure based upon location data (e.g., GPS coordinates, RSSI measurements, or RTT measurements) captured by the IP device; and/or utilizing data collected by other devices (e.g., cameras, motion sensors, smart-speakers, etc.) located within or adjacent the structure.

56. In other embodiments in which a walkthrough of a structure is conducted by an interested party carrying an IP device, the method includes: (i) generating at least one GUI element on a display screen of the IP enabling the interested party to request an extension of time for completion of the walkthrough via the IP device; (ii) if the interested party requests an extension of time for completion of the walkthrough via the IP device, determining whether the request should be granted; and (iii) if determining that the request should be granted, generating or causing generation of a first notification on the IP device indicating that the request for the extension of time has been granted.

57. The method of example 56, further including: (i) calculating a time remaining for completion of the walkthrough based on a time of check-in and pre-established scheduling data for the walkthrough; and (ii) generating or causing generation, on a display screen of the IP device, a running countdown of the time remaining for the completion of the walkthrough.

58. The method of example 56, wherein, during the walkthrough, the server end communicates with an SR device operated by the SR. The method further includes sending a command signal from the server end, over the network, and to the SR device instructing the SR device to generate a second notification on a screen of the SR device. The second notification: (i) informs the SR that the walkthrough has been extended if the server end is authorized to grant the extension of time for completion of the walkthrough and the server end has done so, or (ii) requests verification from the SR whether to grant the requested extension of time for completion of the walkthrough if the SR retains exclusive authority grant the extension of time.

59. In still other embodiments, a method is performed during a walkthrough of a structure associated with an SR, the walkthrough conducted by an interested party carrying an IP device. The method carried-out by a server end in communication over a network with the IP device and with an SR device operated by the SR. The method includes the step or process of transmitting electronic communications (e.g., text or live chat messages) between the SR device and the IP device during a limited timeframe encompassing the duration of the walkthrough, the communications routed through the ESW server end. When routing the communications between the SR device and the IP device, the ESW server end further removes contact information accompanying the transmissions, which could otherwise be utilized to directly contact at least one of the SR device and the IP device.

60. The method of example 59, wherein the method further includes the steps or processes of: (i) recalling information stored in memory specifying contact information for an agent device linked to an account of the SR or the interested party, and (ii) automatically including the agent device in transmission of the electronic communications between the SR device and the IP device.

61. In additional implementations, a method is carried-out during a walkthrough of a structure conducted by an interested party carrying an IP device, the method is conducted by an ESW server end in communication with the IP device over a network during the walkthrough. The method includes the steps or processes of: (i) storing point-of-interested (POI) recommendations for an area in which the structure is located in a memory accessible to the ESW server end, (ii) when the walkthrough is concluding, determining whether the interested party is interested in the structure or the area in which the structure is located, and (iii) when determining that the walkthrough is concluding and the interested party is interested in the structure or the area in which the structure is located, transmitting instructions from the ESW server end, over the network, and to the IP device to present the POI recommendations on a screen of the IP device.

62. The method of example 61, wherein the structure is associated with an SR operating an SR device, and wherein the method further includes the step of receiving data specifying the POI recommendations at the ESW server end, over the network, and from the SR device.

Systems, devices, and program products for performing the methods set-forth in examples 1-62 have also been disclosed. Such program products, in particular, may be described in terms of a non-transitory computer-readable media on which computer-readable code or instructions are stored for performing the foregoing example process steps. Similarly, systems and devices (e.g., servers and portable electronic devices, such as smartphones) have also been disclosed as including, among other features, a processor architecture and a memory storing computer-readable code that, when executed by the processor architecture, may cause the system or device to perform any combination of the process steps set-forth in examples 1-62 above.

Conclusion

The foregoing has provided systems, devices, methods, and program products providing various computer-implemented functionalities or tools enhancing user experience when scheduling, conducting, and performing other activities related to structure walkthroughs. A non-exhaustive list of such functionalities includes: (i) check-in related processes; (ii) check-out related processes; (iii) environmentally-triggered messaging during walkthroughs, whether triggered based upon the position of an client device carried by an interested party within the structure or triggered by other environmental triggers, such as machine-scannable codes (QR codes scanned by the IP device) or proximity to wireless beacons; (iv) secondary entry point reminders presented via a client IP device carried by an interested party during a walkthrough; (v) the creation of online walkthrough albums; (vi) supporting anonymized communications (e.g. live chat) between a first client device carried by an interested party during a walkthrough and a second client device operated by a structure representative (that is, a person identified having authority for the structure in question), routing such communications through a server end that optionally strips, removes, or obscures contact information and/or limits such communication to a predefined time window (e.g., encompassing at least the duration of the walkthrough); (vii) check-out omission alerts as described herein; (viii) SR-created POI recommendations; (ix) generation of a countdown of time remaining for the structure walkthrough (with the possible provision of a GUI option for requesting time extensions to prolong the duration of the walkthrough); and (x) data collection, storage, and analysis, with a client device (e.g., IP device 22) carried by an interested party providing location data (and possibly audio and/or video data) to a server end through the course of an enhanced walkthrough.

The foregoing list of functionalities is not exhaustive, noting that additional teachings are set-forth in this disclosure. Further, although it will often be beneficial to practice different functions together as a combination, it is emphasized that any given enumerated function above can be practiced independently or in isolation without requiring the performance of the other functions. Through the performance of such functions, various benefits may be realized including increased convenience in scheduling and conducting structure walkthroughs; better preservation of structure security during and following structure walkthroughs, regardless of third party presence; facilitation of effective sharing of information pertaining to a structure and its surroundings; and the provision of other functionalities usefully performed prior to, during, and subsequent to structure walkthroughs.

Terms such as "comprise," "include," "have," and variations thereof are utilized herein to denote non-exclusive inclusions. Such terms may thus be utilized in describing processes, articles, apparatuses, and the like that include one or more named steps or elements, but may further include additional unnamed steps or elements. While at least one example embodiment has been presented in the foregoing Detailed Description, it should be appreciated that a vast number of variations exist. It should also be appreciated that the example embodiment or example embodiments are only examples, and are not intended to limit the scope, applicability, or configuration of the invention in any way. Rather, the foregoing Detailed Description will provide those skilled in the art with a convenient road map for implementing an example embodiment of the invention. Various changes may be made in the function and arrangement of elements described in an example embodiment without departing from the scope of the invention as set-forth in the appended Claims.

What is claimed is:

1. A method performed during a walkthrough of a structure having a structure representative (SR), the walkthrough conducted by an interested party carrying an interested party (IP) device, the IP device communicating over a network with a server end during the walkthrough, the method comprising:
   receiving, at the server end prior to the walkthrough, (i) location snapshot data transmitted to the server end from a mobile device identifying a plurality of SR-marked locations associated with the structure, the location snapshot data captured by the mobile device when carried to a plurality of SR-marked locations by the SR, and (ii) additional data transmitted from the mobile device specifying a plurality of SR-created messages linked to the plurality of SR-marked locations; and
   storing, utilizing the location snapshot data and the additional data, a location-referenced message set in a memory accessible to the server end for subsequent reference during walkthroughs of the structure:
   monitoring a current location of the IP device utilizing data collected by the IP device during the walkthrough;
   detecting, based on the current location of the IP device, when the IP device is brought into proximity of a first SR-marked location included in the plurality of SR-marked locations; and
   in response to detecting that the IP device has been brought into proximity of the first SR-marked location:
      identifying a first SR-created message corresponding to the first SR-marked location and contained in the location-referenced message set; and
      generating or causing generation of an SR message notification on the IP device, the SR message notification presenting or offering to present the first SR-created message to the interested party via the IP device.

2. The method of claim 1, wherein the location-referenced message set is stored in the memory accessible to the server end; and
   wherein the first SR-created message is transmitted from the server end, over the network, and to the IP device during or prior to the walkthrough.

3. The method of claim 2, wherein monitoring comprises monitoring the current location of the IP device at the server end based, at least in part, on location report signals repeatedly transmitted from the IP device, over the network, and to the server end during the walkthrough.

4. The method of claim 3, wherein generating or causing generation comprises transmitting a command signal from the server end, over the network, and to the IP device, the command signal containing the first SR-created message and instructing the IP device to generate the SR message notification thereon.

5. The method of claim 2, wherein generating or causing generation comprises:
   receiving, at the IP device, a command signal transmitted over the network from the server end, the command signal containing the first SR-created message and instructing the IP device to generate the SR message notification thereon; and
   in response to receipt of the command signal, generating the message notification on a display screen of the IP device.

6. The method of claim 2, wherein a gatekeeper device selectively permits access to the structure through a main entry point; and wherein the method further comprises:
receiving, at the server end, check-in data transmitted from the IP device, over the network, and to the server end, the check-in data entered into the IP device by the interested party when attempting to gain access to the structure;
determining, at the server end, whether the check-in data is valid; and
if determining that the check-in data is valid, transmitting or causing transmission of a signal over the network and to the gatekeeper device instructing the gatekeeper device to grant the interested party access to the structure.

7. The method of claim 6, wherein, during the walkthrough, the server end communicates with an SR device operated by the SR; and
wherein the method further comprises, substantially concurrently with instructing the gatekeeper device to grant the interested party access to the structure, sending a command signal from the server end, over the network, and to the SR device instructing the SR device to generate a notification advising the SR that the walkthrough has commenced.

8. The method of claim 6, further comprising: (i) if determining that the check-in data is valid, further calculating a time remaining for completion of the walkthrough based on a time of check-in and a predetermined walkthrough duration; and (ii) generating or causing generation, on a display screen of the IP device, a running countdown of the time remaining for the completion of the walkthrough.

9. The method of claim 2, wherein a Graphical User Interface (GUI) element is presented on a display screen of the IP device enabling the interested party to request an extension of time for completion of the walkthrough via the IP device; and
wherein the method further comprises:
if the interested party requests an extension of time for completion of the walkthrough via the IP device, determining whether the request should be granted; and
if determining that the request should be granted, generating or causing generation of a first notification on the IP device indicating that the request for the extension of time has been granted.

10. The method of claim 1, further comprising:
determining, based upon the current location of the IP device and a scheduled duration of the walkthrough if the interested party remains within the structure following elapse of the scheduled duration of the walkthrough; and
if determining that the interested party remains within the structure following elapse of the scheduled duration of the walkthrough, generating or causing generation of an alert on the IP device instructing the interesting party to conclude the walkthrough and exit the structure.

11. The method of claim 1, further comprising:
determining, at the server end via data entered into the IP device, when the interested party is completing the walkthrough; and
when determining that the interested party is completing the walkthrough, transmitting instructions to the IP device to present SR recommendations of points-of-interest within an area in which the structure is located.

12. The method of claim 1, wherein the structure has a main entry point and a secondary entry point, the interested party entering the structure through the main entry point when commencing the walkthrough; and wherein the method further comprises:
determining when the IP device is carried outside of the structure or brought back into the structure through the secondary entry point; and
when determining that the IP device has been carried outside of the structure or brought back into the structure through the secondary entry point, generating or causing generation of a reminder on the IP device advising the interested party to re-secure the secondary entry point when re-entering the structure therethrough.

13. The method of claim 1, further comprising:
calculating a time remaining for completion of the walkthrough based on a time of check-in and pre-established scheduling data for the walkthrough; and
generating or causing generation, on a display screen of the IP device, a running countdown of the time remaining for the completion of the walkthrough.

14. The method of claim 1, wherein the location snapshot data comprises at least one of:
received signal strength indicator measurements of wireless nodes within range of the mobile device when carried to each of the plurality of SR-marked locations; and
round trip time measurements of wireless nodes within range of the mobile device when carried to each of the plurality of SR-marked locations.

15. A method performed during a walkthrough of a structure having a structure representative (SR), the walkthrough conducted by an interested party carrying an interested party (IP) device, the IP device communicating over a network with a server end during the walkthrough, the method comprising:
monitoring a current location of the IP device utilizing data collected by the IP device during the walkthrough;
detecting, based on the current location of the IP device, when the IP device is brought into proximity of a first SR-marked location included in a plurality of SR-marked locations associated with the structure:
in response to detecting that the IP device has been brought into proximity of the first SR-marked location:
identifying a first SR-created message corresponding to the first SR-marked location and contained in a location-referenced message set, the location-referenced message set including a plurality of SR-created messages each linked to at least one of the plurality of SR-marked locations; and
generating or causing generation of an SR message notification on the IP device, the SR message notification presenting or offering to present the first SR-created message to the interested party via the IP device;
predicting, based at least in part on the monitored current location of the IP device and on whether the IP device is traveling at a speed exceeding a predetermined speed threshold indicative of travel in a vehicle, whether the interested party is traveling away from the structure without completion of a mandatory check-out subprocess after commencement of the walkthrough; and
when predicting that the interested party is traveling away from the structure without completion of the mandatory check-out subprocess, generating or causing generation of a first check-out omission alert on the IP device.

16. The method of claim 15, further comprising:
determining whether the interested party continues to travel away from the structure after generation of the first check-out omission alert on the IP device and elapse of a first predetermined wait period; and if determining that the interested party continues to travel away from the structure after generation of the first check-out omission alert and elapse of the first predetermined wait period, generating or causing the generation of a second check-out omission alert on the IP device, the second check-out omission alert having a higher urgency than does the first check-out omission alert.

17. A method performed during walkthrough of a structure having a structure representative (SR), the walkthrough conducted by an interested party carrying an interested party (IP) device, the IP device in signal communication with a server end over a network during the walkthrough, the method comprising:

storing, in a memory accessible to the server end, a location-referenced message set containing a plurality of SR-created messages linked to a plurality of SR-marked locations associated with the structure;

determining when a first SR-created message included in the plurality of SR-created messages is desirably presented to the interested party via the IP device based, at least in part, on data transmitted from the IP device, over the network, and to the server end during the walkthrough; and when determining that the first SR-created message is desirably presented to the interested party:

recalling the first SR-created message from the location-referenced message set; and transmitting an instruction signal from the server end, over the network, and to the IP device instructing the IP device to generate a notification on the IP device, the notification presenting or offering to present the first SR-created message to the interested party via the IP device;

wherein the location-referenced message set comprises location snapshot data transmitted to the server end from a mobile device identifying the plurality of SR-marked locations, the location snapshot data captured by the mobile device when carried to each of the plurality of SR-marked locations by the SR.

18. The method of claim 17, wherein the location snapshot data comprises at least one of:

received signal strength indicator measurements of wireless nodes within range of the mobile device when carried to each of the plurality of SR-marked locations; and round trip time measurements of wireless nodes within range of the mobile device when carried to each of the plurality of SR-marked locations.

19. The method of claim 17, further comprising receiving additional location snapshot data associated with a secondary entry point of the structure and transmitted to the server end from the IP device, the additional location snapshot data captured by the mobile device when carried to a location at or adjacent the secondary entry point by the SR.

20. The method of claim 17, wherein a gatekeeper device selectively permits access to the structure through a main entry point; and wherein the method further comprises:

receiving, at the server end, check-in data transmitted from the IP device indicating when the interested party is attempting to gain access to the structure to begin the walkthrough; and denying access to the structure if determining, based on the check-in data, that a current charge state of the IP device is less than a predetermined threshold value.

\* \* \* \* \*